(12) United States Patent
Kukharev

(10) Patent No.: US 11,480,711 B2
(45) Date of Patent: Oct. 25, 2022

(54) USE OF KUKHAREV REGIONS IN THE ATMOSPHERE, IN SPACE AND AT THE LEVEL OF THE EARTHS SURFACE AND UNDER THE EARTHS SURFACE TO PREDICT VARIOUS WEATHER EVENTS

(71) Applicant: Vadim Kukharev, Moscow (RU)

(72) Inventor: Vadim Kukharev, Moscow (RU)

( * ) Notice: Subject to any disclaimer, the term of this patent is extended or adjusted under 35 U.S.C. 154(b) by 10 days.

(21) Appl. No.: 17/687,851

(22) Filed: Mar. 7, 2022

(65) Prior Publication Data

US 2022/0244425 A1     Aug. 4, 2022

Related U.S. Application Data

(63) Continuation-in-part of application No. 17/558,964, filed on Dec. 22, 2021, now Pat. No. 11,361,874, which is a continuation-in-part of application No. 17/146,832, filed on Jan. 12, 2021, now Pat. No. 11,262,379, which is a continuation-in-part of application No. 16/991,624, filed on Aug. 12, 2020.

(60) Provisional application No. 63/054,923, filed on Jul. 22, 2020.

(51) Int. Cl.
*G01W 1/10*     (2006.01)
*G01V 1/00*     (2006.01)
*G01W 1/00*     (2006.01)

(52) U.S. Cl.
CPC ............... *G01W 1/10* (2013.01); *G01V 1/008* (2013.01); *G01W 2001/006* (2013.01)

(58) Field of Classification Search
CPC ... G01V 1/008; G01W 1/10; G01W 2001/006
See application file for complete search history.

(56) References Cited

U.S. PATENT DOCUMENTS

| | | | |
|---|---|---|---|
| 6,603,405 B2 * | 8/2003 | Smith | G08G 1/0962 340/602 |
| 10,295,704 B2 * | 5/2019 | Haas | G06T 7/20 |
| 10,520,645 B2 * | 12/2019 | Radich | G01W 1/10 |

* cited by examiner

*Primary Examiner* — Elias Desta
(74) *Attorney, Agent, or Firm* — Nadya Reingand

(57) ABSTRACT

The present invention may be used for forecasting various weather phenomena including but not limited to flyby anomalies, cyclones, tornadoes, killer (rogue) waves, earthquakes, lightning, sprites, and temperature fluctuations. The invention is based on knowledge of physical and mathematical models regarding the occurrence of Kukharev regions (i.e., K regions) resulting from gravitational resonances occurring within the Earth-Moon-Sun system (and similar systems located elsewhere). These gravitational resonances and combinations thereof, among other things, cause jumps in atmospheric pressure. Such jumps can be recorded and extrapolated to predict the locations and times of the occurrence of Kukharev regions and, in turn, the associated weather-related effects.

18 Claims, 76 Drawing Sheets

USE OF KUKHAREV REGIONS IN THE ATMOSPHERE, IN SPACE AND AT THE LEVEL OF THE EARTHS SURFACE AND UNDER THE EARTHS SURFACE TO PREDICT VARIOUS WEATHER EVENTS

CROSS-REFERENCE TO RELATED APPLICATIONS

This patent application is a Continuation-in-Part of U.S. patent application Ser. No. 17/558,964, filed on Dec. 22, 2021, which in turn is a Continuation-in-Part of U.S. patent application Ser. No. 17/146,832, filed Jan. 12, 2021, now U.S. Pat. No. 11,262,379, which in turn is a Continuation-in-Part of U.S. patent application Ser. No. 16/991,624, filed Aug. 12, 2020, which claims priority to U.S. Provisional application 63/054,923 filed Jul. 22, 2020, all of which are incorporated herein by reference in its entirety.

FIELD OF THE INVENTION

This invention relates to the field of forecasting various weather phenomena including but not limited to tornadoes, cyclones, killer (rogue) waves, atmospheric pressure surges, lightning, unpleasant areas for cardio-dependent individuals, flyby anomalies, and earthquakes.

BACKGROUND ART

Basic descriptions of the evidence and formation of Kukharev regions (i.e., K regions) in the atmosphere and on the Earth's surface have been provided in the parent applications within this patent application family. The use of the present invention for forecasting various weather phenomena is based on knowledge of physical and mathematical models of the occurrence of Kukharev regions resulting from gravitational resonances occurring from the Earth-Moon-Sun system (and similar systems located elsewhere).

SUMMARY OF THE INVENTION

The use of the present invention is based on a physical and mathematical model of the occurrence of Kukharev regions as a result of gravitational resonance, in the Earth-Moon-Sun system (and similar systems).

In the prior art, the forecast of weather phenomena has been made based on complex numerical modeling based on existing trends, or such forecast has been absent altogether (e.g., for flyby anomaly type phenomena). The present invention, on the contrary, is based on an understanding of the work of gravitational tides, and the facts of their resonance from several sources. The bursts of the gravitational field, the facts of which are recorded by gravimeters all over the planet, are just the facts of the formation of the Kukharev regions. These jumps, among other things, cause jumps in atmospheric pressure, creating cyclones, anticyclones, and tornadoes, providing a map of the movement of formed tornadoes. The methods presented herein include forecasting the locations and times of occurrence of the Kukharev (K) regions and, in turn, the associated weather-related effects.

BRIEF DESCRIPTION OF THE DRAWINGS

The present invention will now be discussed in further detail below with reference to the accompanying figures, in which.

DETAILED DESCRIPTION OF PREFERRED EMBODIMENTS

Figure 1:
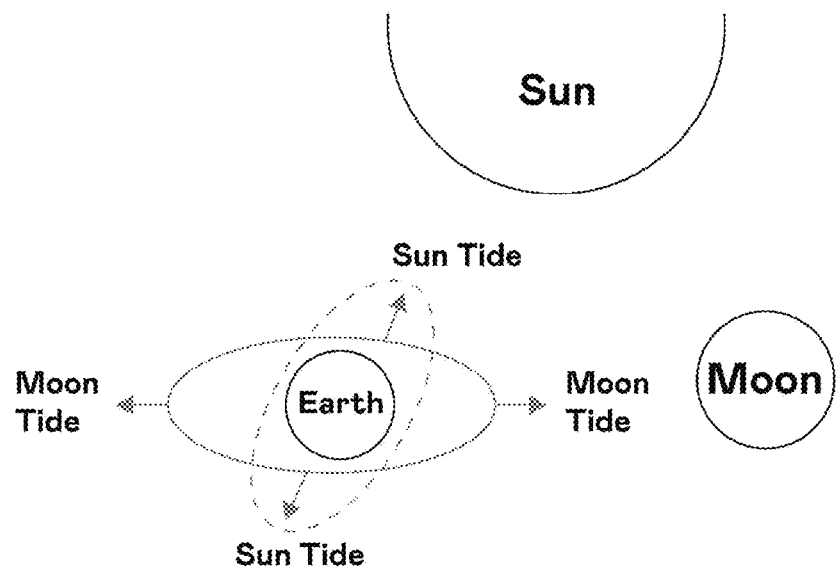
FIG. 1 illustrates a simplified two-dimensional view. The Earth and the Moon are the two main gravitating factors for fluids (liquids, gases) on planet Earth.

This patent provides evidence that Kukharev regions directly create flyby anomalies, cyclones, tornadoes, killer (rogue) waves, and earthquakes. Based on this information, it is possible to effectively predict such weather phenomena.

Difficult to predict natural phenomena usually include the occurrence of cyclones and tornadoes. Unpredictable natural phenomena usually include the occurrence of lightning, elves, sprites, earthquakes, and flyby anomalies.

These weather events cause billions of dollars in damage annually, as well as many human lives. The most harmless phenomenon is the flyby anomaly, which provides a boost to spacecrafts that fall into it. But after the boost, operators of the spacecraft must recalculate the trajectories of the vehicle.

A flyby anomaly is a real (actual) discrepancy between current scientific models and the actual increase in velocity (i.e., an increase in kinetic energy) observed during the passage of a planet (usually Earth) by a spacecraft. In many cases, it has been observed that spacecraft are gaining more speed than scientists predicted, but so far no convincing explanation has been found. The largest discrepancy observed during the flight was 13 mm/s.

An earthquake (also known as a quake, tremor, or temblor) is the shaking of the surface of the Earth resulting from a sudden release of energy in the Earth's lithosphere that creates seismic waves. Earthquakes can range in size from those that are so weak that they cannot be felt to those violent enough to propel objects and people into the air and wreak destruction across entire cities.

A tornado is an atmospheric vortex that occurs in a cumulonimbus (thunderstorm) cloud and spreads down, often to the very surface of the earth, in the form of a cloud sleeve or trunk with a diameter of tens and hundreds of meters.

Sprites are a type of electric discharges of cold plasma that beats in the mesosphere and thermosphere. They appear in a severe thunderstorm at an altitude of about 50 to 130 kilometers (the height of the formation of "ordinary" lightning is no more than 16 kilometers) and reach a length of up to 60 km and up to 100 km in diameter.

A cyclone is a large scale air mass that rotates around a strong center of low atmospheric pressure, counterclockwise in the Northern Hemisphere and clockwise in the Southern Hemisphere as viewed from above (opposite to an anticyclone). Cyclones are characterized by inward-spiraling winds that rotate about a zone of low pressure.

The following evidence proves that it is the resonance of gravitational tides that causes Schumann waves (in the Kukharev regions that occur at these moments of resonance):

1. Physical and Mathematical Understanding, Process Model.

Imagine that you have liquid (fluid, cloud) made of electrons and other charged particles (which are in the atmosphere).

There is a whole ocean of electrons (electrons enter the atmosphere primarily from the solar wind, so by the way, the power of Schumann resonances is greater in summer, since the density of electrons in the atmosphere is greater in summer).

This ocean of charged particles in the atmosphere (just like the ocean below of water molecules) is affected by the gravitational field of the Moon, which causes periodic ebbs and flows.

At the same time, the movement of the Sun, its gravity, also causes tides and tides in all fluids (only the solar tides are smaller, weaker than the Lunar ones).

Now imagine that the two tides will coincide in phase (as during a solar eclipse by the moon, but not only at such moments). This will be the resonance of two tides. And this causes a sharp increase in fluid vibrations, the formation of a standing wave in it. It is only important to understand that for resonance, the phases of the Moon's motion around the Earth and the Earth-Moon system around the Sun also need to coincide.

At this moment, two tidal waves of electrons (one wave is "led" by the Sun, the second wave is "led" by the Moon) "overlap" with each other (coincide in phase). A resonance occurs and an electromagnetic wave occurs. The place of occurrence of such a resonance is the Kukharev region. For Schumann waves, the Kukharev regions are mainly located in the stratopause (where the surrounding space is constantly heated up).

Everything written is true for different liquids and gases.

You can see simplified two-dimensional drawing in FIG. 1. You see different tides from the Moon and the Sun. Two gravitating factors (the gravitational fields of the Moon and the Sun).

Please note, instead of the word "Earth" in the figure, for example, it can be written "human cell", the fundamental influence on the entire fluid is identical.

The author wanted to define the concept of "Kukharev region" once again (this was already in the initial patents). The Kukharev region is an area that arises as a result of the resonance of several gravitational tides. This is a source of energy, the beginning of standing waves of various kinds. First of all, this is the energy from the "super tide", as a result of the resonance of two or more tides, as fluid components.

Figure 2:
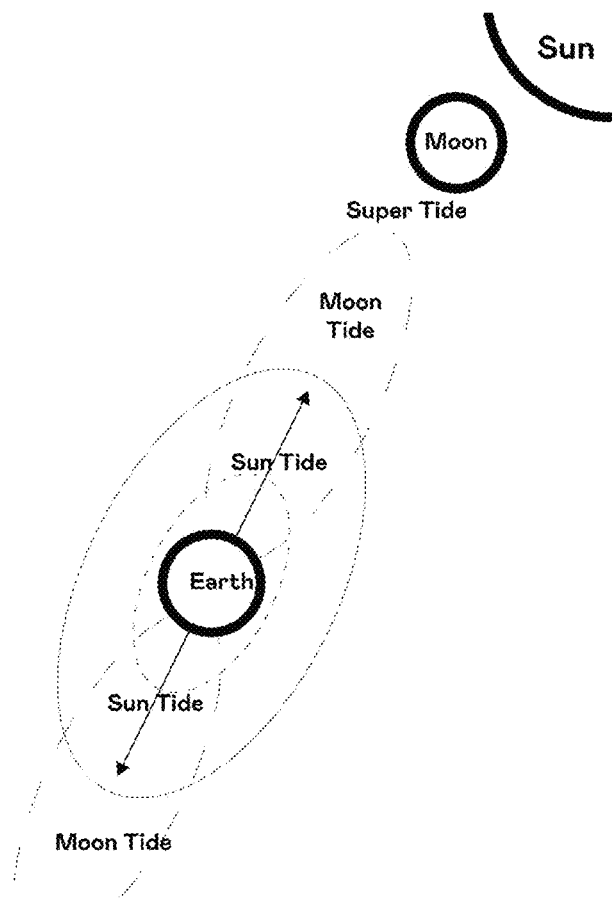
FIG. 2 shows a very simplified two-dimensional representation of how two gravitational tides (one caused by the gravitational field of the Sun, the second caused by the gravitational field of the Moon) overlap, thereby resonating as a result.

FIG. 2 shows the very simplified two-dimensional representation of how two gravitational tides (one caused by the gravitational field of the Sun, the second caused by the gravitational field of the Moon) "overlap" each other and resonate as a result.

As gravitational factors that create tides at a particular point (and these tides can resonate), one can distinguish the phase of the moon, the depth of the barycenter, the distance from the earth to the moon, the distance from the barycenter to the observer's point (the barycenter is constantly moving and its gravitational field also creates tides), the daily movements of the Sun and Moon, the movement of Venus, Mars, other planets (and even surrounding stars). Different gravitational factors resonate differently and create different amounts of resonance energy.

Figure 3:
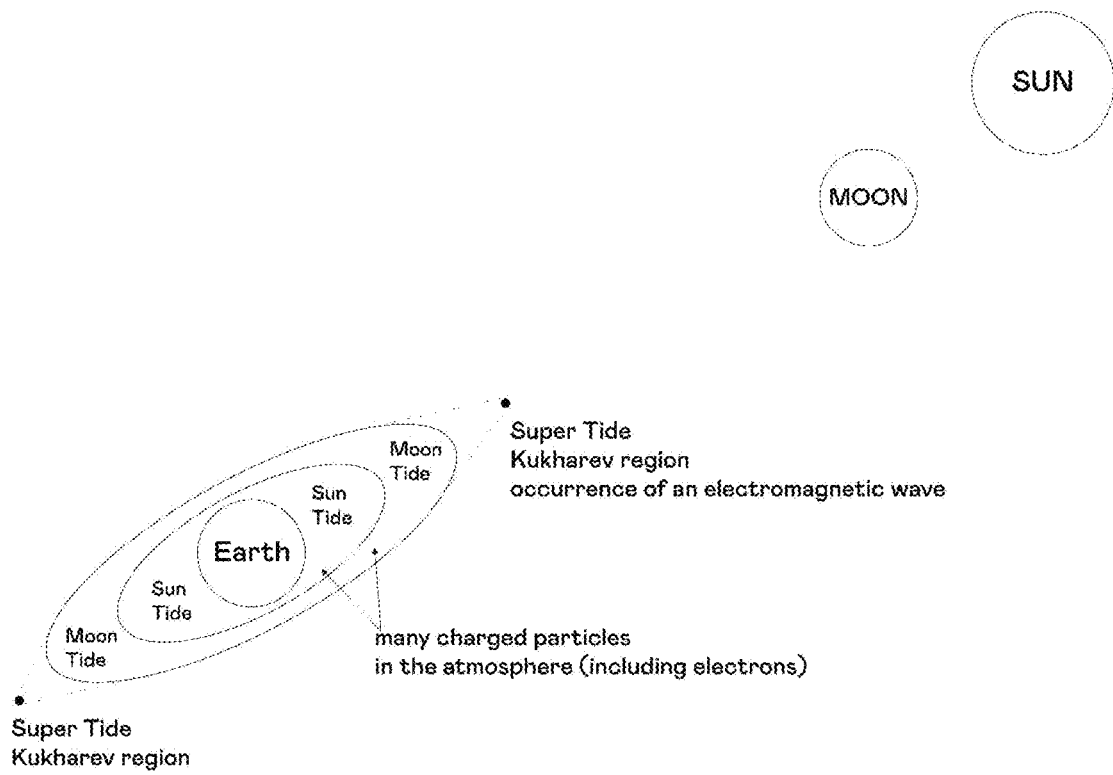
FIG. 3 shows a very simplified two-dimensional representation of how two tides in the fluids of electrons and charged particles in the atmosphere overlap, and as a result they resonate, creating the Kukharev region, from which Schumann waves are generated. One tide is caused by the gravitational field of the Sun, the second is caused by the gravitational field of the Moon.
Figure 4:
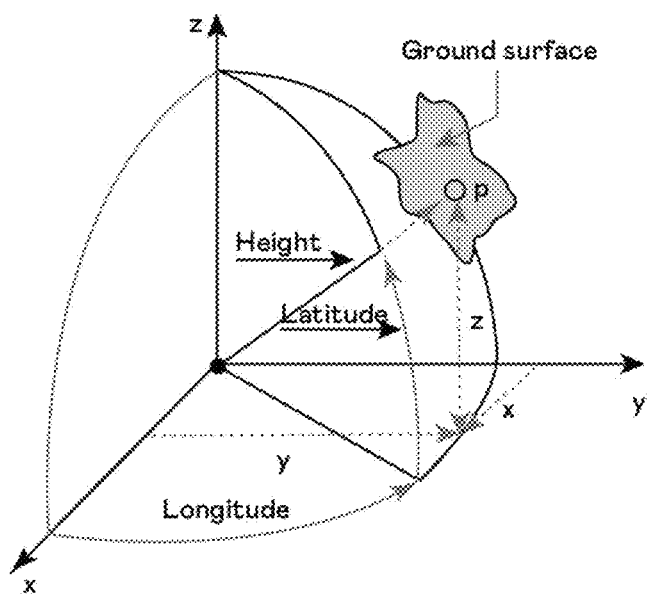
FIG. 4 shows how a point on the Earth's surface can be defined by latitude, longitude, and ellipsoidal height.

FIG. 3 shows the very simplified two-dimensional representation of how two tides in the fluids of electrons and charged particles in the atmosphere "overlap" each other, as a result they resonate, creating the Kukharev region, from which Schumann waves are generated. one tide is caused by the gravitational field of the Sun, the second is caused by the gravitational field of the Moon.

There are different gravitational factors that cause tides. The main factors (they are given below in the graphical calculation of the moments of resonances of gravitational tides): 1) the distance from the Earth to the Moon, 2) the phase of the Moon, 3) the distance from the Earth-Moon barycenter to the observer (the point where we are looking for a superflow), 4) the depth of the barycenter (from the point where we are looking for a superflow). It is clear that there are other gravitational factors, such as the gravitational field of Mars, Venus, stars, and so on, but conceptually they are not so important. Plus, the closer you are in latitude to the Earth-Moon barycenter, the more significant gravitational factors are the diurnal and semi-diurnal changes in the position of the Moon and the Sun.

Table 1. A single new fundamental physical regularity (the formation of Kukharev regions), which causes different consequences in different environments. From a fundamental point of view, all these lines are the same (one reason is the resonance of gravitational tides).

TABLE 1

A single new fundamental physical regularity (the formation of Kukharev regions), which causes different consequences in different environments. From a fundamental point of view, all these lines are the same (one reason is the resonance of gravitational tides).

| Element No | (fragment) of the Kukharev region | What we observe (what is the de facto Kukharev region and what this region creates). | Practical benefits of using the Kukharev region |
|---|---|---|---|
| 1 | Electron | Electromagnetic wave of the Schumann resonance | Getting free electricity in the Kukharev regions. Prediction of blue lightning, elves and jets. Aircraft warning about lightning activity. Vadim Kukharev's application for a U.S. Pat. No. 63/054,923, "Technology of obtaining free electricity at moments of gravitational resonances", PCT/IB2020/057606. The copyright of Vadim Kukharev's discovery is also registered with the Library of Congress (Copyright 1-9054879141). U.S. patent application 17/558,964 "Methods for using Kukharev regions in the atmosphere, in space and at the level of the Earth's surface to obtain antimatter" |
| 2 | Proton | A wave of protons. This wave is high in the atmosphere when it collides with other particles, antimatter particles can create, which immediately annihilate. | Collection of antimatter particles in the Kukharev regions using Penning Traps or their analogues. U.S. patent application 17/558,964 "Methods for using Kukharev regions in the atmosphere, in space and at the level of the Earth's surface to obtain antimatter" |
| 3 | Water molecule | Rogue_wave (killer waves in the seas and oceans) | Warning to ships (above water and underwater) about the danger in a specific place at a specific time |
| 4 | Air molecule | Acoustic waves. Changes in atmospheric pressure and temperature at the moments of resonances of gravitational tides. Lightning bolts, blue lightning, elves and jets (here interaction together with electronic clouds together). Formation of cyclones and anticyclones, changes in atmospheric pressure and temperahire. | Using a sound wave as an energy source. Warning to aircraft and other interested parties to avoid turbulence and thunderstorm zones. Weather prediction. |

TABLE 1-continued

A single new fundamental physical regularity (the formation of Kukharev regions), which causes different consequences in different environments. From a fundamental point of view, all these lines are the same (one reason is the resonance of gravitational tides).

| No | Element (fragment) of the Kukharev region | What we observe (what is the de facto Kukharev region and what this region creates). | Practical benefits of using the Kukharev region |
|---|---|---|---|
| | | Thunderstorm belt between the southern and northern tropics. | |
| 5 | Ozone layer particles | Destruction of ozone holes near the Earth's poles at the moments of gravitational resonances | Accumulation of statistics to address the issue of preservation of the ozone layer by certain impacts |
| 6 | Quarks, basic particles | "Clumps" of elementary particles at moments of gravitational resonance | Scientific experiments at the Large Hadron Collider |
| 7 | Human cells (which mostly consist of water) | Migraines, female menstruation, various abnormal cell fluctuations. Heart attacks and strokes (due to the formation of blood clots and vascular ruptures). Jumps in blood pressure in humans. Electromagnetic radiation affects blood clotting, creating blood clots, torn vessels, increasing the risk of heart attacks and strokes. In addition to the formation of blood clots, "excessive" fluctuations in the gravitational field these days can generally "rock" cells, having a bad effect on health, which should be seen in statistics. | Targeted removal of unnecessary cells (cancerous, old, sick) through the creation of directed radiation at cells with the same oscillation frequency at moments of gravitational resonance. Vadim Kukharev's U.S. patent application 17/146,832 for a U.S. Pat. and its copyright. A way to radically prolong a person's life. |
| 8 | Mercury as a secondary fluid to the deposit of sulfide gold. Other secondary fluids in the main minerals | Geochemical anomaly (elevated mercury vapor) at the moment of resonance of gravitational tides. Similarly, for many other secondary fluids in the search for minerals according to the patent | A way to quickly and cheaply search for mineral deposits. Kukharev Vadim. U.S. Pat. No. 1,671,152 |
| 9 | Fluid masses of the planet Earth. Potentially together with graviton\energon. | Flyby anomaly. Dynamics of the angular velocity of the Earth (and other planets) around the Sun, the Sun around the core of the Galaxy, our entire galaxy around the center of galaxies. Milankovich cycles. Allais effect. | More accurate calculation of the motion of spacecraft, Getting energy and electricity in the Kukharev regions U.S. patent application of Vadim Kukharev 16/991,624 "Technology for obtaining free electricity at moments of gravitational resonances" |
| 10 | Fluids inside animals and plants | Consequences like increased egg production at the moments of resonance of gravitational tides, changes in plant growth | Forecasting of material accounting for farms |
| 11 | The whole planet Earth | Deserts in those places where the constant resonances of gravitational tides "pushed out" all the water. A belt of thunderstorms (lightning) in places where resonances of gravitational tides occur more often. Formation of oil, gas and other minerals in the Earth's mantle. | Better understanding of geological processes |
| 12 | The Sun | Flashes, sunspots, prominences. Gravitational resonances of the level of the barycenter Galaxy of the Milky Way- Sun-Jupiter are the main cause of the 11-year cycle of solar flares on the Sun. | Updating statistics for the safety of space satellites and spacecraft, weather forecast |
| 13 | Jupiter, Neptune | Jupiter's Great Red Spot, Neptune's Dark Spot. Any large permanent vortex on Neptune, Jupiter, Venus is primarily a consequence of the fact that the resonance of gravitational tides from several sources leads to the formation of giant Kukharev region at altitude, accompanied by pressure drops. It is identical to how on Earth the Kukharev region in the stratopause (tins is from another patent application by Vadim Kukharev) leads to a pressure drop and the formation of electromagnetic Schumann waves. Just on Jupiter/On Neptune, this pressure drop is much greater, which is why vortices arc formed. And the resonances of gravitational tides constantly "pumps" energy into these vortices. | Assistance in the scientific understanding of patterns in the universe |

TABLE 1-continued

A single new fundamental physical regularity (the formation of Kukharev regions), which causes different consequences in different environments. From a fundamental point of view, all these lines are the same (one reason is the resonance of gravitational tides).

| No | Element (fragment) of the Kukharev region | What we observe (what is the de facto Kukharev region and what this region creates). | Practical benefits of using the Kukharev region |
|---|---|---|---|
| 14 | Galaxies and constellations | The stress-strain state due to the resonances of gravitational tides at the level of galaxies can create "voids", squeezing out stars. Just like on earth, more frequent resonances of gravitational tides associated with the barycenter led to the creation of a strip of deserts (places from where the resonances squeezed out all the water) | Assistance in the scientific understanding of patterns in the universe |

Different consequences of the occurrence of the resonance of gravitational tides and theoretically in one vertical can occur simultaneously (for example):
  flyby anomaly from above;
  below the electromagnetic Schumann wave (in the stratopause, together with the acoustic wave);
  even lower is the killer wave that will lift the ship with people who will have migraines.

2. Correlation of the Moments of Time of Resonances of Gravitational Tides with the Moments of a Sharp Increase in the Amplitudes of Electromagnetic Waves According to Schumann Harmonics (for the Same Points of the Planet with the Same GPS Coordinates).

The correlation between the time points of the gravitational tidal resonances and the jumps in the amplitude of the Schumann resonances for specific points of the Earth exceeds 85%. This is a mathematical fact that clearly indicates that one event (the resonance of gravitational tides of a fluid from charged particles) causes another event (the electromagnetic wave of the Schumann resonance). The place of "pumping" energy, the place where two tides resonate within one fluid, is the Kukharev region (and there may be more tides, but two of them are "main"—one tide from the Moon, the second from the Sun, as the most energetically significant).

In about 15% of cases, the "pumping" of the energy of the electromagnetic Schumann wave occurs due to solar wind flows, solar flares. This is because the Kukharev regions arise in an extremely rarefied gas environment, which is also affected (in addition to the gravitational resonance) by fluctuations in the intensity of the solar wind. In addition, the energy of various types of gravitational resonances varies greatly.

In some cases, the concept of an amplitude "jump" is conditional, because when they go one after the other and the resonance energy simply "supports" the electromagnetic wave already existing at a high energy level, the appendix contains many graphs that clearly indicate the correlation of these events. That is, it is statistically reliable for any samples that two chains of events (the increase in the amplitude of electromagnetic Schumann waves and the moments of resonance of gravitational tides) are interconnected, the gravitational resonance of several tides causes a jump in the energy of an electromagnetic wave.

General Additional Data.

The sources of the Schumann waves are the Kukharev regions, which arise at the moments of resonances of gravitational tides in the stratopause (as well as higher regions).

The text below provides a description of this process, statistical evidence, a physical and mathematical model of the process.

To put it briefly and simplistically about the source of Schumann waves:

1) Everyone knows that there are Lunar tides (large) on the seas and oceans, I hope no one argues with this. The moon causes tides in all liquids and gases.

2) Just like in point 1, there are tides from the Sun in all liquids (but they are much weaker because the Sun is far away, and no one pays attention to these tides). You cannot deny the existence of tides in all liquids and gases under the influence of the Sun if you recognize tides under the influence of the Moon from point 1.

3) When two tides in the atmosphere (for example, solar and lunar) "overlap" each other (resonate), then a "super-tide" arises, the Kukharev region arises, which is a source of standing waves of different types. The same is identical for other types of fluid, such as human cells.

The text shows that it is the resonance of several gravitational factors that leads to "rocking", vibrations of human cells, and it is the "extra" vibrations of human cells at the moments of resonance of gravitational tides that cause jumps in mortality. Electromagnetic radiation affects blood clotting, creating blood clots, torn vessels, increasing the risk of heart attacks and strokes. In addition to the formation of blood clots, "excessive" fluctuations in the gravitational field these days can generally "rock" cells, having a bad effect on health, which should be seen in statistics.

Kukharev regions in terms of the generation of Schumann waves arise in a discharged ionized gas, the state of which depends on many factors: the intensity of the solar wind, the turbulence of the atmosphere-troposphere-stratosphere. Therefore, the effect of gravitational tidal resonances on the stratopause (where Schumann resonances occur) is different from the effect on typical fluid objects. The duration of natural oscillations of a gas fluid in the stratopause under the influence of the energy of resonances of gravitational tides in the Earth's crust in many cases is much longer than 12 hours. If the duration of the natural vibrations of the ionosphere in the stratopause is a day or more, then the interference of the natural vibrations of the ionosphere will occur from the resonances of gravitational tides in the Earth's crust that differ in time. Accordingly, we see more frequent increases in the amplitudes of spectra in the ionosphere/Schumann resonances compared to terrestrial Fluid objects.

There are tides of liquids (seas and oceans) and gases caused by the Moon. Similarly, you should understand and acknowledge the presence of weaker tides caused by the Sun. And now just imagine how the two such tides "overlap"

each other and resonate. Where this happens is the Kukharev region. If the fluids consist of electrons, then the Kukharev region generates an electromagnetic wave, which is called the Schumann resonance.

Also, additional gravitational factors can be introduced, such as tides from Mars and Venus and other remote sources of gravity, but these are not very significant tides from a practical point of view. Similarly, the use of the fact that the center of mass of the Earth-Moon does not revolve around the Sun, but around the common barycenter of the masses of the entire Solar System (which is essentially inside the Sun) does not significantly affect the calculations.

The fluid atmospheric poles of the Earth are a vortex of rotation, the speed of which increases during gravitational resonances. The photo of the satellites clearly shows the 'black hole funnels' at the poles of the Earth. The duration of the manifestation of 'black holes' during observations is about a day—exactly corresponds to the maximum duration of the resonances of gravitational tides.

Aquanaut Rozhnov died on Apr. 22, 1998, at the North Pole on a powerful resonant day, having descended to the bottom of the ocean while testing underwater equipment. This shows the danger of Kukharev areas in fluids, both underwater and atmospheric, since Kukharev areas in the stratopause are also the cause of blue lightning, elves and sprites. And planes need to avoid the Kukharev areas so that lightning or a plasmoid does not strike. With gravitational resonance, the pressure in the atmosphere changes, which causes an increase in volume and, accordingly, a decrease in temperature.

The tide is a change in the shape of a compressible body under the influence of the attraction of another body. The tide in absolutely solid bodies does not change the shape of the body, it is manifested by a change in the stress tensor inside the body From a practical point of view, the following is noted. It is important to understand the time and place of the formation of the Kukharev regions. In general, since Laboratories or hospitals are usually stationary objects, Kukharev areas will be formed there permanently (every few days).

Resonance in fluids (especially in large ones) does not occur instantly. The tides begin to resonate, the resonance increases, and then subsides. This process takes time. Sometimes resonances can last for hours, sometimes milliseconds. The geometric shape of the fluid, its dimensions, viscosity, density—all this matters for the time and course of the resonance.

General Mathematical Calculation of the Moment of Resonance of Gravitational Tides.

The following generalized mathematical model is presented only for very approximate clarity of what is happening in the physical model.

The presented mathematical description shows only one of the possible ways to describe the resonance of tides. But the essence of the emergence of the Kukharev regions is at the same time uniform.

The essential description of the question statement:
1) We have GPS coordinates of some point on the Earth.
2) Conceptually, we need to:
1. Make a three-dimensional coordinate grid
2. Write the equations of motion of the Sun and the Moon relative to this coordinate system in time
3. Write the equations of tides at a given point
4. The coincidence of the time points of several tides will give a resonance. In this case, the phase accounting is calculated separately below. When the phases of the movement of objects coincide, the tides create a "super tide", when the opposite phase "extinguish" each other.

GPS is a satellite system that uses many satellites to provide the user with accurate coordinates.

The complete GPS structure consists of three different segments:
1) The Space Segment—Satellites orbiting the Earth.
2) Control Segment—Stations located near the equator, necessary for controlling satellites.
3) User Segment—Anyone who receives and uses a GPS signal.

Determining coordinates using GPS is based on measuring the distance from satellites to a GPS receiver located on the Earth's surface. This distance to each satellite can be determined by the GPS receiver. The main idea is to solve the reverse serif, which many surveyors use in their daily work. If the distance to three points relative to their own position is known, then it is possible to determine the coordinates of the standing point relative to these three points. From the distance to one satellite, we know that the position of the receiver must be some point on the surface of an imaginary sphere, the center of which is the satellite. Having determined the intersection point of three imaginary spheres, we get the position of the receiver.

There are four unknown quantities for the solution: the coordinates (x, y, z) and the time t of the signal passage. After measuring the signals from four satellites, we get four equations that can be solved, which will allow us to determine these unknown quantities.

A point on the Earth's surface (FIG. 5) can be defined by latitude, longitude and ellipsoidal height. An alternative method for determining the position of a point is a Cartesian (rectangular) coordinate system, using segments along the x, y, and z coordinate axes from the origin or center of the spheroid. This method is primarily used by GPS to determine the position of a point in space.

Satellite system data and satellite orbit parameters are calculated relative to the Earth's center of mass. The origin 0 is located at the center of the Earth's mass;
axis 0x—intersection of the plane of the original meridian WGS-84 and the plane of the equator;
axis 0z—is directed to the North Pole of the Earth;
axis 0y—complements the system to the right coordinate system.

The initial meridian of WGS-84 coincides with the zero meridian determined by the International Bureau of Time (BIN). Therefore, according to the task condition, there are coordinates of some point on Earth (x; y; z) in a three-dimensional GPS coordinate system.

All further equations are written as one of the possible solutions to the general problem of calculating the formation time of Kukharev regions. This problem, as the problem of calculating the moment of resonance of several gravitational tides, can be solved in different ways with different accuracy (for each specific case)

Let's write down the equations of motion of the Sun and the Moon relative to the GPS coordinate system depending on time, considering the trajectories of the Earth's motion around the Sun and the Moon around the Earth close to the circle. The equation of motion is the dependence of coordinates on time.

Simplified dependence of GPS coordinates of the Moon on time:

$$x_{Moon}(t) = \alpha_{Moon} \cdot \sin(-2 \cdot \pi \cdot v_{Moon} \cdot t + \overline{V}_{Moon})$$

$$y_{Moon}(t) = \alpha_{Moon} \cdot \sqrt{1 - e_{Moon}^2} \cdot \cos(-2 \cdot \pi \cdot v_{Moon} \cdot t + \overline{V}_{Moon})$$

$$z_{Moon}(t) = 0$$

Where:
- $\alpha_{Moon}$=379 730 km—the large semi-axis of the Moon's orbit relative to the center of mass of the Earth-Moon system;

$$v_{Moon} = \frac{1}{T_{Moon}} 1.118 \cdot 10^{-5} c^{-1} - \text{frequency for the Moon}$$

$T_{Moon}$=89 428 seconds—Lunar day (24 Earth hours, 50 minutes and 28 seconds), $e_{Moon}$—is an eccentricity—a numerical characteristic of an ellipse showing the degree of its deviation from the circle. Ellipse eccentricity is the ratio of the distance from the focus to the center of the ellipse to the semimajor axis. This property is taken as the definition of eccentricity. $e_{Moon}$=0.0549—eccentricity of the Moon's orbit;

$\nabla_{Moon}$ is the initial phase of the Moon, which depends on the initial moment of observation. It can be accepted for example on the date 14.12.2020 (16 hours 14 minutes 39 seconds). This is the date of the last total solar eclipse, when the phase of the Moon and the Sun coincide. The total solar eclipse occurred at a longitude of 67 degrees 54 minutes west longitude. Since the longitude is counted from the zero, Greenwich meridian, then this will be the initial phase of the Moon at this time.

Simplified dependence of GPS coordinates of the Sun on time is obtained identically:

$$x_{Sun}(t) = \alpha_{Earth} \cdot \sin(-2 \cdot \pi \cdot v_{Sun} \cdot t + \overline{V}_{sun})$$

$$y_{Sun}(t) = \alpha_{Earth} \cdot \sqrt{1 - e_{Earth}^2} \cdot \cos(-2 \cdot \pi \cdot v_{Sun} \cdot t + \overline{V}_{sun})$$

$$z_{Sun}(t) = 0$$

Where:

$$v_{Sun} = \frac{1}{86400} = 1.157 \cdot 10^{-5} c^{-1} - \text{frequency for the Sun}$$

$\alpha_{Earth}$=149 597 868 km—the large semi-axis of the Earth's orbit;
$e_{Earth}$=0.0167086 eccentricity of the Earth's orbit Next, let's see what's with the tidal forces at a particular point. The tidal force is calculated by the formula:

$$F = F_2 - F_1 = GMm\left(\frac{1}{(r - R_{Earth})^2} - \frac{1}{r^2}\right)$$

Where:
M is the mass of the space object that forms the tide (Sun or Moon),
r is the distance from the center of mass of the Earth to the center of mass of a space object,
m is the mass of tidal matter,
$R_{Earth}$ is the radius of the Earth, $$G = 6.67 \cdot 10^{-11} \text{ N}\frac{m^2}{kg^2} - \text{the gravitational constant.}$$

If, on the basis of Newton's second law, we write differential equations of tides at a specific point with GPS coordinates and transform these equations to find the moments of tides (by examining the modulus of the radius vector of the Sun and Moon at the extremum), then we can obtain general equations of the following form:

$$t = \begin{cases} \dfrac{\nabla_{Sun} - \arctg\dfrac{x}{y} + \pi \cdot n}{2 \cdot \pi \cdot v_{Sun}} & \text{for the Sun} \\ \dfrac{\nabla_{Moon} - \arctg\dfrac{x}{y} + \pi \cdot k}{2 \cdot \pi \cdot v_{Moon}} & \text{for the Moon} \end{cases}$$

for the Sun
for the Moon
Where:
k—the number of the lunar tide at a given point with GPS coordinates, taking into account the minima and maxima of the tide amplitudes;
n—solar tide number.

It is important to understand that the intersection of gravitational factors can be:
in phase, which will cause resonant amplification, or
in opposite phases, which will cause a decrease in amplitude.

With prolonged parallel movement of the curves of gravitational factors, their interaction in the form of interference is inevitable, since against the background of smooth movement, diurnal tides occur, which for different gravitational factors may coincide in phase and then a resonant signal amplification will occur, or the interaction will occur in the opposite phase, which will lead to signal attenuation.

And then it is extremely important to understand that eclipses occur only when the Moon is full, which is on the same line between the Earth and the Sun. This causes a maximum tide in the Earth's crust, but it is not at all necessary that at this moment the phases of the Moon's movement around the Earth and the Sun around the Earth coincide.

Therefore, further it needs to be taken into account separately. That is, it is necessary that the phases of the Moon's motion around the Earth and the Sun around the Earth coincide for the resonance of gravitational tides.

Plus, it is important to understand that if we eventually move on to the three-body problem, then this problem is analytically unsolvable. But in practice, this is not so important, since we have a lot of other ways to understand the place and time of the formation of the Kukharev regions.

The simplest ways to calculate the formation time of the Kukharev regions
1) Geometric method (figure where there are different gravitating factors)
2) Time analysis of the "Kukharev reference area". The point is to choose a sample. For example, at the top in the stratopause, where electromagnetic waves are formed. That is, you can look "up" using a Schumann receiver (at 1 harmonic) and when the amplitude of the oscillations increases (that is, the Kukharev region is formed), then you are inside the resonance of gravitational tides, which affects all fluids. The volume of the resonance occurring simultaneously is quite large, in a number of experiments it was conventionally a ball with a radius of 100 km.

One can make equations with respect to different starting points of reference, but the essence of the technology always remains the same—you calculate for specific points of the Earth (or another planet) the moments of tides from different gravitational factors (together with the phases of motion). When 2 or more tides coincide at one point, this is the moment of resonance.

Statistical Proof of the Existence of Kukharev Regions (in the Stratopause in Terms of Converting Electronic Fluids into Electromagnetic Waves of Schumann Resonances).

The following is a set of graphs comparing the moments of resonances of gravitational tides and the moments of energy jumps of Schumann resonances. There is a clear correlation between these two events.

That is, the resonance of gravitational tides, the moment when several tides "overlap" each other in an electronic fluid, resonate (from different sources of gravity), causes a jump in the energy of the Schumann resonance.

It should be noted that the resonance prediction graph shows the moment of resonances, but the tides may be in the opposite phase, and then there will be no energy jump (this happens in some cases). Solar flares are not taken into account, the gravitational influence of other planets and stars (except the Sun) is also not taken into account in these graphs.

The increase in the amplitude of the energy of Schumann resonances is caused in 85 percent of cases (in most cases) by the resonance of gravitational tides in electron clouds-fluids with the coincidence of the phases of motion of gravitational factors, in 15 percent of cases—by the solar wind, other electron flows from outside the planet.

Important. The correlations below show a connection between the resonance of gravitational tides—a jump in the energy of Schumann resonances. We are not looking at solar flares here, it is not predicted.

Data on the statistics of the energy level of Schumann resonances are provided from open sources and can easily be verified. This is data from GCI's Global Coherence Monitoring System.

Anyone can take any Schumann wave tracking station to check. It is only important to know the GPS coordinates of the tracking station. Next, anyone can calculate (it is important to be accurate to at least an hour) the moments of resonances of gravitational tides and superimpose some moments of time on others to check the correlation. Approximate accuracy of determining the moment of gravitational resonance geometrically—up to half a day (plus or minus 6 hours).

The following is a sequential calculation of the gravitational resonance moments for three Schumann wave tracking stations (with known GPS coordinates). In practice, the coordinates of the observation points can be indicated in calculations with some error, since the volume of the resonance occurring simultaneously is quite large, in a number of practical experiments, the resonance region was conventionally a ball with a diameter of 100 km or more.

| No | Station | GPS-coordinates |
|---|---|---|
| 1 | GCI002 Hofuf, Saudi Arabia | Latitude: 25° 22' 59.99" N Longitude: 49° 34' 59.99" E |
| 2 | GCI005 Northland, New Zealand | Latitude: 35° 34' 48.00" S Longitude: 173° 58' 12.00" E |
| 3 | GCI006 Hluhluwe, South Africa | Latitude: 28° 01' 60.00" S Longitude: 32° 16' 60.00" E |

There are a couple of gravitational factors that do not resonate with each other—the Barycenter is the distance to the observer (BOD, barycenter-observer distance) with the depth of the barycenter. Because you can't de facto gravitate with yourself. It is also noted that the two gravitating factors—the phase of the moon+the distance from the earth of the moon usually resonate weakly with each other, since they are mutually related, and at the same time the resonance needs more time to "mature" (up to half a day). All other combinations (intersections) of gravitational factors give strong resonances.

An interesting fact is that the intersection of two related factors (such as the depth of the barycenter+the distance from the observer to the barycenter) in some cases can "smooth out, reduce" the energy of the usual resonance, if they occur at about the same time.

Not all gravitating factors are listed here. The principle itself is shown here. It is clear that there are other gravitational factors, such as the gravitational field of Mars, Venus, stars, and so on, but they are conceptually not so important. Solar flares and streams of charged particles are also not taken into account.

Resonance can occur not only at the intersection of graphs. The simultaneous occurrence of extremes (for example, the maximum at one time) of two or more gravitational factors can also be the cause of the resonance of gravitational tides.

Two resonances close in time can "merge" into one (into one perturbation, into one "killer wave", into one jump in the amplitude of the Schumann resonance).

Figure 5:
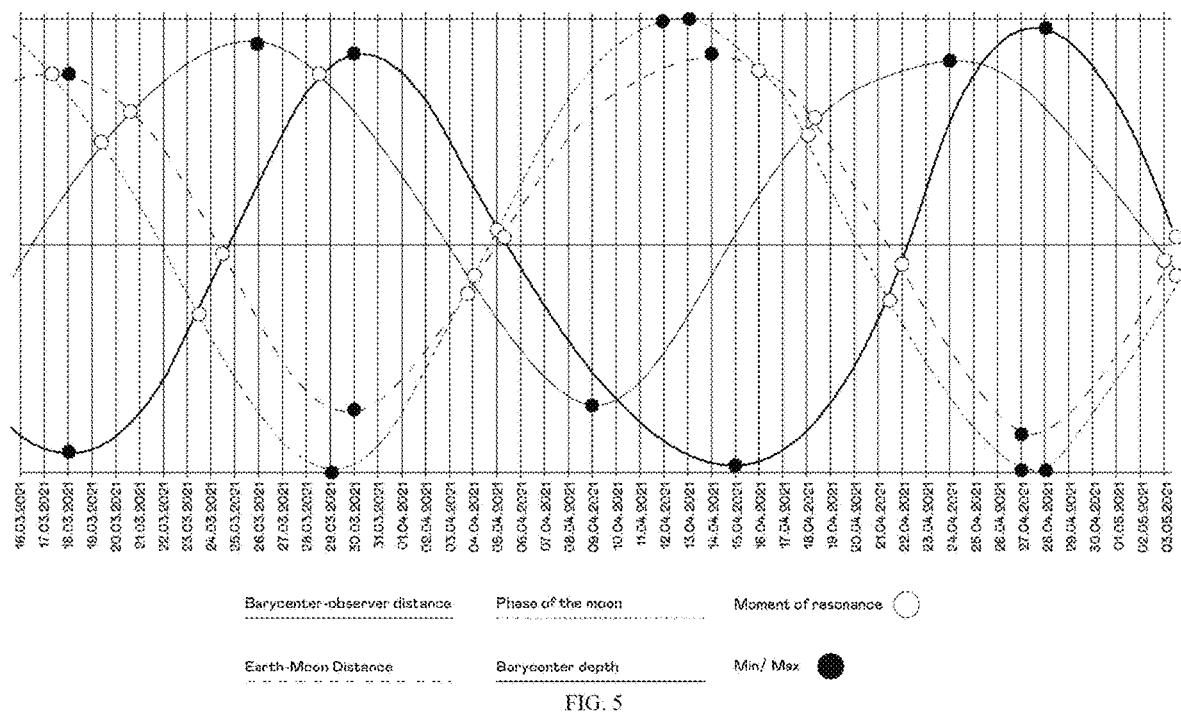
FIG. 5 shows calculated moments of gravitational tidal resonances for the GCI005 Northland, New Zealand (graphic view).
Figure 6:
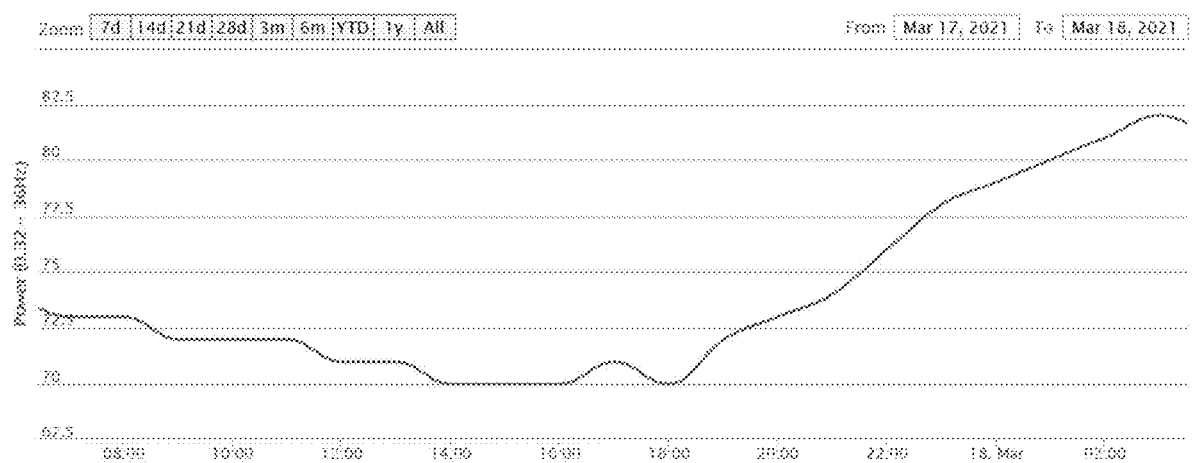
FIG. 6 shows the resonance number 1 (17.03.21) for the GCI005 Northland, New Zealand.
Figure 7:
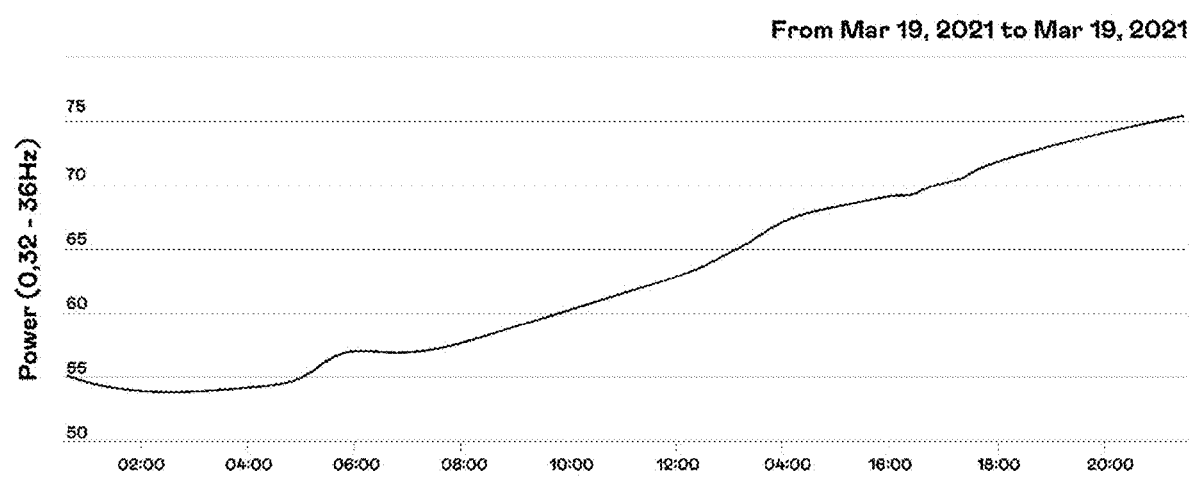
FIG. 7 shows the resonance number 2 (19.03.21) for the GCI005 Northland, New Zealand.
Figure 8:
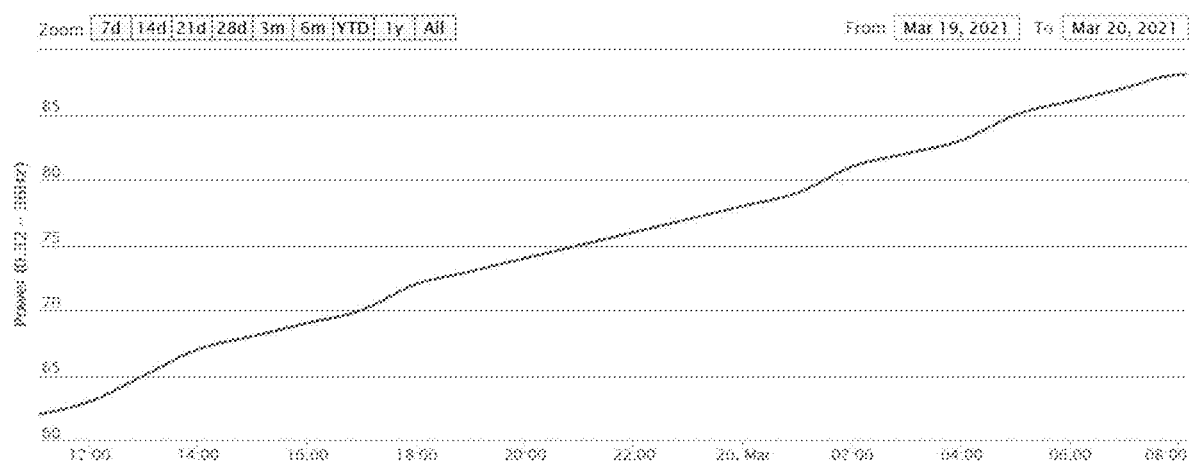
FIG. 8 shows the resonance number 3 (20.03.21) for the GCI005 Northland, New Zealand.
Figure 9:
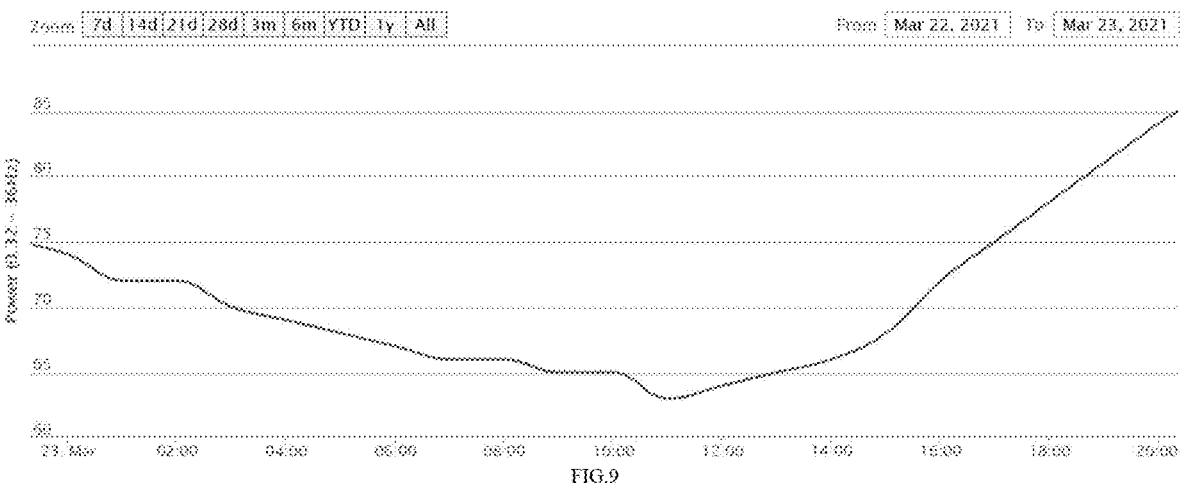
FIG. 9 shows the resonance number 4 (23.03.21) for the GCI005 Northland, New Zealand.
Figure 10:
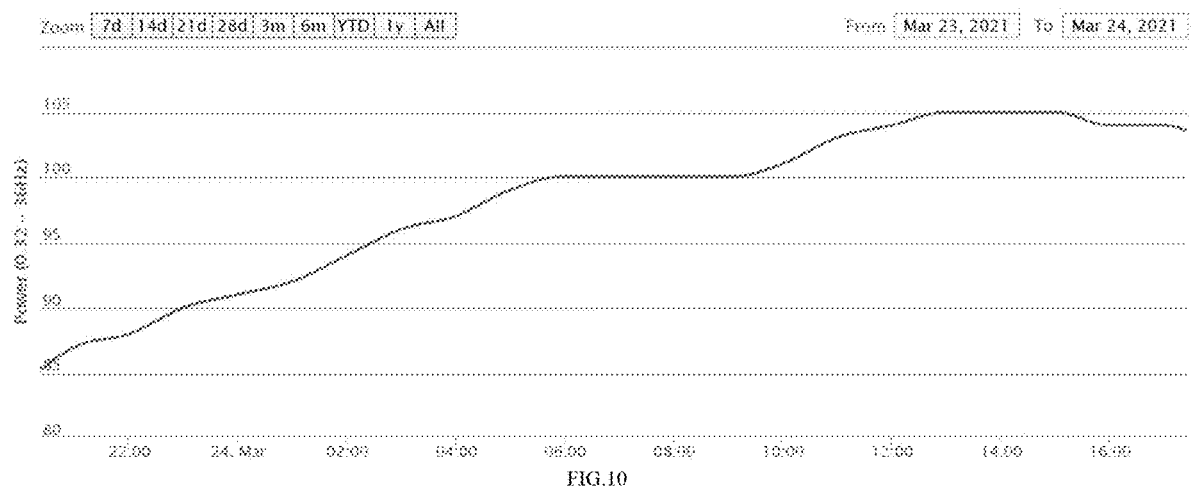
FIG. 10 shows the resonance number 5 (24.03.21) for the GCI005 Northland, New Zealand.
Figure 11:
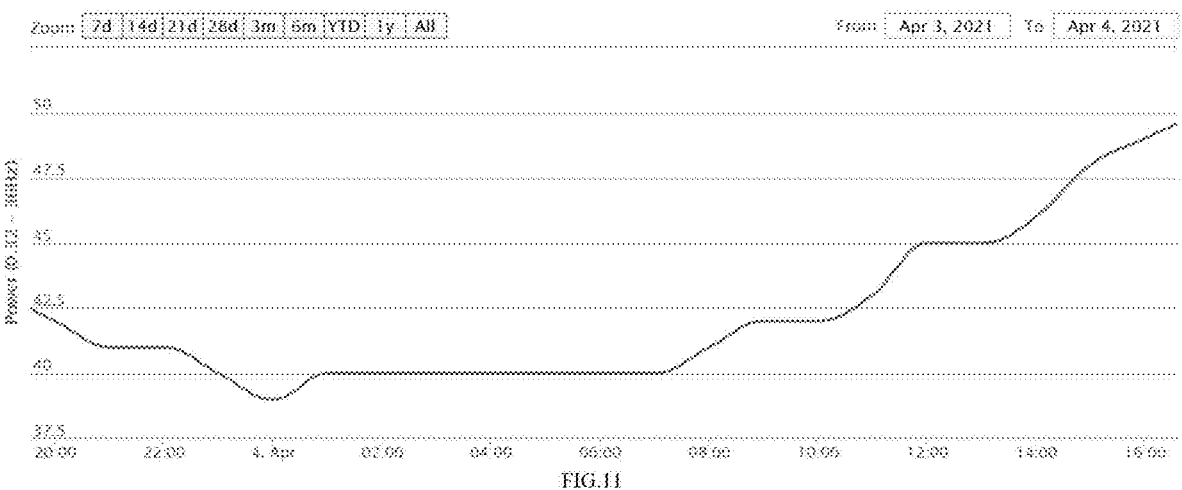
FIG. 11 shows the resonance number 6 (3-4.04.21) for the GCI005 Northland, New Zealand.
Figure 12:
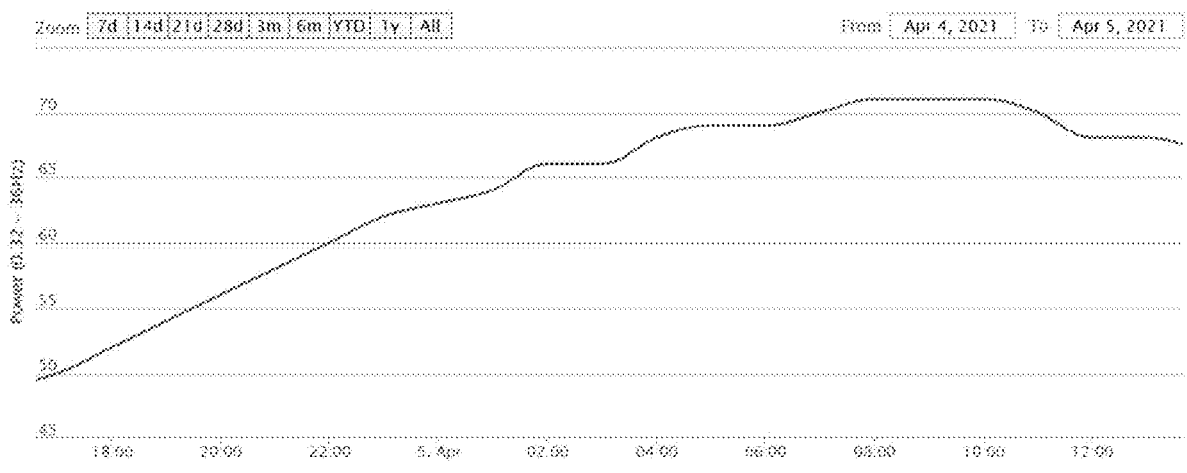
FIG. 12 shows the resonance number 7 (05.04.21) for the GCI005 Northland, New Zealand.
Figure 13:
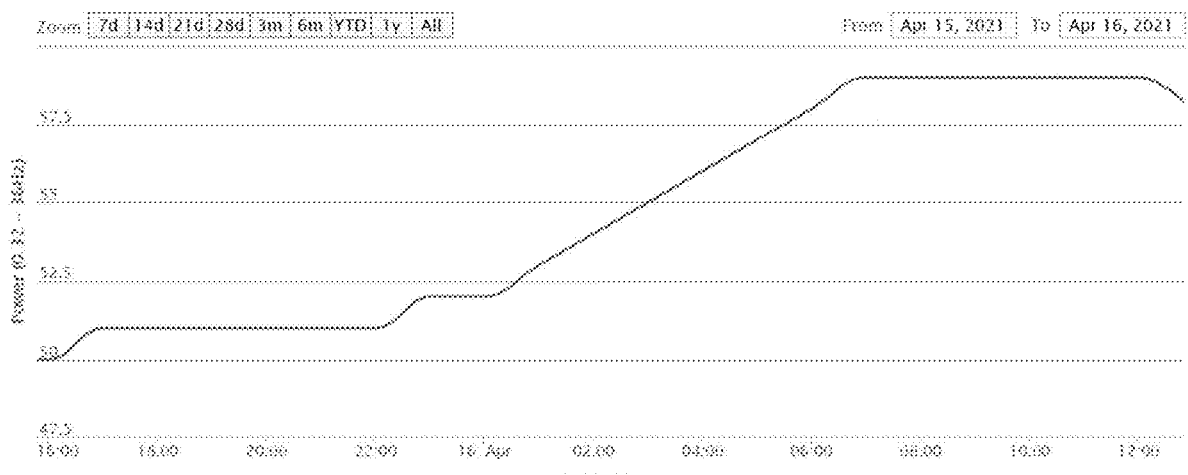
FIG. 13 shows the resonance number 8 (16.04.21) for the GCI005 Northland, New Zealand. Typical low-energy resonance of homogeneous gravitating factors.
Figure 14:
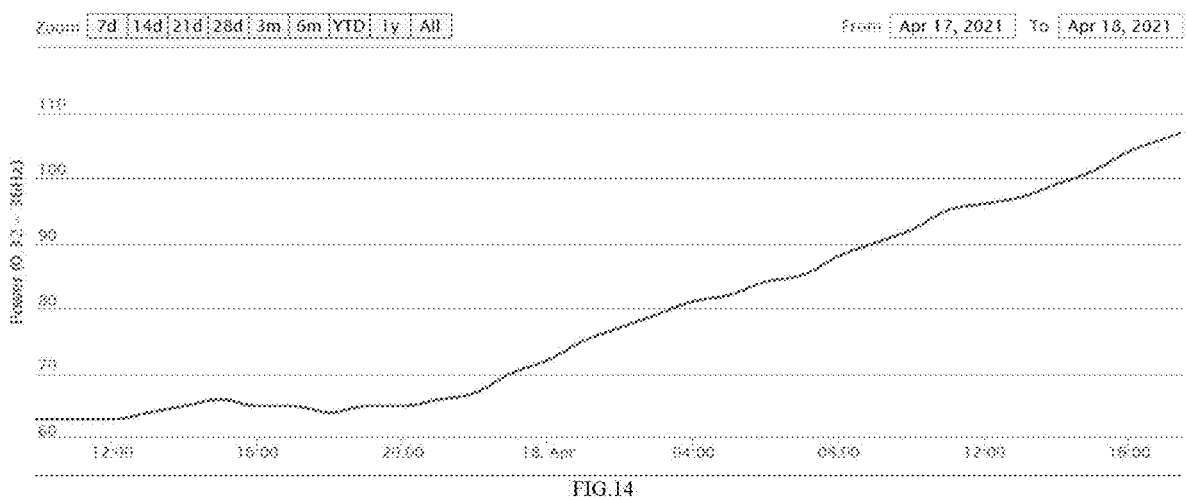
FIG. 14 shows the resonance number 8 (18.04.21) for the GCI005 Northland, New Zealand. Typical strong energetic resonance of inhomogeneous gravitating factors.
Figure 15:
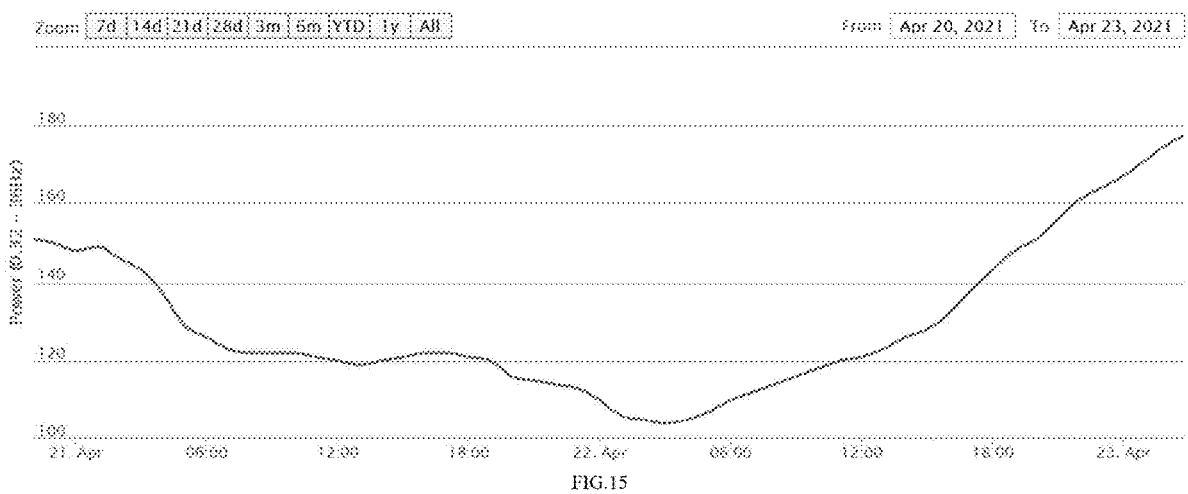
FIG. 15 shows the resonance number 10 (21-22.04.21) for the GCI005 Northland, New Zealand. This is an example of a long-maturing resonance. It often happens when there are two almost parallel gravitating factors on the graph.

FIG. 5 shows calculated moments of gravitational tidal resonances for the GCI005 Northland, New Zealand (graphic view).

Then compare the calculated moments of gravitational tidal resonances for GCI005 Northland, New Zealand (tabular view) and the fact of the growth of the energy (amplitude) of the Schumann wave during observation.

| No (Resonance number) | Calculated forecast points of the gravitational tidal resonance dates Date | Comment | The fact of the growth of the energy (amplitude) of the Schumann wave at the time of observation |
|---|---|---|---|
| 1 | 17, Mar. 2021 | The calculated forecast of the gravitational resonance coincided with the fact of the growth of the energy of the electromagnetic Schumann wave. | ✓ |
| 2 | 19, Mar. 2021 | The calculated forecast of the gravitational resonance coincided with the fact of the growth of the energy of the electromagnetic Schumann wave. | ✓ |

-continued

| No (Resonance number) | Calculated forecast points of the gravitational tidal resonance dates Date | Comment | The fact of the growth of the energy (amplitude) of the Schumann wave at the time of observation |
|---|---|---|---|
| 3 | 20, Mar. 2021 | The calculated forecast of the gravitational resonance coincided with the fact of the growth of the energy of the electromagnetic Schumann wave. | ✓ |
| 4 | 23, Mar. 2021 | The calculated forecast of the gravitational resonance coincided with the fact of the growth of the energy of the electromagnetic Schumann wave. | ✓ |
| 5 | 24, Mar. 2021 | The calculated forecast of the gravitational resonance coincided with the fact of the growth of the energy of the electromagnetic Schumann wave. | ✓ |
| 6 | 3-4, Apr. 2021 | The calculated forecast of the gravitational resonance coincided with the fact of the growth of the energy of the electromagnetic Schumann wave. | ✓ |
| 7 | 5, Apr. 2021 | The calculated forecast of the gravitational resonance coincided with the fact of the growth of the energy of the electromagnetic Schumann wave. | ✓ |
| 8 | 16, Apr. 2021 | This is only a demonstration that the simultaneous maximum (at one time) of two or more gravitational factors can also be the cause of the resonance of gravitational tides. The calculated forecast of the gravitational resonance coincided with the fact of the growth of the energy of the electromagnetic Schumann wave. | ✓ |
| 9 | 18, Apr. 2021 | Combining two resonances. The calculated forecast of the gravitational resonance coincided with the fact of the growth of the energy of the electromagnetic Schumann wave. | ✓ |
| 10 | 21-22, Apr. 2021 | Combining two resonances. The calculated forecast of the gravitational resonance coincided with the fact of the growth of the energy of the electromagnetic Schumann wave. | ✓ |

Real jumps in the amplitude of Schumann resonances, data from the tracking station (GCI005 Northland, New Zealand), step by step, resonance by resonance are shown in FIGS. 6-15.

Detailed Prediction of Flyby Anomaly.

Formulation of the causes of flyby anomaly. The Earth is not a perfect sphere, and its center of gravity fluctuates by a certain amount relative to any bodies in orbit (e.g., the Earth-Moon barycenter and the Moon itself are also constantly shifting). Therefore, when the Earth rotates and a satellite flies around the earth, the gravity for the satellite will change smoothly. At the resonances of the gravitational tides, depending on the position of the satellite (e.g., a spacecraft) relative to the current state of the Earth's center of gravity and the level of the oceans, during the high tide (or low tide), there will be a jump in the level of gravitational attraction of the satellite by the Earth. Hence, the satellite jumps up or down. Accordingly, the flyby anomaly can be explained without quantization of gravity and Kukharev energons. The section on energons is given below, because it is at the moments of resonances of gravitational tides and a sharp change in gravity that gravitational quantization can potentially be tracked through the Wilson chamber and other methods. By themselves, sharp jumps in gravity potentially speak precisely about the fact of quantization of gravity in the microcosm, as an addition to the macro resonance of tides. It is the resonances of gravitational tides that can be the point of justification of physics beyond the standard model.

Consider the "ground" flyby anomaly and pressure jumps for the gravitational field and pressure tracking station in Mizusawa (Japan, 39.1304N, 141.1368E, FIG. 81-104) in relation to the calculated resonance moments of the basic gravitational factors. Here, the word "basic" in relation to gravitational factors refers to factors only in the Earth-Moon-Sun system, without taking into account the influence of the factor of Mars, Venus, the barycenter of our Galaxy, the barycenter of a group of Galaxies, although these are also very important gravitational factors that can resonate with our "ordinary" gravitational masses (taking them into account will unnecessarily clutter the model).

The analyzed step-by-step statistics of the causes of a ground flyby anomaly for 1 full year on the example of the Japanese tracking station Mizusawa (39.1304N, 141.1368E) is presented in the following table.

| No | Actual date of ground flyby anomaly | What happened in terms of gravitational resonance | Comment on the strength of the oscillation in ugal/V |
|---|---|---|---|
| 1 | Jan. 4, 2010 | Sliding parallel EMD + PM. | Weak oscillation (<1) |
| 2 | Jan. 17, 2010 | BD minimum, intersection EMD + PM, intersection BD + ESD | Strong oscillation (>1) |
|   | Jan. 21-22, 2010 | Sliding parallel EMD + PM Intersection BOD − EMD, BOD − PM | Weak oscillation (<1) |
| 3 | Jan. 31, 2010 | Sliding parallel EMD + PM PM minimum BD max, intersection EMD + ESD | Weak oscillation (<1) |
| 4 | Feb. 1. 2010 | Sliding parallel EMD + PM, intersection PM + ESD | Weak oscillation (<1) |
| 5 | Feb. 4-5, 2010 | Sliding parallel EMD + PM, Intersection BOD − BD, BD − PM, BD − EMD, BOD − PM | Strong oscillation (>1) |
| 6 | Feb. 16, 2010 | Sliding parallel EMD + PM | Weak oscillation (<1) |
| 7 | Feb. 18, 2010 | Sliding parallel EMD + PM Intersection BD + ESD | Weak oscillation (<1) |
| 8 | Feb. 21, 2010 | Sliding parallel EMD + PM Intersection EMD + BD | Weak oscillation (<1) |
| 9 | Feb. 27, 2010 | Intersection EMD + PM EMD min BD max, tug of war | Very strong oscillation(>5) |
| 11 | Mar. 4, 2010 | Sliding parallel EMD + PM | Weak oscillation (<1) |
| 12 | Mar. 6, 2010 | Sliding parallel EMD + PM Intersection BD + EMD | Weak oscillation (<1) |
| 13 | Mar. 10, 2010 | Sliding parallel EMD + PM | Weak oscillation (<1) |
| 14 | Mar. 13-14, 2010 | Intersection EMD + PM, BD min, EMD max, tug of war | strong oscillation (>3) |
| 15 | Apr. 4, 2010 | Sliding parallel EMD + PM Intersection PM + BD, EMD + BOD | Weak oscillation (<1) |
| 16 | Apr. 7, 2010 | Sliding parallel EMD + PM Intersection ESD + PM + BOD | Weak oscillation (<1) |
| 17 | Apr. 25, 2010 | Intersection EMD + PM, EMD min, BD max, tug of war | Strong oscillation (>1) |
| 18 | May 3, 2010 | Sliding parallel EMD + PM, intersection BD + PM, BOD + EMD, ESD + PM | Weak oscillation (<1) |
| 19 | May 9, 2010 | Sliding parallel BD + PM, Intersection PM + ESD | Weak oscillation (<1) |
| 20 | May 12, 2010 | Sliding parallel BD + PM | Weak oscillation (<1) |
| 21 | May 22, 2010 | Tug of war - BD max, EMD min Intersection BOD + ESD | Weak oscillation (<1) |
| 22 | Jun. 1-2, 2010 | Sliding parallel EMD + PM, Intersection PM + BD | Strong oscillation (>1) |
| 23 | Jun. 6, 2010 | Intersection EMD + PM, intersection BOD + BD | Strong oscillation (>1) |
| 24 | Jun. 12, 2010 | Sliding parallel BOD + BD + PM, intersection BOD − EMD, PM max | Strong oscillation (>3) |
| 25 | Jun. 16, 2010 | EMD min, BD max (tug of war) | Weak oscillation (<1) |
| 26 | Jun. 18, 2010 | Intersection BOD − PM, BOD − BD | Weak oscillation (<1) |
| 27 | Jun. 27-28-29, 2010 | Sliding parallel EMD + PM, PM min, intersection BOD + EMD, BD + PM | Strong oscillation (>2) |

July (FIG. 94) is a separate month of the aphelion point passage, fluctuations are extremely strong all the time, resonances of the level of the Barycenter of our Galaxy - the Sun - the Earth correct the movement of the Earth around the Sun. The maximum of the ESD factor. The nodal point is interesting - July 12 reference point, PM max, intersection PM + ESD.

| 28 | Aug. 1-2, 2010 | Sliding parallel BD + PM | Weak oscillation (<1) |

-continued

| No | Actual date of ground flyby anomaly | What happened in terms of gravitational resonance | Comment on the strength of the oscillation in ugal/V |
|---|---|---|---|
| 29 | Aug. 3-4, 2010 | Intersection EMD + PM, intersection BOD + BD | Weak oscillation (<1) |
| 30 | Aug. 7, 2010 | Sliding parallel BD + PM, BOD min | Strong oscillation (>2) |
| 31 | Aug. 9-10, 2010 | EMD min, PM max, BD max (tug of war) | Strong oscillation (>3) |
| 32 | Aug. 14, 2010 | Sliding parallel BD + PM, intersection BOD + PM, BOD + BD | Weak oscillation (<1) |
| 33 | Aug. 21, 2010 | Sliding parallel BD + PM | Weak oscillation (<1) |
| 34 | Aug. 25-26, 2010 | EMD max, PM min, BD min - tug of war, intersection BOD + EMD, BD + PM, BOD + ESD | Weak oscillation (<1) |
| 35 | Aug. 27-30, 2010 | Sliding parallel BD + PM, intersection EMD + ESD | Strong oscillation (>2) |
| 36 | Sep. 1, 2010 | Sliding parallel BD + EMD | Strong oscillation (>4) |
| 37 | Sep. 3, 2010 | Sliding parallel BD + PM | Strong oscillation (>1) |
| 38 | Sep. 11, 2010 | Sliding parallel BD + PM, intersection BOD + BD, BOD + ESD | Strong oscillation (>1) |
| 39 | Sep. 13, 2010 | Sliding parallel BD + PM, intersection BD + EMD, PM + ESD | Strong oscillation (>5) |
| 40 | Sep. 17, 2010 | Sliding parallel BD + PM | Strong oscillation (>2) |
| 41 | Sep. 21, 2010 | EBD max, BD min | Strong oscillation (>2) |
| 42 | Sep. 27, 2010 | Sliding parallel BD + PM, intersection BOD + ESD | Strong oscillation (>2) |
| 43 | Sep. 29-30, 2010 | Sliding parallel BD + PM, intersection BOD + PM, BOD + BD, BOD + ESD, ESD + EMD | Strong oscillation (>2) |
| 44 | Oct. 4, 2010 | Sliding parallel BD + PM | Strong oscillation (>1) |
| 45 | Oct. 8, 2010 | EBD min, PM max, BD max tug of war, intersection BOD + ESD | Strong oscillation (>3) |
| 46 | Oct. 14-15, 2010 | Sliding parallel BD + PM | Strong oscillation (>3) |
| 47 | Oct. 24-25, 2010 | Sliding parallel BD + PM, intersection ESD+BD | Strong oscillation (>1) |
| 48 | Nov. 4-5, 2010 | EBD min, BD max, tug of war | Weak oscillation (<1) |
| 49 | Nov. 18-19, 2010 | Sliding parallel EMD + BOD, intersection PM + BD, ESD + PM, ESD + BD | Strong oscillation (>1) |
| 50 | Nov. 24, 2010 | Sliding parallel BD + PM, intersection BD − BOD | Strong oscillation (>1) |
| 51 | Nov. 29-30, 2010 | BOD min, EMD min, intersection BOD + EMD | Strong oscillation (>3) |
| 52 | Dec. 6, 2010 | PM max, intersection BOD + BD, BD + EMD | Strong oscillation (>4) |
| 53 | Dec. 9, 2010 | Sliding parallel BD + PM | Strong oscillation (>2) |
| 54 | Dec. 14-15, 2010 | Tug of war, BD min, EMD max, BOD max | Strong oscillation (>1) |
| 55 | Dec. 21-22, 2010 | Sliding parallel EMD + BOD, intersection ESD + PM | Strong oscillation (>1) |
| 56 | Dec. 25, 2010 | EMD min, BD max, tug of war | Strong oscillation (>1) |

General Conclusions from Patterns of Occurrence of Flyby Anomaly:

1. In most cases, flyby anomaly occurs at those moments in time when the movement of different types of gravitational factors becomes parallel (in a normalized graph). The main gravitating factors in the Earth-Moon-Sun system are EMD (Earth-Moon Distance), BD (Barycenter depth), PM (Phase of the Moon), BOD (Barycenter-observer distance), and ESD (Earth-Sun distance). Additional gravitational factors are also the change in the distance from the Earth to the barycenter of our galaxy, the barycenter of a group of galaxies, and the distance from the Earth to the planets of the solar system. The greatest attention should be paid to the pairs, EMD+PM (usually the first six months), BD+PM (the second six months), since these two pairs of factors essentially create the majority of flyby anomalies. At the same time, it is important to keep an eye on those most likely moments of time for flyby anomaly when EMD+PM or BD+PM are parallel, when they are "punched", the gravitational factor crosses the distance from the Earth to the Sun (Earth-Sun distance). The Earth passes perihelion usually on January 2-7 every year, and aphelion—on about July 2-7 every year. These points are conceptually nodal for changing one main pair of gravitational factors during the formation of flyby anomaly to another pair.

2. In some cases, flyby anomaly occurs at those moments of time when there is a "tug of war" at the gravitational-tidal level, different gravitational factors are at one time in extremes (minima/maxima). If point 2 occurs simultaneously with point 1, then this usually increases the likelihood and strength of flyby anomaly.

3. Direct individual resonances of tides (intersection)

When two gravitating factors move in a normalized graph in parallel, fluctuations are also possible between them. In fact, these two oscillating lines, they also resonate, interfere, but we do not have exact frequencies and phases, we work at the level of matter. The factors are parallel, but in fact in the macrocosm these are fluctuations that can interfere, that's when flyby anomaly can occur. Flyby anomaly is the work of a macro system (but perhaps from its principles you can go further to the microcosm, through the search for energons at these points in time).

Important note. With an increase in the sensitivity of gravimeters and the quality of data, it is possible to draw lines parallel to the time axis and watch their intersections with graphs of gravitational factors. These straight lines should reflect gravitational factors, in relation to which the movement of the Earth in space for local periods of time (let's assume up to a year) is insignificant. So, for example, in relation to the barycenter of the Galaxy, the entire movement of the Earth for a year is insignificant, respectively, the graph of this gravitational factor (the distance from the Earth to the center of the galaxy) can be represented by a straight line. The gravitational factor of the change in the distance from the Earth to the Sun, for example, is also a sinusoidal line running during each year from perihelion to aphelion. Such a scheme will allow us to find out different significant gravitational factors.

That is, even if you did not know, for example, about the aphelion point, you could see that with a periodicity of 1 year in July there are constant July bursts, gravitational resonances, which, among other things, cause overload of gravimeters. Similarly, by choosing different periods, it is possible to find significant gravitational factors (for example, the gravitational resonance with the distance to Mars should be weakly manifested every two years).

You can see some stunningly beautiful gravitational resonances (FIGS. 94, 105-109) that occur at the "turning" points of the Earth's orbit, in particular at the aphelion point. The aphelion point for planet Earth is the most distant point of the Earth's orbit from the Sun. For 2010, this point was passed on July 6. Here it is noted that for such points it is necessary to solve the multifactorial problem of gravitational resonance, and in resonances of this kind, in addition to the standard gravitational factors of the Earth-Moon-Sun system, other factors should participate, primarily the distance to the barycenter of the Milky Way galaxy, the distance to the nearest point influencing the movement of the Sun. At such times, the K-regions adjust the Earth's orbit.

In total, a flyby anomaly is created precisely by gravitational resonance. Gravity jumps in the solar system are associated with resonances of gravitating planets, asteroid zones. The abrupt return of planets to Newtonian orbits is the result of gravitational resonance. Newtonian orbits are orbits that correspond to the law of Universal gravitation, from the orbits of which some objects sometimes deviate.

There are direct multiple "tugs of war", which in total give zero effect for gravity (for example, Mar. 28, 2010 simultaneously BOD max, BD max, EMD min, without parallel sliding EMD+PM). This is just an example of achieving balance. And there are also many examples when the "tug of war" between different gravitating factors in extremes leads to malfunction of modern gravimeters (going beyond the possible limits of sensitivity of their range). In some cases, in practice, such gravimeter data is either artificially corrected or maximum values are set. Meanwhile, such nodal points are also very important from a fundamental point of view. At such key turning points of the orbit (such as the aphelion point) when the most powerful gravitational resonances are working, many of the most modern gravimeters begin to fail, go beyond the calibration range, gravimeters turn off, show different huge values. This should be taken into account and it should be understood that it is not the magnitude of the fluctuations that is more important here, but the moments of time when this happens.

During perihelion and aphelion, the tides and resonances will be different because during the passage of these sections of the orbit, the speed of the Earth relative to the Sun changes. Also, while maintaining the angle of inclination of the Earth's axis of rotation relative to the ecliptic, the northern hemisphere is poorly illuminated by the Sun in winter compared to summer. Given that the Earth is not a sphere, but an ellipsoid of complex shape, the gravity/attraction of the Sun and Moon will inevitably fluctuate in time and in different parts of the orbit.

Additional Statistical Proof of the Existence of Kukharev Regions (on the Seas and Oceans in Terms of the Transformation of Water Fluids into Killer Waves (Rogue Waves))

Here is a table with known facts of the formation of giant killer waves (information from open sources)

| No | Date | GPS coordinates |
|---|---|---|
| 1 | Jan. 1, 1995 14:20:09 UTC, Draupner Wave 25.6 meters | 58°11'19.30"N 2°28'0.00"E |
| 2 | Feb. 24, 2008, 21:19 UTC (Harvest, CA), 18.95 meters | 34°27.24'N, 120°46.83'W |

Figure 16:
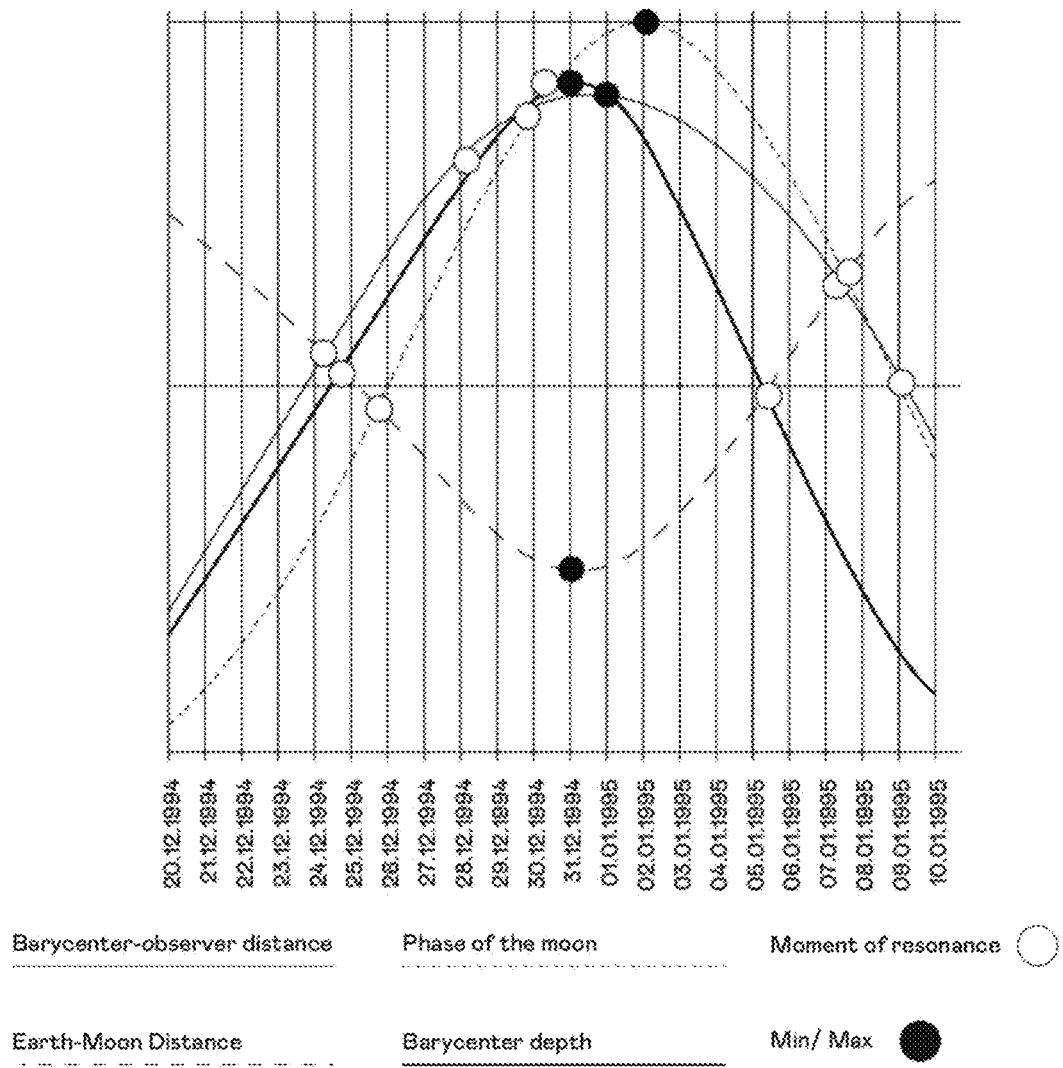
FIG. 16 shows the formation of the powerful resonance of gravitational tides, which created a wave Graupner 01.01.1995 (case No 1). 58° 11'19.30"N 2° 28'0.00"E.
Figure 17:
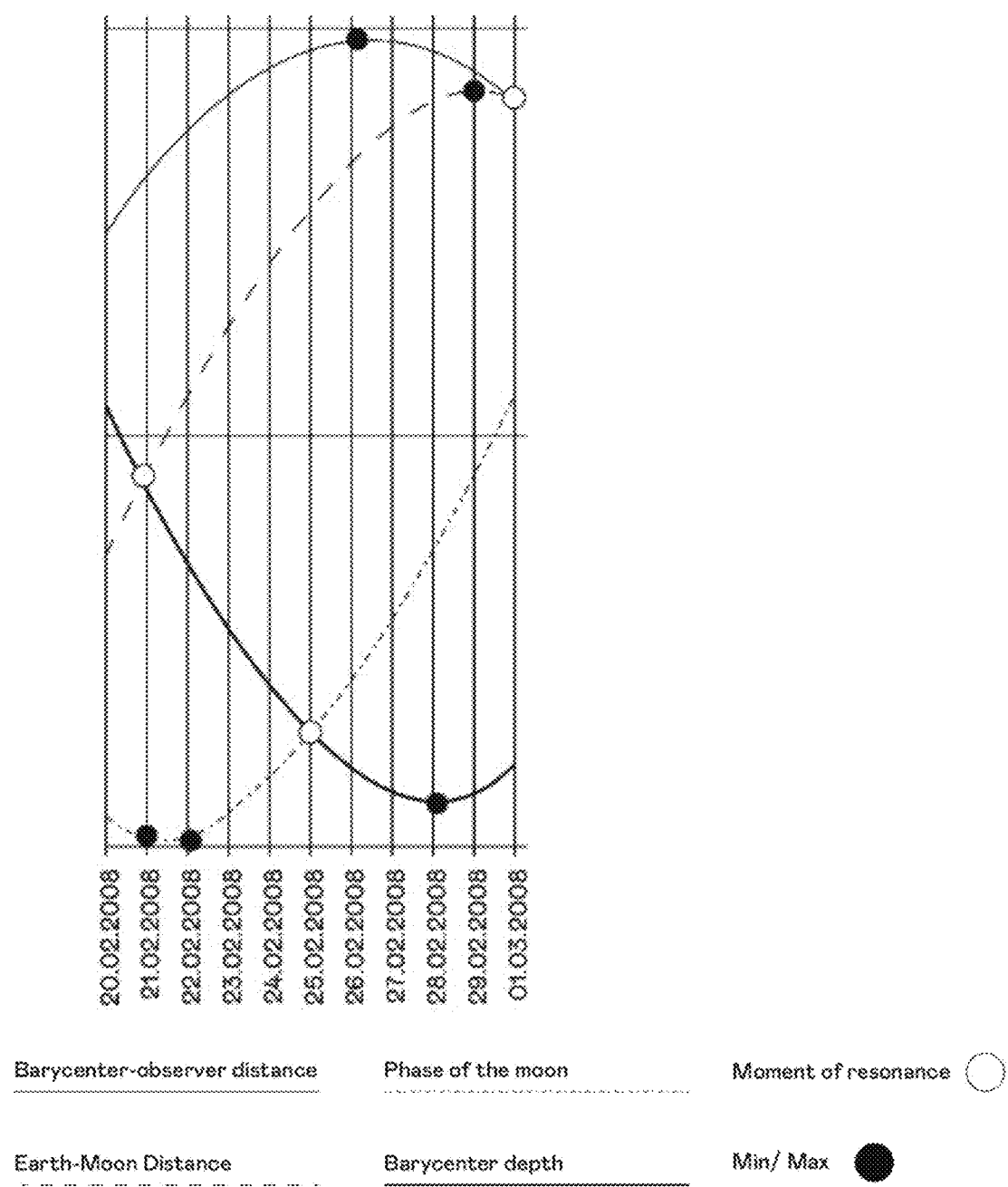
FIG. 17 shows the formation of a resonance of gravitational tides in the night/24.02.1995 on 25.02.1995 (58° 11'19.30"N 2° 28'0.00"E).

FIGS. 16-17 clearly show the formation of resonances of gravitational tides, which created the killer waves.

The author wanted to note that the resonance of several tides during the formation of killer waves is a complex process. Each gravitational factor "leads" many tides over a significant area. And these tides from different gravitational factors can resonate with each other for a considerable time.

Examples for Predicting Killer Waves (Rogue Waves).

Let's consider a table with ships that officially died for maritime reasons from the point of view of gravitational resonance.

| The name of the ship | The date of the crash | Official information | The coordinates of the crash | What happened in terms of gravitational resonance |
|---|---|---|---|---|
| Estonia | Sep. 28, 1994 | A cruise ferry that sank during a storm and claimed the lives of 852 people. | 59°23'N 21°42'E | Parallel sliding BD + PM, intersection ESD + PM |

-continued

| The name of the ship | The date of the crash | Official information | The coordinates of the crash | What happened in terms of gravitational resonance |
|---|---|---|---|---|
| Jan Hueliusz | Jan. 14, 1993 | A Polish ferry that capsized during a hurricane wind off Cape Arkona, Germany. | 54°36'N 14°13'E | Parallel sliding BOD + PM |
| Arlington | May 1, 1940 | A steamer that collapsed in a rough sea. | 48.458° N 87.670° W | Sliding parallel EMD + PM, crossing BOD + EMD, ESD + PM |
| Edmund Fitzgerald | Nov. 10, 1975 | Lost during a storm on Lake Superior, the Fitzgerald is one of the largest ships sunk in the Great Lakes. The exact cause of the disaster has not been clarified and has become the subject of numerous discussions. | 46°59.91'N 85°06.61'W | Parallel sliding BD + PM, Intersection ESD+BD |
| SS Isaac M. Scott | Nov. 9, 1913 | Cargo ship on the lake, sunk during a storm on the Great Lakes in 1913. | 45°03'N 83°02'W | EMD max, BD min. Tug of war. Intersection PM+ESD |
| Anna S. Minch | Nov. 11, 1940 | A cargo ship that broke in two and sank during a snowstorm on Armistice Day. | 43.787° N 86.531° W | EMD max, BD min. Tug of war. |
| Comfort | Jun. 17, 2013 | A container ship that collapsed in bad weather | 14°26'N 66°26'E | Sliding parallel EMD + PM, intersection of BD + PM, BD + EMD |

That is, the same killer waves can be considered primarily as addition, resonance of 2 or more macro-waves at one point. The same gravity jumps as in flyby anomaly cause storms and superwaves.

The following table shows the facts when it was the killer waves that led to the loss of ships and human casualties.

| No | Date | Location | Damage from rogue wave | Approximate coordinates | What happened in terms of gravitational resonance |
|---|---|---|---|---|---|
| 1 | 12, Nov. 2006 | off Port of Coos Bay, USA (Pacific Ocean) | 1 injury, ship damage | 43°21'59.4036" N 124°13'4.3968" W | Sliding PM + EMD Intersection EMD + BD |
| 2 | 27, Mar. 2006 | 2 miles off Cape Peninsula (South Africa) | 5 fatalities, ship loss | 34.27 S 18.459 E | Intersection PM + BD BD max |
| 3 | 23, Apr. 2006 | Cape Pillar (Tasmania) | 3 fatality, 2 injuries, ship loss | 43.22082 S 148.009 E | BOD min |
| 4 | 8, Jun. 2006 | Moruga Seas (Trinidad and Tobago) | 1 fatality, 3 injuries, ship damage | 10°06'42.23" N - 61°17'9.06" W | Sliding PM + EMD |
| 5 | 30, Jul. 2006 | Lagos(South Africa) | fatality, injuries, ship damage | 6° 27" N 3° 24" E. | Tug of war BD min, EMD max |
| 6 | 12, Aug. 2006 | Malaga (Spain) | fatality, injuries | 36° 43' 9.9984" N 4° 25' 12.0000" W | Tug of war BD max, EMD min Sliding EMD + BOD |
| 7 | 24, Aug. 2006 | Hoy, Orkney Islands, (UK) | 2 fatalities, ship loss | 58.83 N 3.3 W | PM max |
| 8 | 23, Sep. 2006 | Porth Ceiriad (UK) | 1 fatality, injuries | 52.8 N 4.5 W | Tug of war PM max, BD max, EMD max |

-continued

| No | Date | Location | Damage from rogue wave | Approximate coordinates | What happened in terms of gravitational resonance |
|---|---|---|---|---|---|
| 9 | 5, Nov. 2006 | Rakaia River (New Zealand) | 2 injuries | 43.54S 172 E | Sliding PM + EMD |
| 10 | 23, Mar. 2007 | Point Cartwright (Australia) | 3 injuries | 26.679 S 153.14 E | Sliding PM + BD, Intersection BOD + PM, BOD + BD |
| 11 | 5, May 2007 | Tasmania (Australia) | 1 injury, ship damage | 42.88 S 147.32E | Sliding PM + BD |
| 12 | 12, May 2007 | Reunion | 2 fatalities, ship loss | 20.88S 55.45E | Sliding PM + BD |
| 13 | 24, May 2007 | Rakit Island (Indonesia) | 11 fatalities, ship damage | 8.5S 117.49E | Sliding PM + BD, BOD->max |
| 14 | 12, Sep. 2008 | Durban (South Africa) | 1 fatality, 2 injuries | 29.88S 31.05E | Sliding PM + EMD + BOD, Intersection BOD + BD |
| 15 | 19, Apr. 2010 | Hokianga Bar (New Zealand) | Ship damage | 35.52S 173.38E | Sliding BD + BOD |
| 16 | 5, Oct. 2010 | Porthleven Sands (UK) | Ship damage | 50.08N 5.3W | Intersection PM + BD |
| 17 | 10, Nov. 2010 | Dikwella (Sri Lanka) | Ship damage | 5.97N 80.68E | Sliding PM + BD |

Temperature Prediction Technique

K-regions in the stratopause warm up the atmosphere due to an increase in the energy/amplitude of electromagnetic Schumann waves. This is the influence of K-regions on the entire atmosphere. K-regions are an example of a constant pumping of energy into the atmosphere. When the gravitational factors are at extremes, then this is physically the stage of stretching of the lithosphere, when pressure and temperature generally decrease (and this usually lasts 2-3 days at the interval with the center at the time of extremes), de facto this is a different kind of resonance. It is important to understand that temperature determines pressure, and pressure is associated not only with temperature, but also with tides and their resonances in the lithosphere. These factors (atmospheric pressure, temperature, gravitational tides and their resonances) manifest themselves depending on the significance/magnitude/of each factor in the formation of the integral effect. For example, an additional factor of temperature change may be atmospheric cyclones—anticyclones under the influence of uneven heating of the oceans. The influence of atmospheric cyclones/anticyclones can be taken into account by using weather maps in the area at the time of interest (that is, using global observation networks to create a continuous weather forecast). You also need to consider the "environment" the point for which the forecast is made, whether the climate is continental with stable pressure and so on. That is, for the forecast, it is necessary to look at the type of local system for which the forecast is made, whether the system can be considered isochoric, isobaric, isothermal or adiabatic. And then look for a specific system what effect gravitational resonances have.

Figure 114:
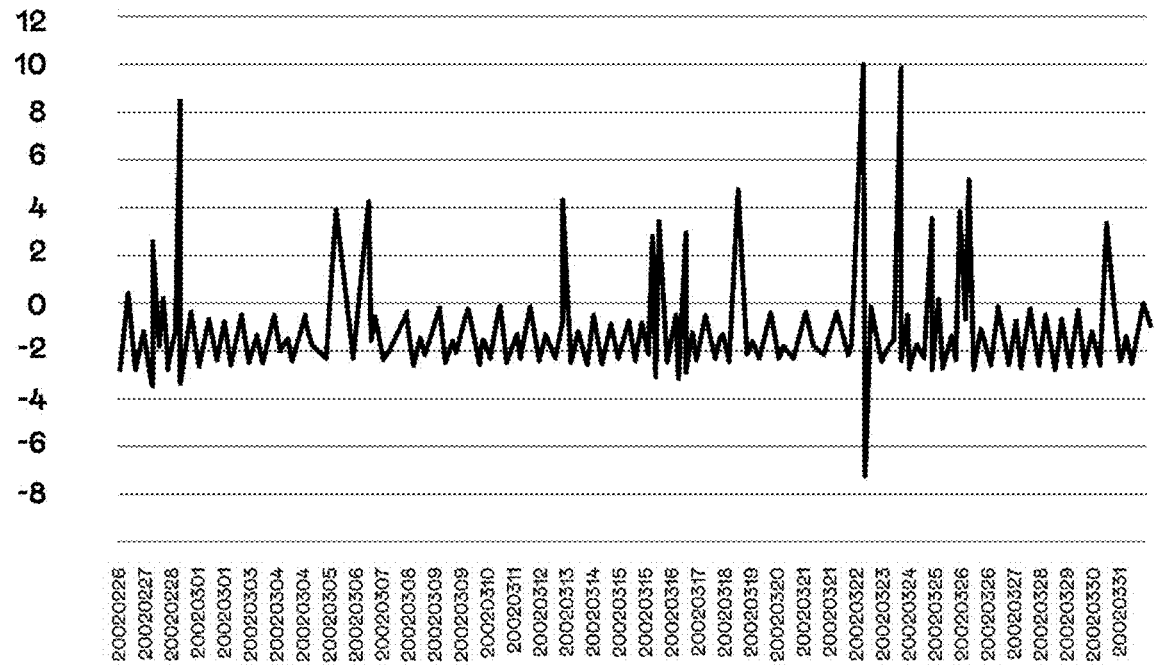
FIG. 114 shows the changes in gravity for Boulder (Colorado, USA) in March 2002.
Figure 115:
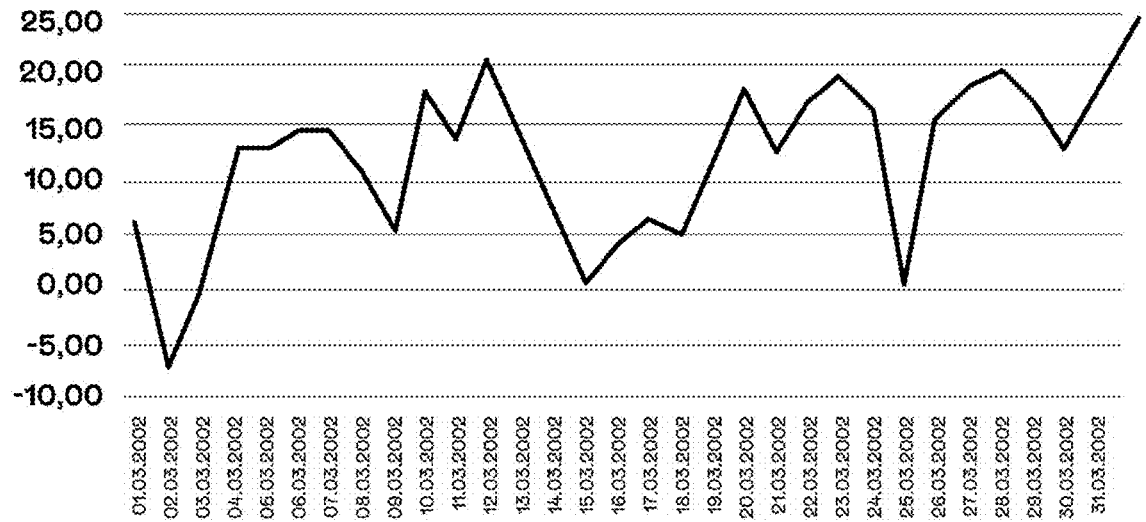
FIG. 115 shows the changes in temperature for Boulder (Colorado, USA) in March 2002.
Figure 116:
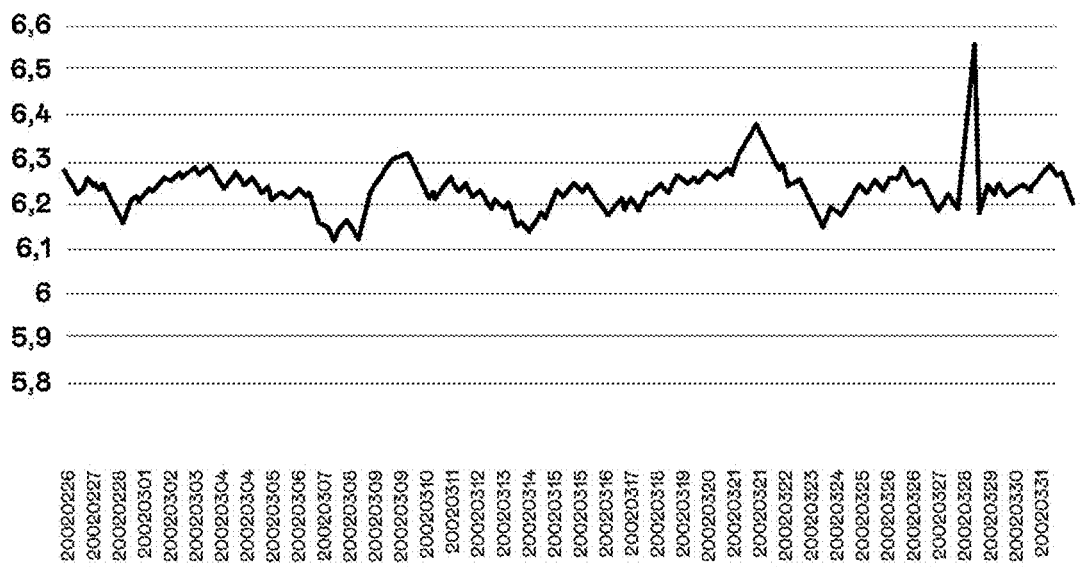
FIG. 116 shows the changes in atmospheric pressure for Boulder (Colorado, USA) in March 2002.
Figure 117:
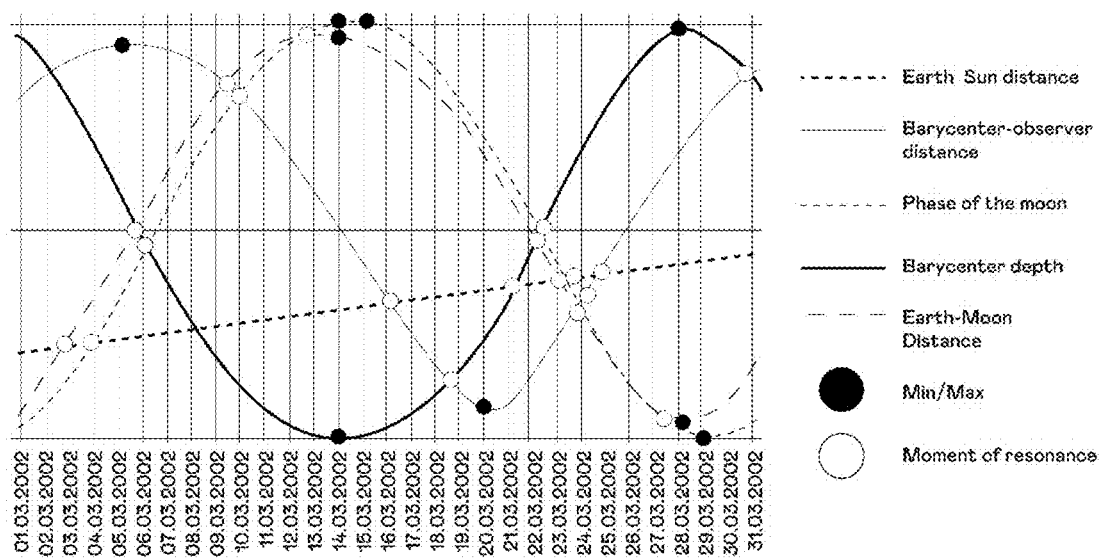
FIG. 117 shows dynamic of gravitational factors for Boulder (Colorado, USA) in March 2002.

FIGS. 114-116 show graphs of changes in gravity, pressure and temperature for the city of Boulder (Colorado, USA, center, continental climate with approximately stable pressure) in March 2002, and FIG. 117 shows the dynamics of gravitational factors for the same place and time. It is important to look at the dynamics, and also take into account that the time in Boulder lags behind Greenwich by 7 hours (the dynamics of the gravitational factors in FIG. 117 is made by Greenwich). The stages of stretching of the lithosphere are clearly visible when the gravitational factors are at extremes, and this causes a drop in pressure and temperature. Intersections/resonance of gravitational factors, their parallel sliding causes an increase in temperature (since these types of resonances, among other things, directly affect the formation of strong Kukharev regions in the stratopause, increasing the energy and amplitude of electromagnetic waves, warming up the atmosphere).

Table of the main temperature jumps in Boulder City (Colorado, USA) with the reasons.

| No | Date | The fact of the temperature jump | The root cause. Gravitational resonance. What happened in terms of gravitational resonance | The fact of ground flyby anomaly | Atmospheric pressure (significant essence) |
|---|---|---|---|---|---|
| 1 | 1-2, Mar. 2002 (continued from February) | Decrease | BD max, PM min, EMD min. Tug of War. Stage of lithosphere stretching (transition from February). | + | Decrease from the extreme point on February 28 to March 1 |
| 2 | 2-3, Mar. 2002 | Increase | Warming up from the Kukharev regions in the stratopause (and other points). The resonance of the tides. Intersection BOD + BD, EMD + ESD | − | Stable |

-continued

| No | Date | The fact of the temperature jump | The root cause. Gravitational resonance. What happened in terms of gravitational resonance | The fact of ground flyby anomaly | Atmospheric pressure (significant essence) |
|---|---|---|---|---|---|
| 3 | 9-10, Mar. 2002 | Increase | Warming up from the Kukharev regions in the stratopause (and other points). The resonance of the tides. Sliding PM + EMD, Intersection PM + BOD, EMD + BOD | − | Increase |
| 4 | 12, Mar. 2002 | Increase | Warming up from the Kukharev regions in the stratopause (and other points). The resonance of the tides. Intersection PM + EMD | + | Stable |
| 5 | 13-14, Mar. 2002 | Decrease | BD min, PM max, EMD max. Tug of War. Stage of lithosphere stretching. | + | Decrease |
| 6 | 16, Mar. 2002 | Increase | Warming up from the Kukharev regions in the stratopause (and other points). The resonance of the tides. Sliding PM + EMD, Intersection BOD + ESD | + | Fluctuations |
| 7 | 18-20, Mar. 2002 | Increase | Warming up from the Kukharev regions in the stratopause (and other points). The resonance of the tides. Sliding PM + EMD, Intersection BOD + BD | + | Stable |
| 8 | 23-25, Mar. 2002 | Decrease | Simultaneous multiple multidirectional resonances of tides (which, among other things, stretch the lithosphere). ESD + PM, ESD + EMD, ESD + BOD, BOD + PM, BOD + EMD, Sliding PM + EMD | + | Fluctuations |
| 9 | 25-27, Mar. 2002 | Increase | Warming up from the Kukharev regions in the stratopause (and other points). The resonance of the tides. Sliding PM + EMD, Intersection BOD + ESD | + | Fluctuations |
| 10 | 28-30, Mar. 2002 | Decrease | Sliding PM + EMD, Intersection ESD + BOD. Tug of War. Stage of lithosphere stretching. | + | Fluctuations |
| 11 | 30-31, Mar. 2002 | Increase | Warming up from the Kukharev regions in the stratopause (and other points). The resonance of the tides. Intersection BOD + BD | + | Fluctuations |

A cyclone is an area of low atmospheric pressure with a certain system of winds blowing from the edges to the center and deviating counter-clockwise. A cyclone is an area of low pressure. The cyclone is covered by a system of circular winds. The air in such a vortex moves in a spiral around the center and slowly approaches it, moving counter-clockwise in the Northern hemisphere with some deviation in the lower layer to the center, and in the Southern hemisphere—clockwise with the same deviation in the lower layer. Since large masses of warm moist air accumulate in the center, a significant part of it rushes up, where it cools, resulting in high-density clouds, long-lasting precipitation. When the pressure in the center begins to rise, the cyclone collapses. Gravitational resonances during the formation of low pressure "prolong the life" of cyclones, and also create new cyclones (if there is enough energy).

An anticyclone is an area with high pressure, where winds blow from the center to the edges and are directed clockwise in the Northern Hemisphere, and vice versa in the Southern Hemisphere. The great red spot of Jupiter (anticyclone) is an example of how there is a constant injection of energy at moments of gravitational resonances. And since Jupiter is a gas giant, the energy of the gravitational resonance increases the temperature, and the pressure also increases.

Migraines, Menstruation, and Other Fluctuations of Human Cells as a Consequence of the Resonance of Gravitational Tides There are many statistical studies suggesting that the closer a person lives (in latitude) to the barycenter, the more residents experience migraines. It's like if you move from the equator to one of the poles, then there is a conditional minimum at the equator, and the closer to the latitude of the barycenter, the greater the number of resonances. The location of the barycenter, as a gravitational factor, of course, is constantly changing, but there are latitudes at which it happens more often than others.

The correlation of Schumann resonances and heart attacks was also known, but no one understood before this work that the root cause of all this was the resonance of several gravitational tides.

Figure 18:
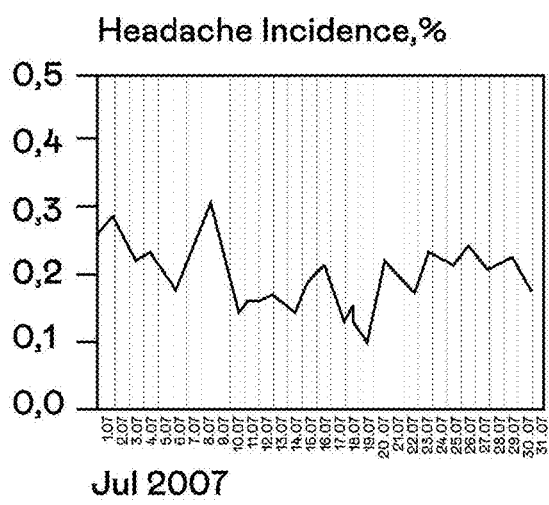
FIG. 18 shows headache incidences for 2007 in Taipei (Taiwan).
Figure 18:
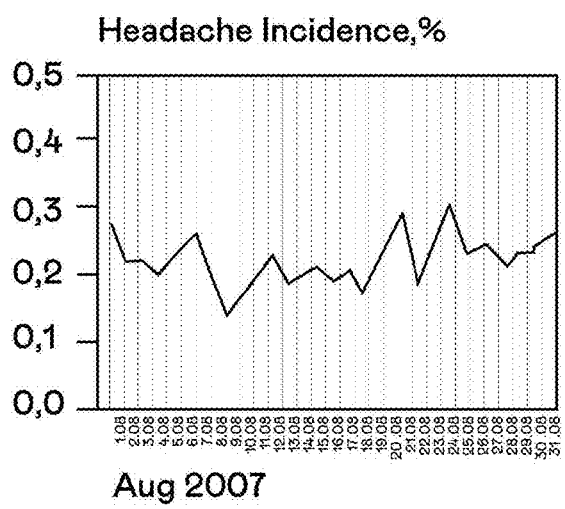
Figure 19:
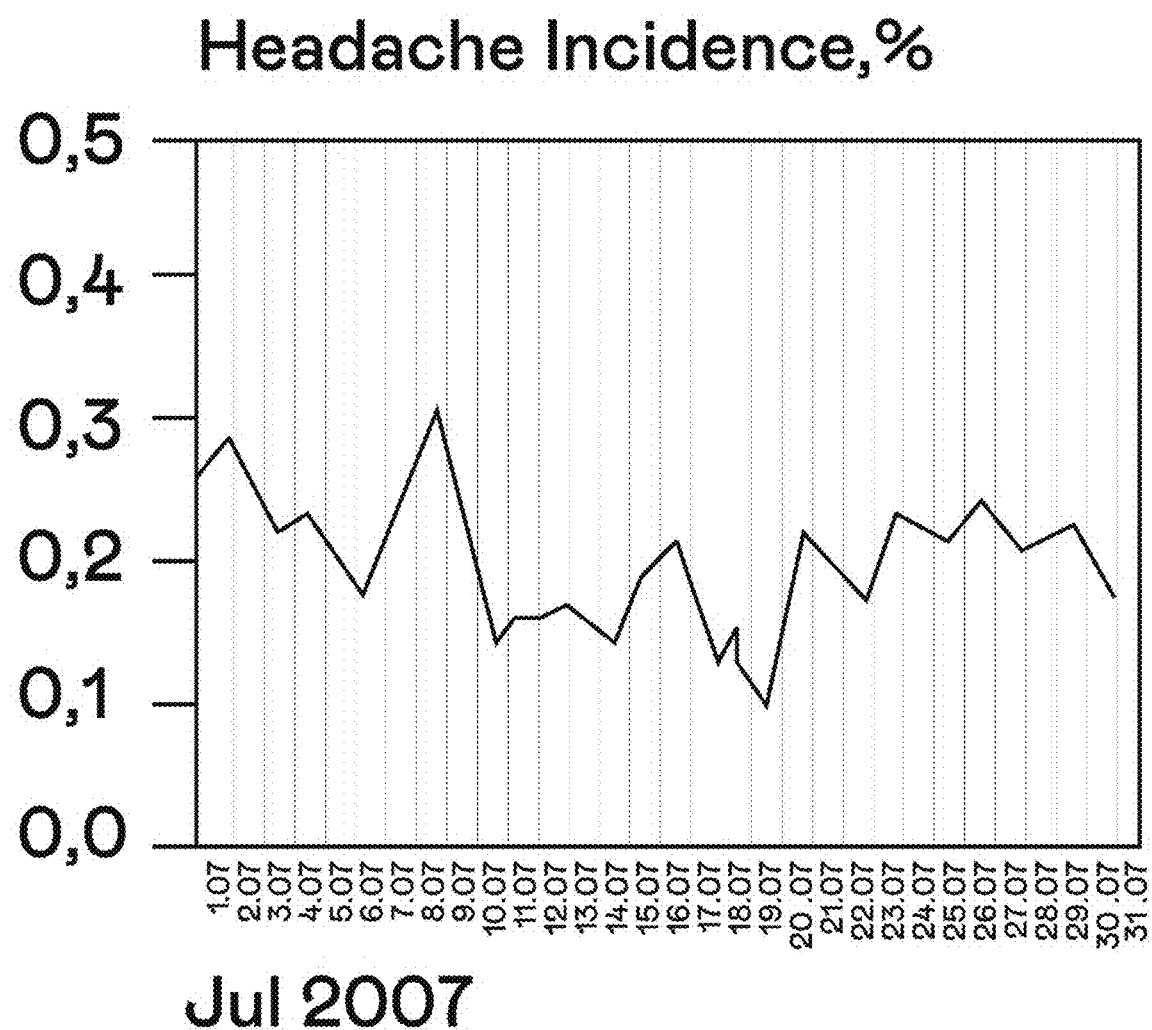
FIG. 19 shows headache incidences in July 2007 in Taipei (Taiwan).
Figure 20:
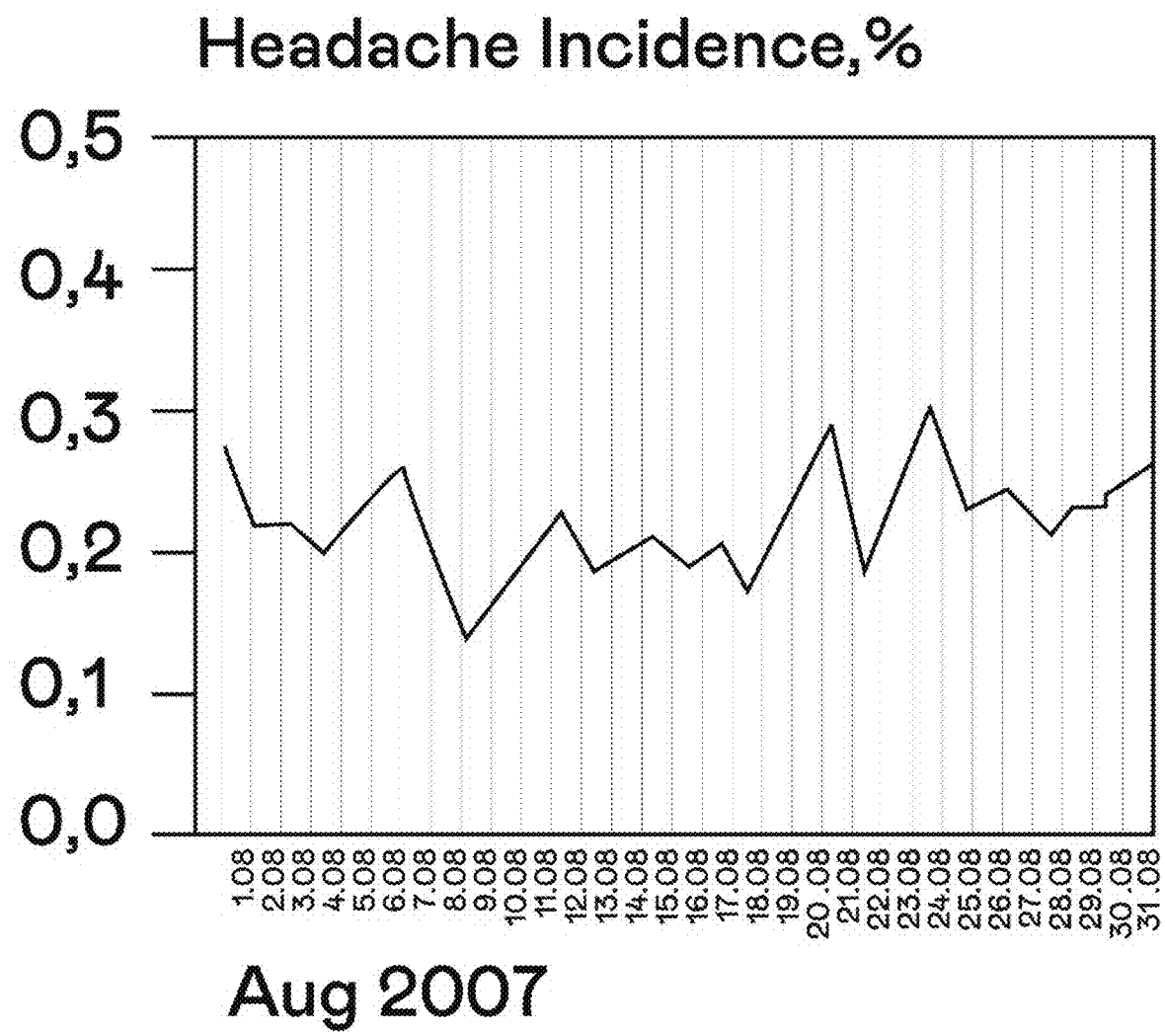
FIG. 20 shows headache incidences in August 2007 in Taipei (Taiwan).

On FIG. 18-20 you can see migraine data (headache frequency, %) for 2007 in Taipei (Taiwan).

Figure 21:
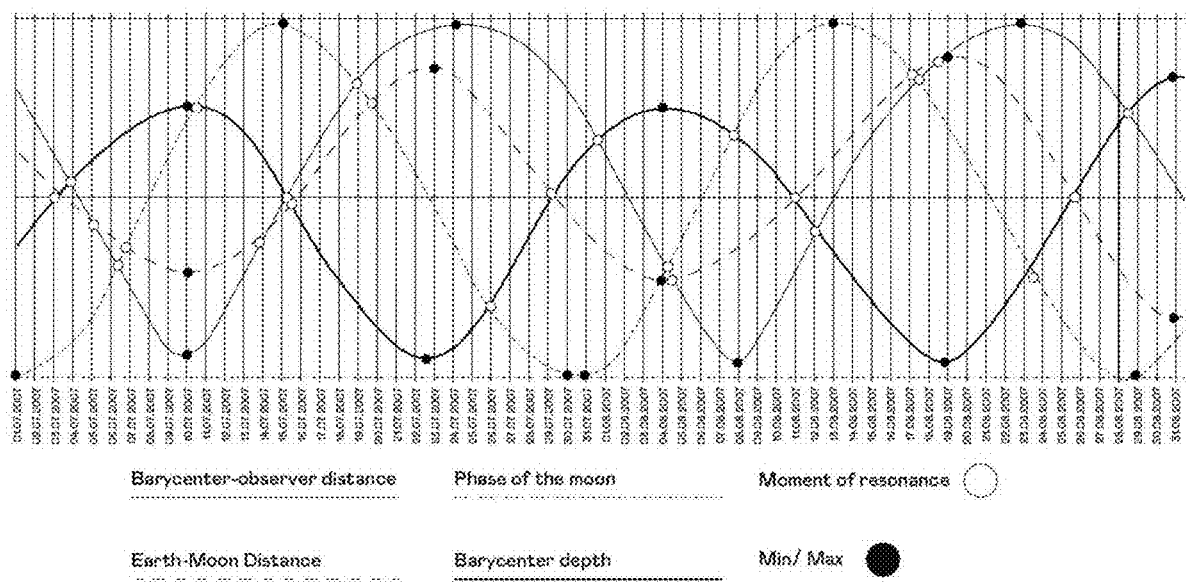
FIG. 21 shows graphs of gravitational tides resonances for GPS coordinates of Taipei (25° 6' 19.7892" N, 121° 35' 50.5176" E).

And now look at the graphs of gravitational tides resonances for GPS coordinates of Taipei (25° 6' 19.7892" N, 121° 35' 50.5176" E) in FIG. 21.

And now let's compare the resonances of gravitational tides and jumps in the number of migraines.

There may be bursts of migraines, heart attacks caused by football matches, earthquakes, and other similar factors, but in this table, we observe a clear connection: the resonance of gravitational tides causes a surge of migraines every time. Interestingly, in an absolute number of cases, gravitational factors work the same way as for Schumann resonances (homogeneous factors at resonance are weaker than inhomogeneous ones). Also, everything that happens resembles an oscillatory system, into which resonances constantly pump energy (shake the system, cause growth), then, while there is no resonance, the system fades, and then again, the energy injection causes growth.

In general, you need to understand that first there is a resonance, and then a migraine. Moreover, a person may not immediately consult a doctor, and there may be a "delay" for some time (for a day or two, not everyone immediately goes to the doctor).

Previously, some researchers noted some correlation between temperature and mortality, although they could not directly explain it (after all, most modern people do not live on the streets and, relatively speaking, 99 percent do not depend on temperature).

The correct causal relationship is as follows:

1) Kukharev regions arising at the moment of resonance of gravitational tides from above in atmospheric fluids change temperature and pressure (including forming electromagnetic waves).

2) But the resonance of gravitational tides occurs simultaneously in a large volume. And simultaneously with the resonance from above, with changes in pressure and temperature in the atmosphere, fluctuations occur below on the surface of the earth and human cells that tear, people have migraines, heart attacks and strokes are more likely to occur.

The presented graphs clearly indicate a static correlation (in addition to the physical and mathematical model) between the resonances of gravitational tides and heart attacks. And this gives us a tool to reduce the risk of heart attacks. For each point of the planet, using GPS coordinates, you can calculate the moments of the onset of resonance and give recommendations to people with a tendency to heart attacks (take medications against blood clots, for example).

It should also be understood that the atmosphere and ionosphere are constantly moving around the Earth, there are inhomogeneities in them. But in general, there is a clear correlation of atmospheric cyclones and anticyclones with the resonances of gravitational tides.

Let's consider another version of the proof of the existence of Kukharev regions. These regions at the moments of resonance of gravitational tides cause, among other things, increased electromagnetic radiation (primarily from points in the stratopause). Electromagnetic radiation affects blood clotting, creating blood clots, torn vessels, increasing the risk of heart attacks and strokes. At the same time, of course,

| No (Resonance number) | Calculated forecast points of the gravitational tidal resonance dates | Date of the jump in the number of migraines (headaches) | The fact of correlation |
|---|---|---|---|
| 1 | 3, Jul. 2007 | 3, Jul. 2007 | ✓ |
| 2 | 6, Jul. 2007 | 6, Jul. 2007 | ✓ |
| 3 | 10, Jul. 2007 | 10, Jul. 2007 | ✓ |
| 4 | 14-15, Jul. 2007 | 14-15, Jul. 2007 | ✓ |
| 5 | 19-20, Jul. 2007 | 19-20, Jul. 2007 | ✓ |
| 6 | 4-5, Aug. 2007 | 4-5, Aug. 2007 | ✓ |
| 7 | 8, Aug. 2007 | 9, Aug. 2007 (+1 day) | ✓ |
| 8 | 11-12, Aug. 2007 | 13, Aug. 2007 (+1 day) | ✓ |
| 9 | 17-18, Aug. 2007 | 18-19, Aug. 2007 | ✓ |
| 10 | 22-23, Aug. 2007 | 22-23, Aug. 2007 | ✓ |
| 11 | 25, Aug. 2007 | 25-26, Aug. 2007 | ✓ |
| 12 | 28, Aug. 2007 | 28, Aug. 2007 | ✓ | this does not necessarily have to happen instantly, there may be time delays for the blood to clot. In addition to the formation of blood clots, "excessive" fluctuations in the gravitational field these days can generally "rock" cells, having a bad effect on health, which should be seen in statistics.

It is possible to find other statistics on the effect of the resonance of gravitational tides on living beings, for example, on the egg-laying of chickens. But it's all the same from a fundamental point of view.

Figure 22:
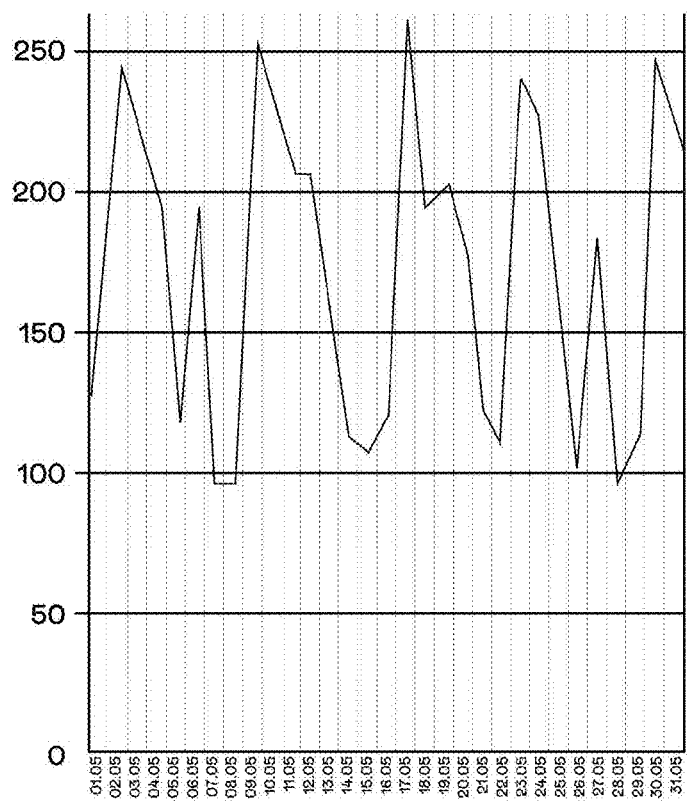
FIG. 22 shows cardio incidents (heart attacks, strokes) from May 1 to May 31, 2005, in Bavaria (Germany).

Next, look at the cases of cardio incidents (heart attacks, strokes) from May 1 to May 31, 2005, in Bavaria (Germany) in FIG. 22.

Figure 23:
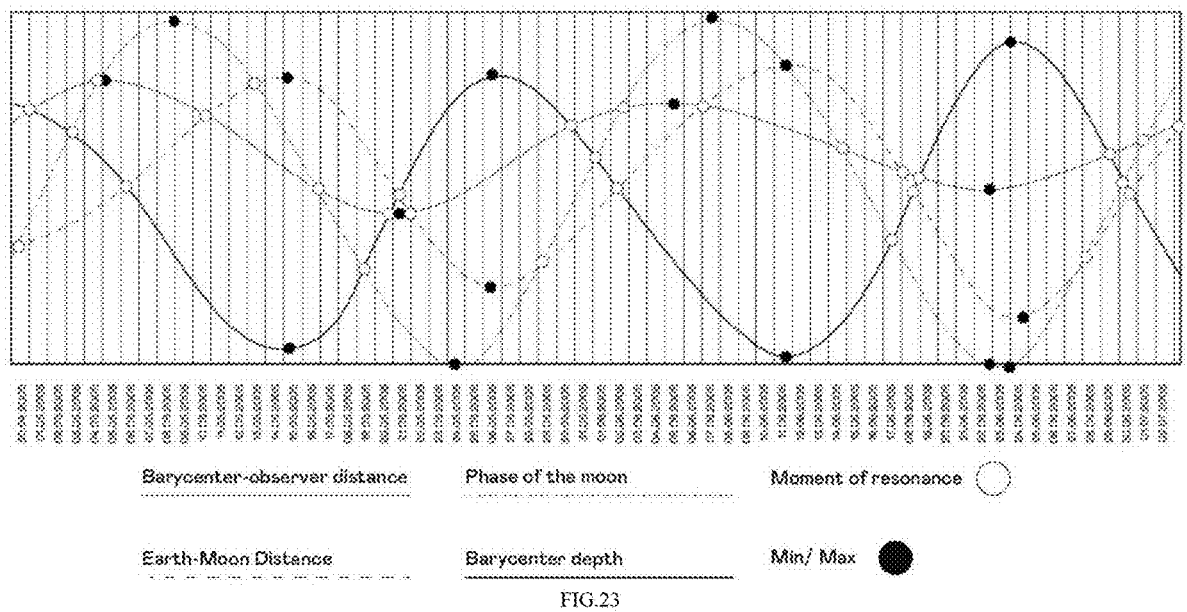
FIG. 23 shows gravitational tides resonances for GPS coordinates of Bavaria.

And now look at the moments of resonances of gravitational tides in Bavaria (Germany) at the same time (FIG. 23).

And now let's compare the resonances of gravitational tides and jumps in the number of cardio incidents.

| No (Resonance number) | Calculated forecast points of the gravitational tidal resonance dates | Date of the jump in the number of cardio incidents | The fact of correlation |
|---|---|---|---|
| 1 | Night from 30, Apr. 2005 to 1, May 2005 | 1-2, May 2005 | ✓ |
| 2 | 5-6, May 2005 | 5-6, May 2005 | ✓ |
| 3 | 10, May 2005 | 10-11, May 2005 | ✓ |
| 4 | 13, May 2005 | 12-13, May 2005 | Weak resonance of homogeneous gravitating factors caused weak support of the level of cardiovascular incidents |
| 5 | Night from 16, Jun. 2005 to 17, May 2005 | 17-18, May 2005 | ✓ |
| 6 | 21-22, May 2005 | 22-23, May 2005 | ✓ |
| 7 | — | 27, May 2005 | The jump in hospitalizations is apparently caused by other (non-gravitational) factors (such as football matches, mass reporting hospitalization) |
| 8 | 29-30, May 2005 | 29-30, May 2005 | ✓ |

Figure 24:
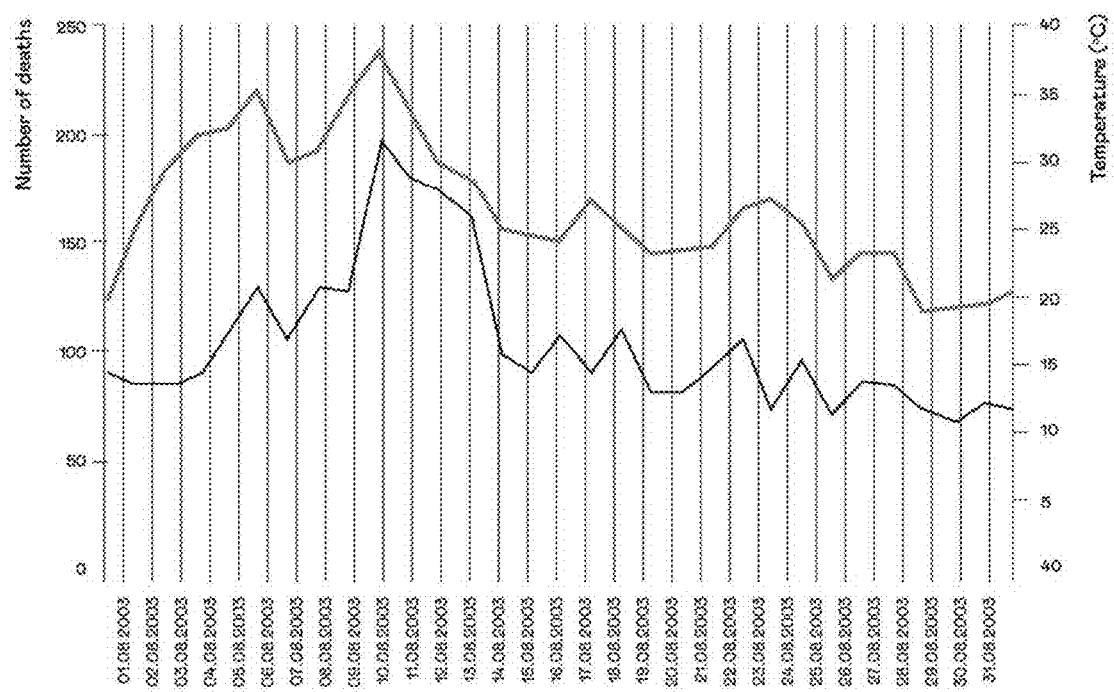
FIG. 24 shows statistics of deaths in London (black line) with reference to temperature changes (gray line) in August 2003.

Next, look at the statistics of deaths in London (August 2003) in FIG. 24.

Figure 25:
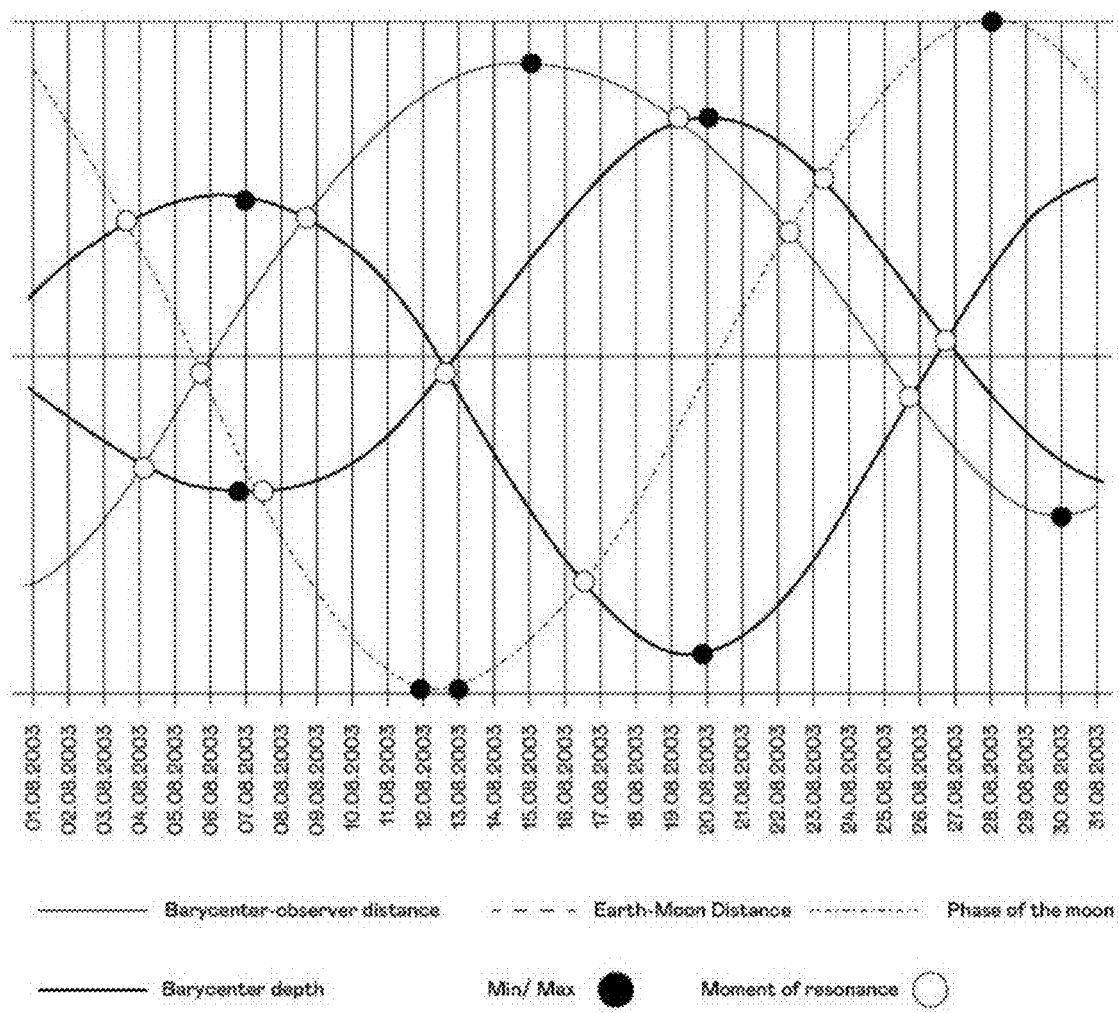
FIG. 25 shows gravitational tides resonances for GPS coordinates of London (August 2003).
Figure 26:
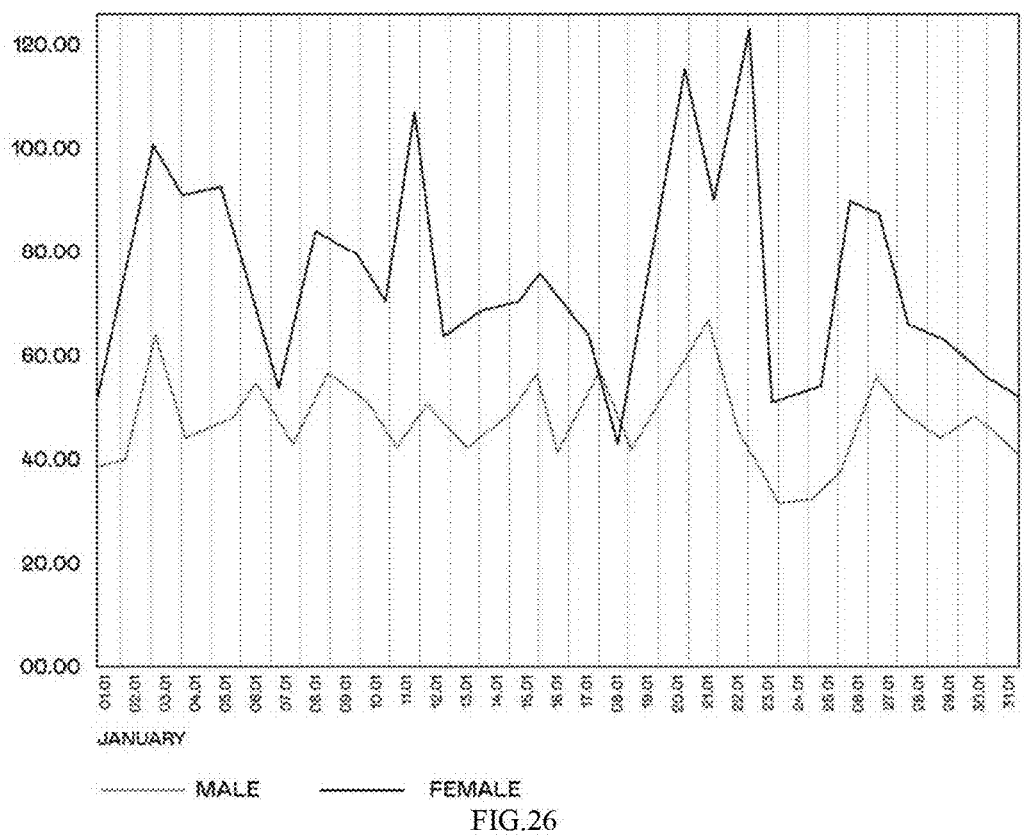
FIG. 26 shows statistics of clinic visits and hospitalizations in Tikura (Anbessa Specialized Hospital, Addis Ababa, Ethiopia) from 01.01.2020 to 31.01.2020.
Figure 27:
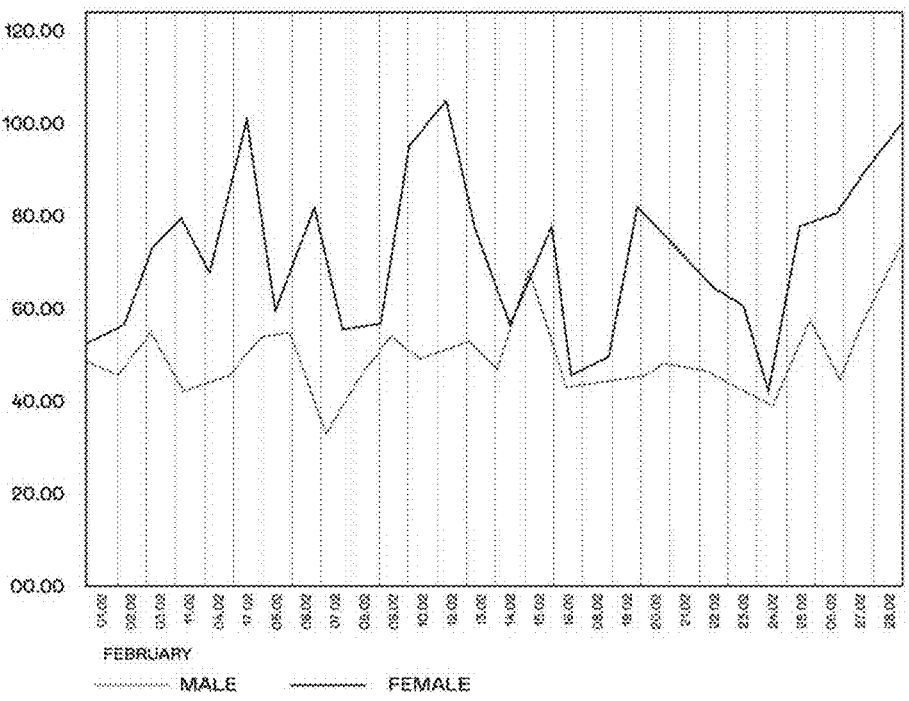
FIG. 27 shows statistics of clinic visits and hospitalizations in Tikura (Anbessa Specialized Hospital, Addis Ababa, Ethiopia) from 01.02.2020 to 28.02.2020.
Figure 28:
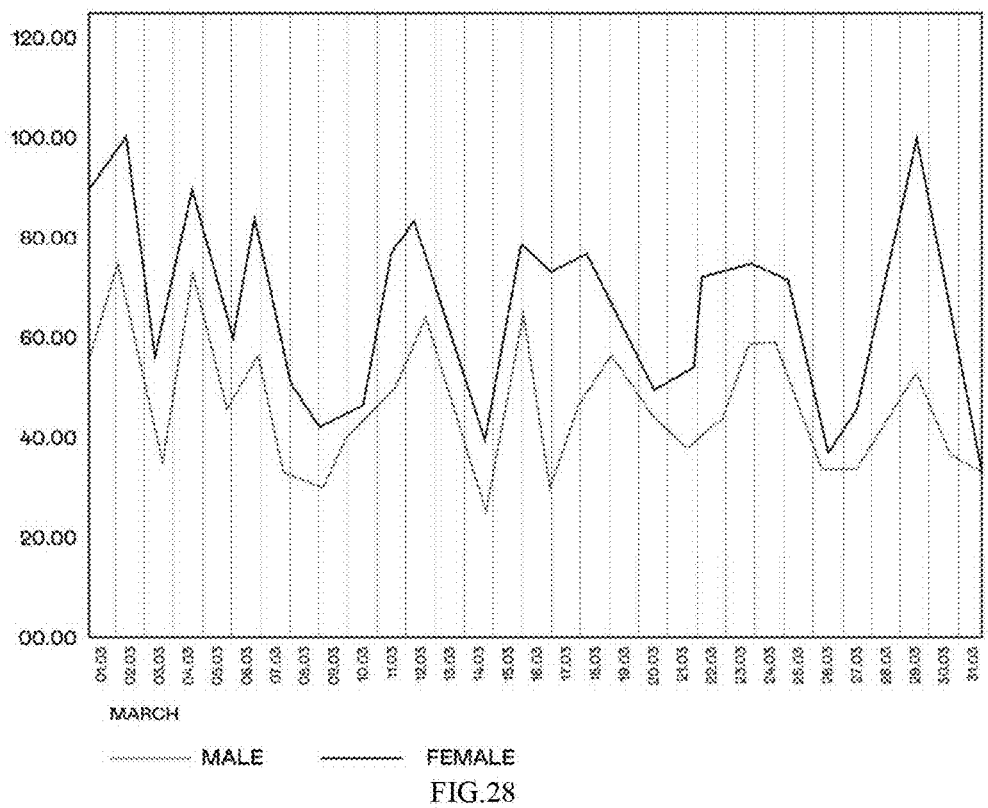
FIG. 28 shows statistics of clinic visits and hospitalizations in Tikura (Anbessa Specialized Hospital, Addis Ababa, Ethiopia) from 01.03.2020 to 31.03.2020.
Figure 29:
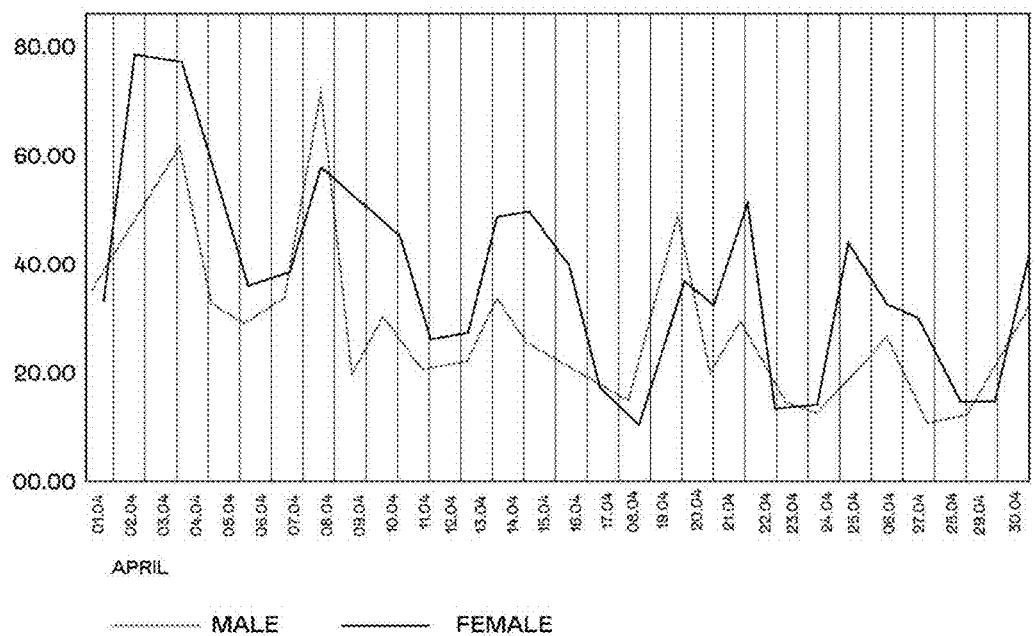
FIG. 29 shows statistics of clinic visits and hospitalizations in Tikura (Anbessa Specialized Hospital, Addis Ababa, Ethiopia) from 01.04.2020 to 30.04.2020.
Figure 30:
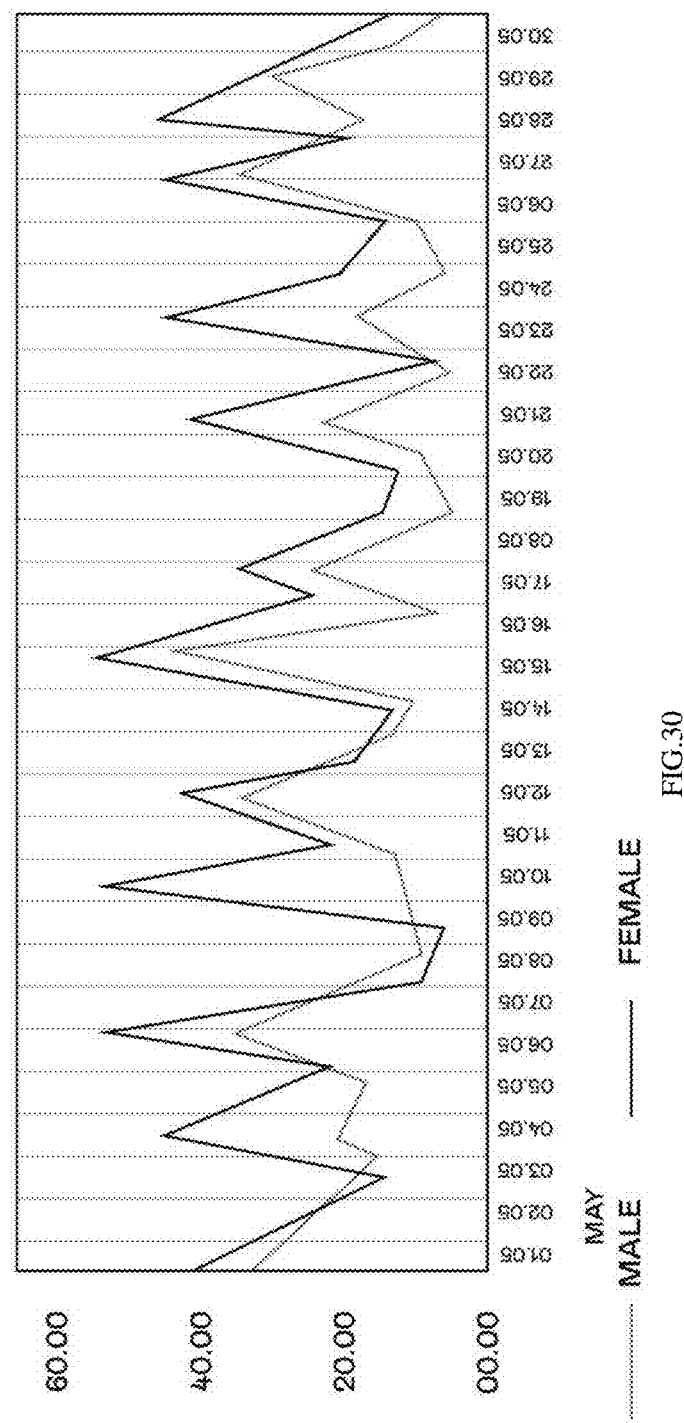
FIG. 30 show statistics of clinic visits and hospitalizations in Tikura (Anbessa Specialized Hospital, Addis Ababa, Ethiopia) from 01.05.2020 to 30.05.2020.

And now let's look at the resonances of gravitational tides in August 2003 in London (GPS coordinates of London—51° 30'30" north latitude, 0° 07'32" west longitude) in FIG. 25.

And now let's compare the resonances of gravitational tides and jumps in the number of deaths.

| No (Resonance number) | Calculated forecast points of the gravitational tidal resonance dates in London | Date of the jump in the number of deaths in London | The fact of correlation |
|---|---|---|---|
| 1 | 3-4-5, Aug. 2003 | 4-5, Aug. 2003 | ✓ |
| 2 | 7, Aug. 2003 | 7, Aug. 2003 | ✓ |
| 3 | 8-9, Aug. 2003 | 8-9, Aug. 2003 | ✓ |
| 4 | 12, Aug. 2003 | Weak support for the fluctuation level on Aug. 12, 2003 | Typical weak resonance of homogeneous gravitating factors |
| 5 | 16, Aug. 2003 | 16, Aug. 2003 | ✓ |
| 6 | 19, Aug. 2003 | Peak from Aug. 18 to Aug. 19, 2003 | ✓ |
| 7 | 22-23, Aug. 2003 | 22-23, Aug. 2003 | ✓ |
| 8 | 25-26, Aug. 2003 The end of the day on Aug. 25 and Aug. 26, 2003 | 25-26, Aug. 2003 The end of the day on Aug. 25 and Aug. 26, 2003 | ✓ |

Look at the statistics of clinic visits and hospitalizations in Tikura (Anbessa Specialized Hospital, Addis Ababa, Ethiopia) in FIG. 26-30.

Figure 31:
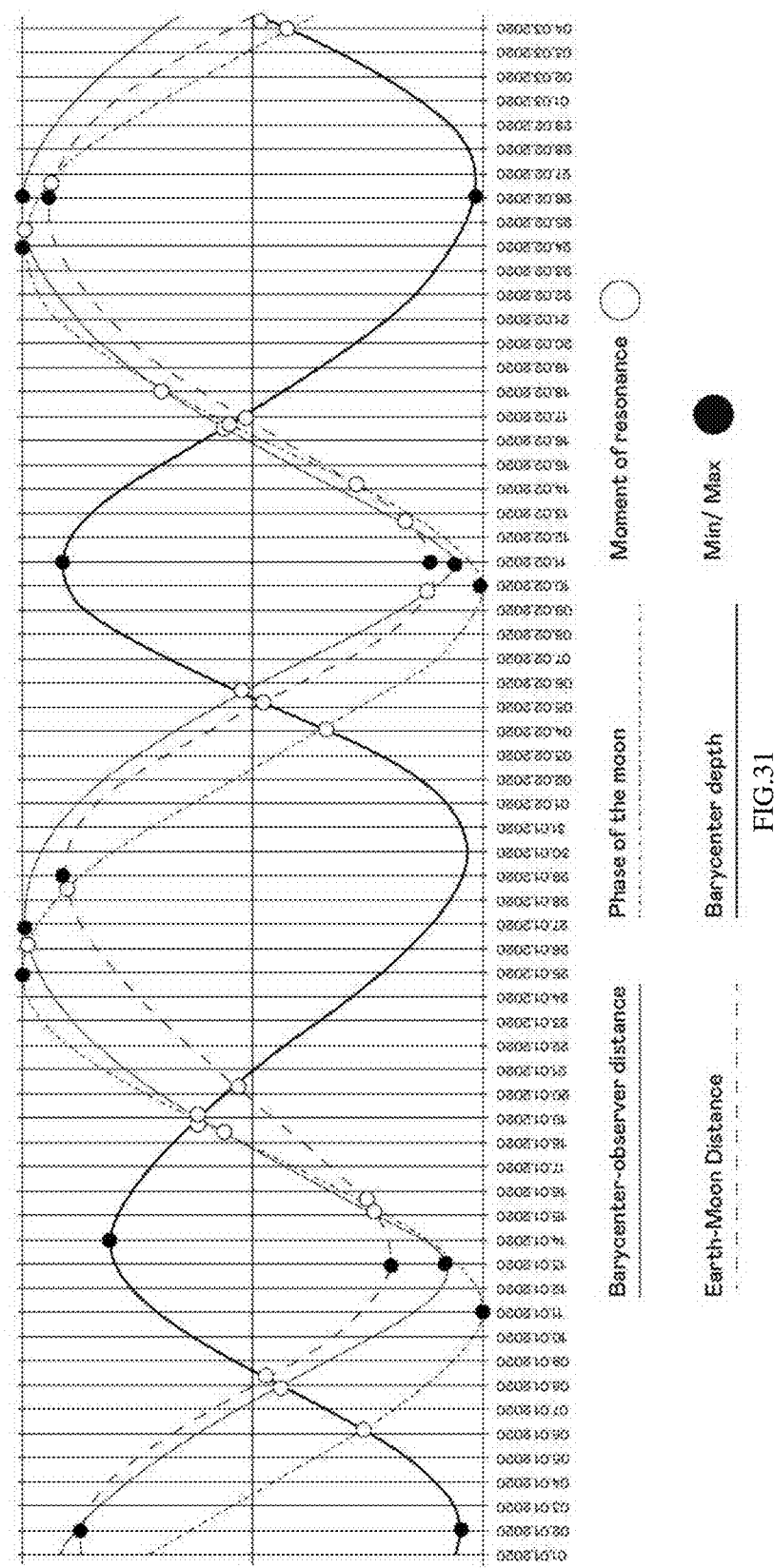
FIG. 31 shows gravitational tides resonances for GPS coordinates of Addis Ababa, Ethiopia, from 01.01.2020 to 04.03.2020.
Figure 32:
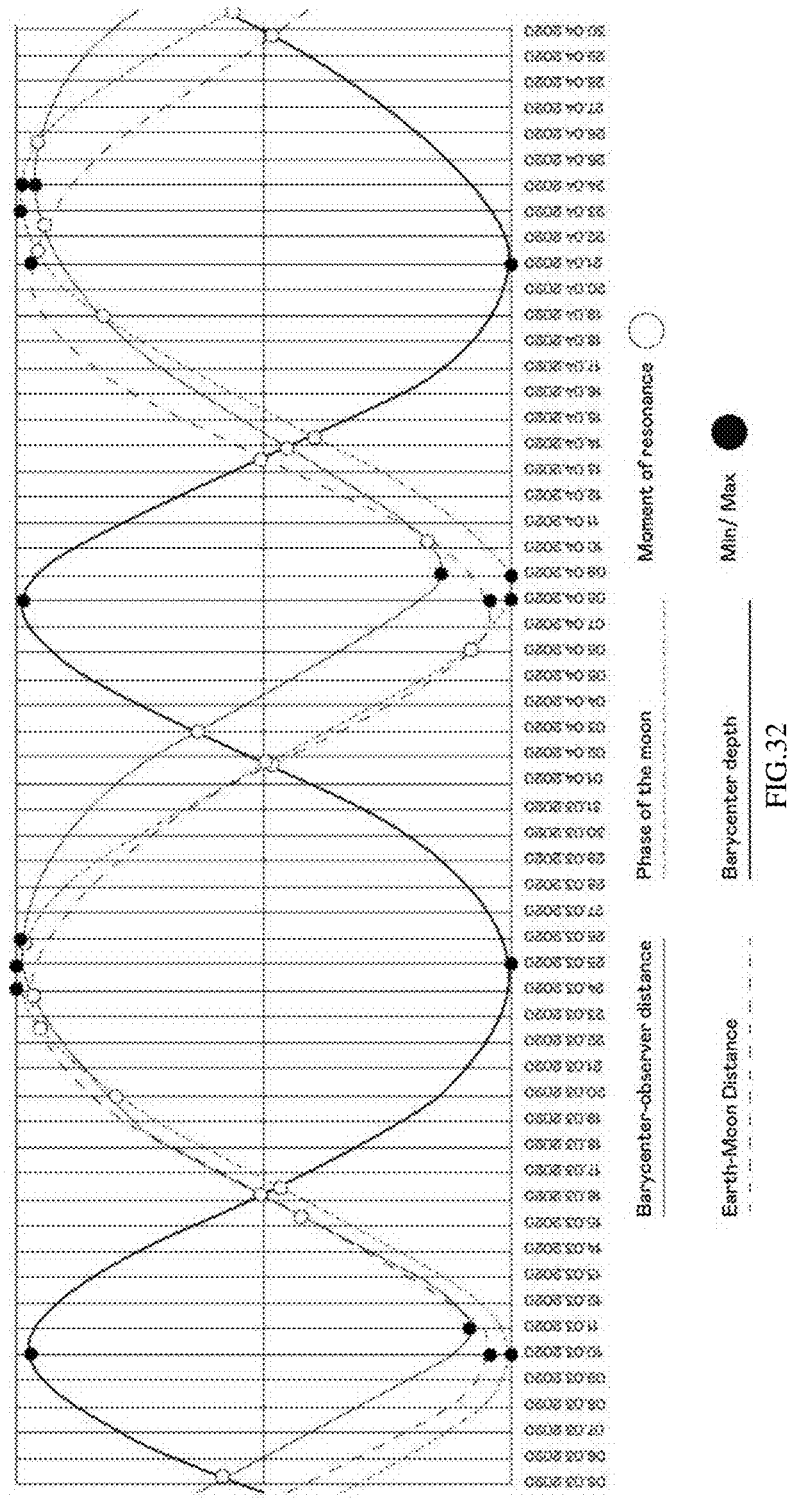
FIG. 32 shows gravitational tides resonances for GPS coordinates of Addis Ababa, Ethiopia, from 05.03.2020 to 30.04.2020.
Figure 33:
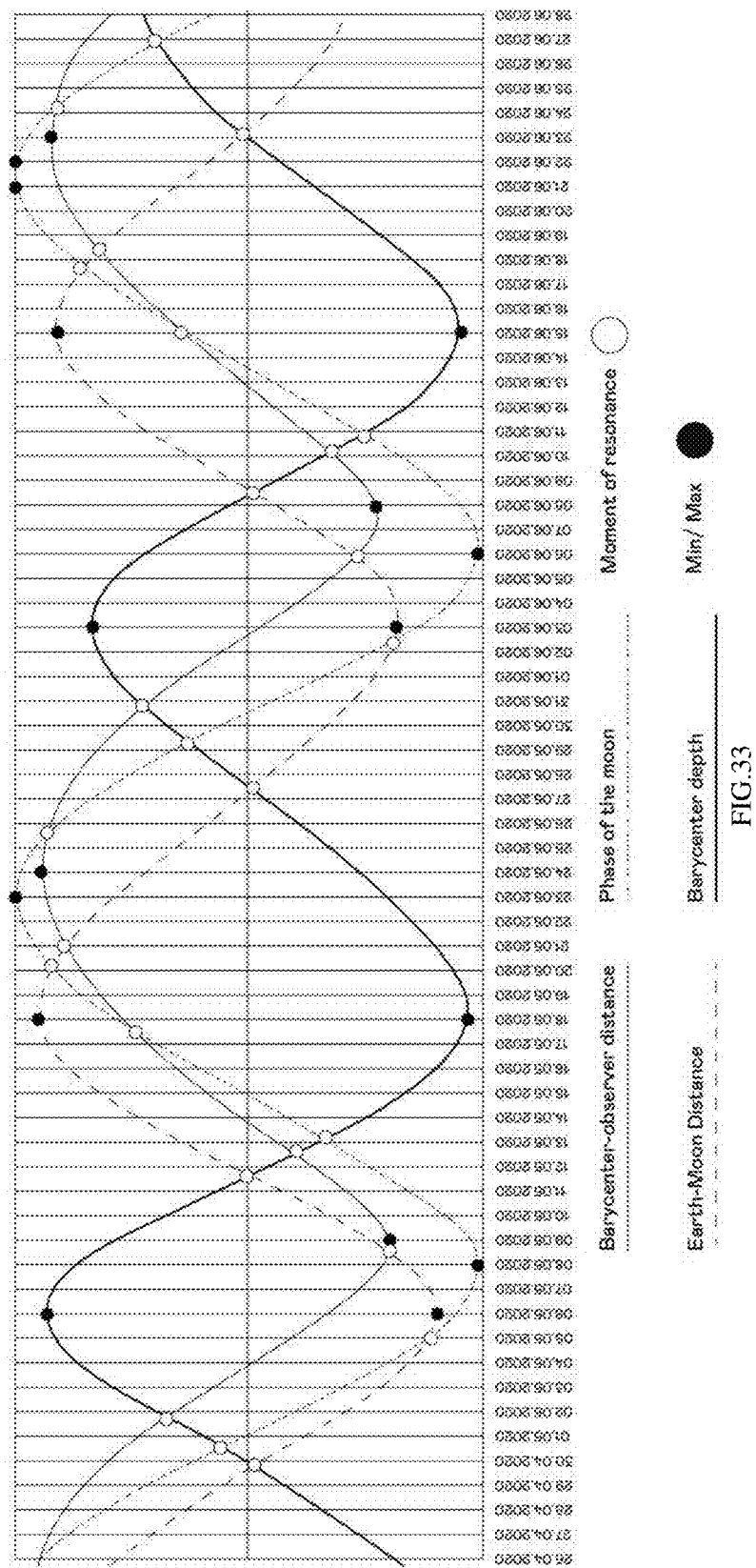
FIG. 33 shows gravitational tides resonances for GPS coordinates of Addis Ababa, Ethiopia, from 26.04.2020 to 28.06.2020.

And then look at the moments of gravitational tides resonances for GPS coordinates of Addis Ababa, Ethiopia at the same time (FIG. 31-33).

And now let's compare the resonances of gravitational tides and jumps in the number of clinic visits and hospitalizations in Tikura (Anbessa Specialized Hospital, Addis Ababa, Ethiopia).

| No (Resonance number) | Calculated forecast points of the gravitational tidal resonance dates | Date of the jump in the number of clinic visits and hospitalizations | The fact of correlation |
|---|---|---|---|
| 1 | 2, Jan. 2020 | 2, Jan. 2020 | ✓ |
| 2 | 6-7-8, Jan. 2020 | 7-8, Jan. 2020 | ✓ |
| 3 | — | 11, Jan. 2020 | The jump in hospitalizations is apparently caused by other (non-gravitational) factors (such as football matches, mass reporting hospitalization) |
| 4 | 14-15, Jan. 2020 | 15, Jan. 2020 | ✓ |
| 5 | 18-19-20, Jan. 2020 | 19-20, Jan. 2020 | ✓ |
| 6 | — | 22, Jan. 2020 | The jump in hospitalizations is apparently caused by other (non-gravitational) factors (such as football matches, mass reporting hospitalization) |
| 7 | 26, Jan. 2020 | 26, Jan. 2020 | ✓ |
| 8 | 28, Jan. 2020 | 28-29, Jan. 2020 | ✓ |
| 9 | 3-4, Feb. 2020 | 3-4, Feb. 2020 | ✓ |
| 10 | 5, Feb. 2020 | 5, Feb. 2020 | ✓ |
| 11 | 9, Feb. 2020 | 9, Feb. 2020 | ✓ |
| 12 | 12, Feb. 2020 | 12, Feb. 2020 | Support for a high level of fluctuations that have been going on since 9, Feb. 20 |
| 13 | 14, Feb. 2020 | 15, Feb. 2020 (+1) | ✓ |
| 14 | 16, Feb. 2020 | 17, Feb. 2020 (+1) | ✓ |
| 15 | 19, Feb. 2020 | 19, Feb. 2020 | ✓ |
| 16 | 24, Feb. 2020 | 24-25, Feb. 2020 | ✓ |
| 17 | 26, Feb. 2020 | 26-27, Feb. 2020 | ✓ |
| 18 | — | 1, Mar. 2020 | The jump in hospitalizations is apparently caused by other (non-gravitational) factors (such as football matches, mass reporting hospitalization) |
| 19 | 4, Mar. 2020 | 4, Mar. 2020 | ✓ |
| 20 | 5, Mar. 2020 | 5, Mar. 2020 | ✓ |
| 21 | 11, Mar. 2020 | 11, Mar. 2020 | ✓ |
| 22 | 15, Mar. 2020 | 15, Mar. 2020 | ✓ |
| 23 | 16, Mar. 2020 | 16, Mar. 2020 | ✓ |
| 24 | 18-19, Mar. 2020 | 18-19, Mar. 2020 | Jumps caused by alternately parallel gravitating factors (alternating resonance) |
| 25 | 22-23, Mar. 2020 | 22-23, Mar. 2020 | ✓ |
| 26 | — | 29, Mar. 2020 | The jump in hospitalizations is apparently caused by other (non-gravitational) factors (such as football matches, mass reporting hospitalization) |
| 27 | 1-2, Apr. 2020 | 2-3, Apr. 2020 | ✓ |
| 28 | 6-7, Apr. 2020 | 7, Apr. 2020 | ✓ |
| 29 | 10, Apr. 2020 | 10, Apr. 2020 | Only weak support for the current level of fluctuations |
| 30 | 13-14, Apr. 2020 | 13-14, Apr. 2020 | ✓ |
| 31 | 19, Apr. 2020 | 19, Apr. 2020 | ✓ |
| 32 | 21-22, Apr. 2020 | 21-22, Apr. 2020 | ✓ |
| 33 | 25, Apr. 2020 | 25, Apr. 2020 | ✓ |
| 34 | 29-30, Apr. 2020 | 29-30, Apr. 2020 | ✓ |

General Fundamental Notes on the Work of Gravity.

In addition to the 4 gravitating factors (the lines of which are shown in the figures for determining the moments of gravitational resonance), there are others, for example, the resonance of two factors associated with the barycenter and the diurnal/semi-diurnal position of the Moon and the Sun, but they are weaker in fact. Therefore, they are not indicated in the figures, only stronger resonances are given there.

Just as for electromagnetic waves, and for migraines, the concept of a mismatch in the phase of the movement of factors in general is not so important, because the strengthening of the super-tide in the head, that the multidirectional tide is the result of one—headache. Identical for electron clouds, the concept of "antiphase of motion" for gravitational factors is less significant for Kukharev regions of electrons (compared to Kukharev regions of liquids).

Forecasting weather events (the occurrence of killer waves in the oceans and seas, tornadoes, cyclones and anticyclones) on the scale of the entire planet Earth (for other planets it will be identical) consists in the constant calculation of Kukharev regions of all kinds for each point of the planet. You must constantly count gravitational resonances, all extremes (and without resonances) by gravitational factors. Having such a grid for the whole planet, you also need to understand which resonances are stronger (heterogeneous factors), which are weaker (homogeneous factors). And then you will be able to neutralize all the risks of problems with weather events, including the fact that the Kukharev regions create an increased risk of death from heart attacks and strokes (including thrombosis and excessive "rocking" of the body).

Figure 34:
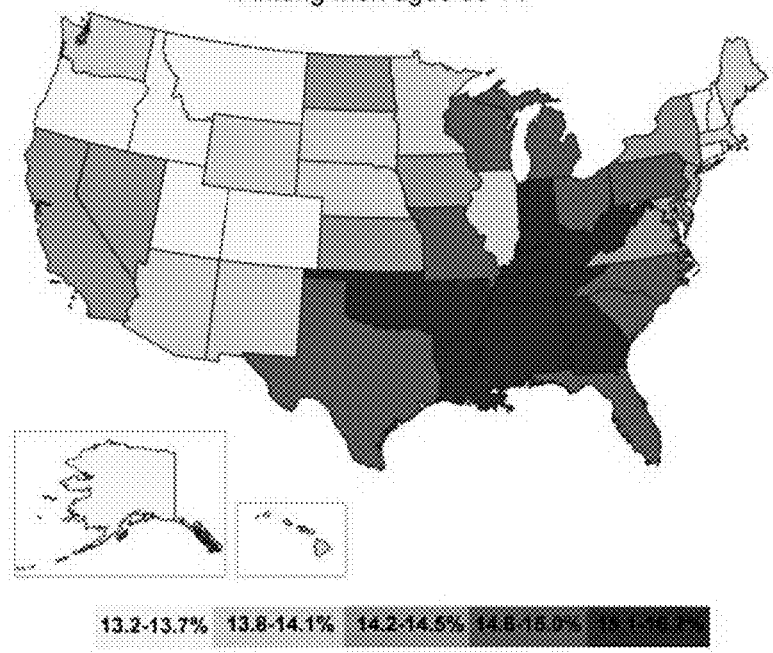
FIG. 34 shows the risk of developing heart disease among men in the USA, by state.

The author wanted to draw attention to the following statistical drawing, which was made based on long-term American statistics (FIG. 34).

Figure 35:
FIG. 35 shows the movement of the Earth-moon barycenter over time between latitudes. The darker color shows those latitudes where the Earth-Moon barycenter occurs more often. A lighter color (light lines) shows those latitudes where the Earth-Moon barycenter occurs less frequently.

And now look at the drawing (FIG. 35) of the motion of the Earth-Moon barycenter (de facto resembles plus or minus the latitude of Texas from the equator). The Earth-moon barycenter as a whole ranges from about 28 degrees south latitude to 28 degrees north latitude. But there are latitudes (highlighted in darker color) where the barycenter happens more often.

If we take the statistics of the position of the Earth-moon barycenter for 100 years from day to day (as the author did from 1900 to 2000), it can be seen that most often it is located at latitudes of about 17-19 degrees (true on both sides of the equator).

Figure 36:
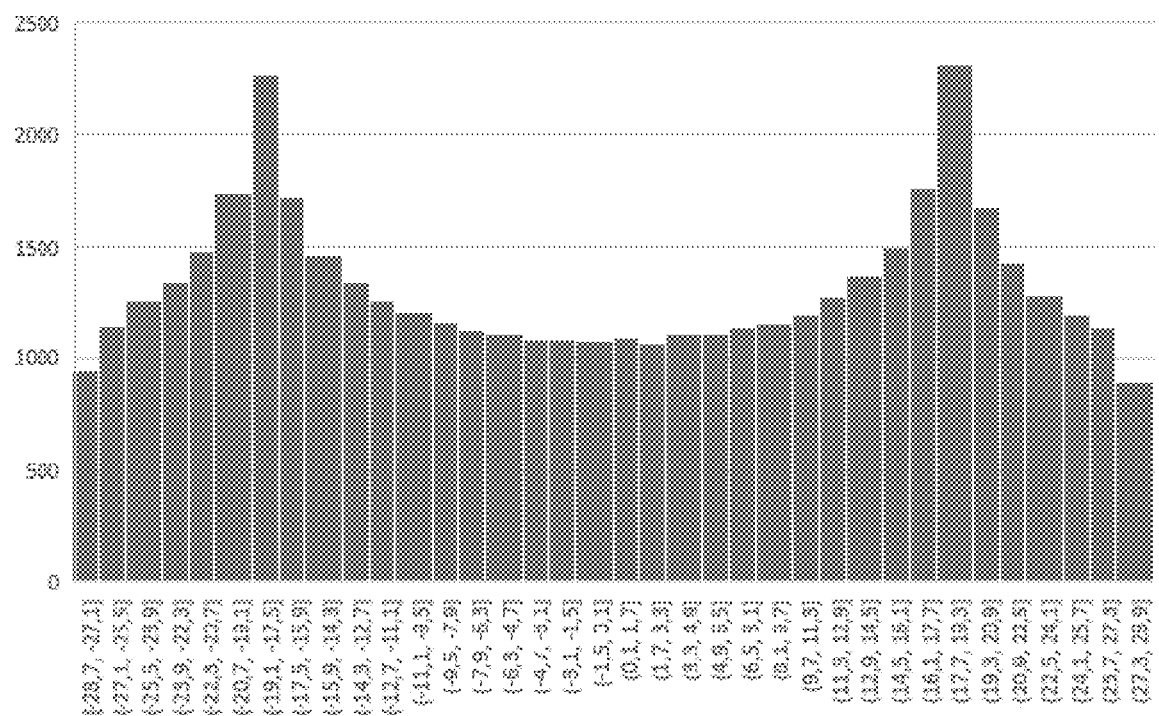
FIG. 36 shows a histogram of the distribution of 47,483 days (130 years) of the position of the Earth-Moon barycenter by latitude.

FIG. 36 shows a histogram of the distribution of 47,483 days (130 years) of the position of the Earth-Moon barycenter by latitude. You clearly see two peaks with adjacent areas, these are the latitudes where the barycenter is most often located. The more often the barycenter is at a specific latitude, the more often resonances of gravitational tides occur in these latitudes. The more resonances of gravitational tides at certain latitudes (compared to other latitudes), the greater the risks of cardiovascular diseases there, the more water is squeezed out of these places, and so on.

Example of a table showing the latitude of the Earth-moon barycenter depending on the date.

| Latitude of the barycenter | Depth (km) | Date |
| --- | --- | --- |
| −9.0 | 1446.6 | 1, Jan. 2000 |
| −12.7 | 1412.4 | 2, Jan. 2000 |
| −15.8 | 1390.7 | 3, Jan. 2000 |
| −18.3 | 1380.3 | 4, Jan. 2000 |
| −20.0 | 1380.1 | 5, Jan. 2000 |

-continued

| Latitude of the barycenter | Depth (km) | Date |
| --- | --- | --- |
| −20.9 | 1388.7 | 6, Jan. 2000 |
| −20.8 | 1404.7 | 7, Jan. 2000 |
| −19.8 | 1427.6 | 8, Jan. 2000 |
| −17.8 | 1456.8 | 9, Jan. 2000 |
| −15.0 | 1492.3 | 10, Jan. 2000 |
| −11.6 | 1534.2 | 11, Jan. 2000 |
| −7.5 | 1582.6 | 12, Jan. 2000 |
| −3.0 | 1636.9 | 13, Jan. 2000 |
| 1.7 | 1696.0 | 14, Jan. 2000 |
| 6.4 | 1757.7 | 15, Jan. 2000 |
| 10.9 | 1818.4 | 16, Jan. 2000 |
| 15.0 | 1873.9 | 17, Jan. 2000 |
| 18.2 | 1918.8 | 18, Jan. 2000 |
| 20.3 | 1948.1 | 19, Jan. 2000 |
| 20.9 | 1957.8 | 20, Jan. 2000 |
| 20.1 | 1945.6 | 21, Jan. 2000 |
| 17.9 | 1911.8 | 22, Jan. 2000 |
| 14.5 | 1859.1 | 23, Jan. 2000 |
| 10.4 | 1792.4 | 24, Jan. 2000 |
| 5.8 | 1717.7 | 25, Jan. 2000 |
| 1.2 | 1641.5 | 26, Jan. 2000 |
| −3.4 | 1569.4 | 27, Jan. 2000 |
| −7.7 | 1506.1 | 28, Jan. 2000 |
| −11.6 | 1455.1 | 29, Jan. 2000 |
| −15.0 | 1418.4 | 30, Jan. 2000 |

It is important to note that it is impossible to compare the average risks of heart attacks between countries without taking into account the difference in the level of medicine in these countries, and such a cleaning of statistics is extremely difficult. At the same time, it is not necessary to compare the absolute death rates in the USA and third world countries (their high mortality is not associated with the proximity of the barycenter but is associated with a low level of health care). When working with large numbers, you need to understand the general level of medicine (which in general, for example, in the United States, can be taken on average the same). There are other factors, such as football matches, natural disasters, which can make changes in statistics.

Figure 37:
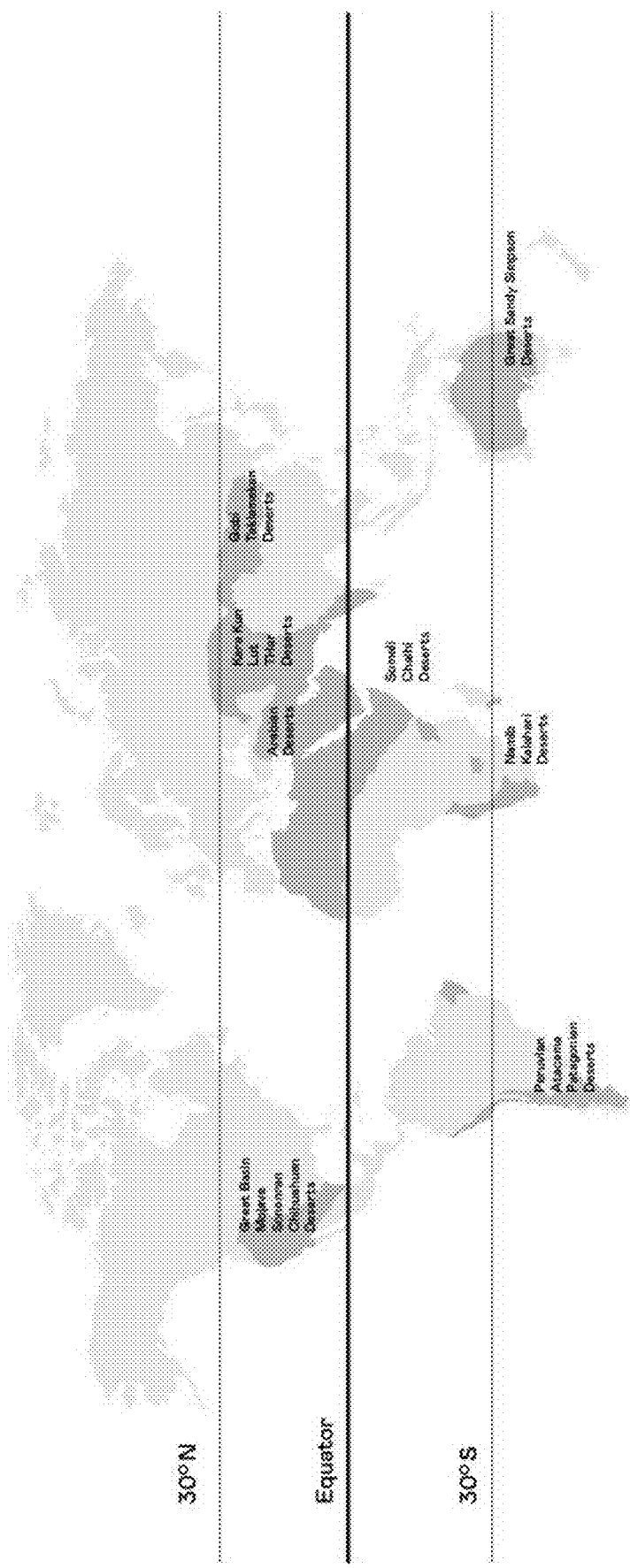
FIG. 37 shows the map of the deserts of planet Earth.
Figure 38:
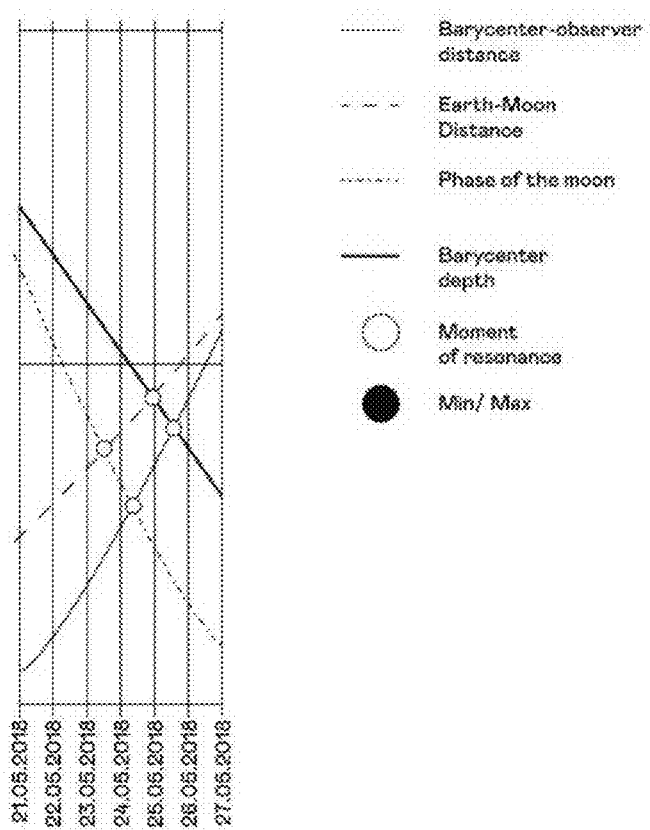
FIG. 38 shows the resonance of gravitational tides that caused the cyclone Alberto.
Figure 39:
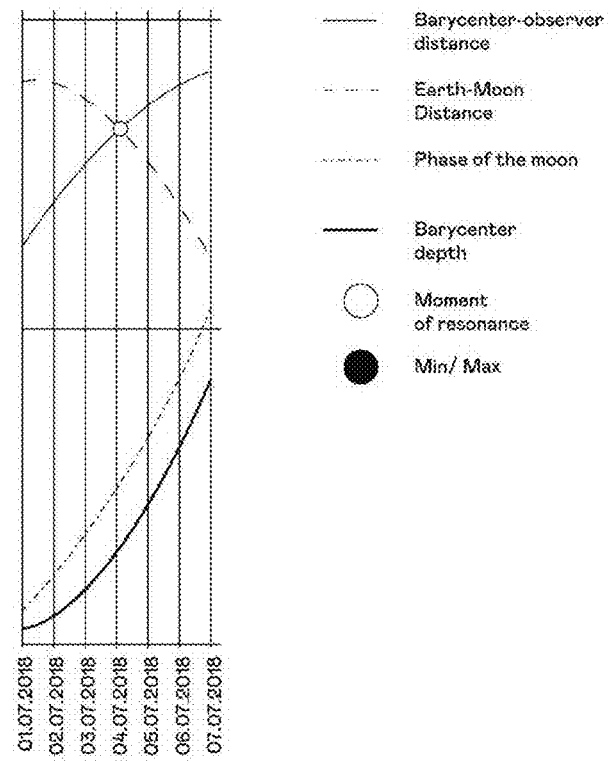
FIG. 39 shows the resonance of gravitational tides that caused the cyclone Beryl.
Figure 40:
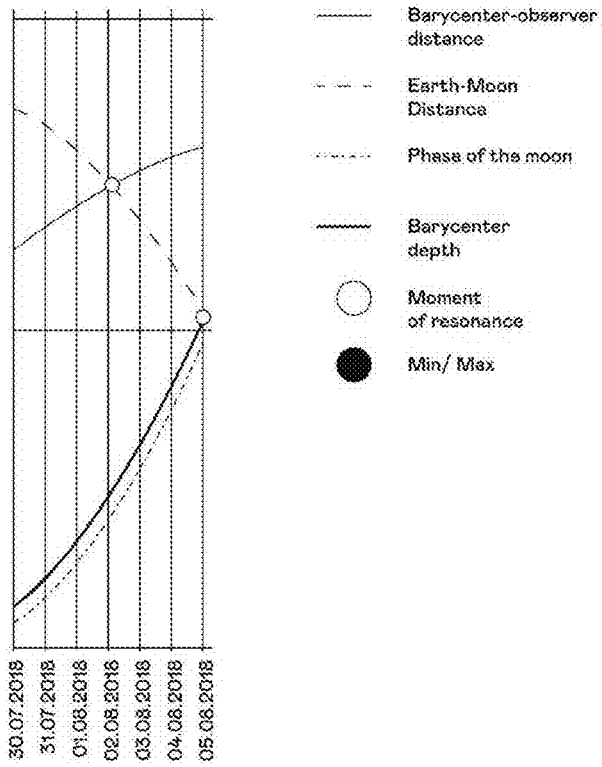
FIG. 40 shows the resonance of gravitational tides that caused the cyclone Debby.
Figure 41:
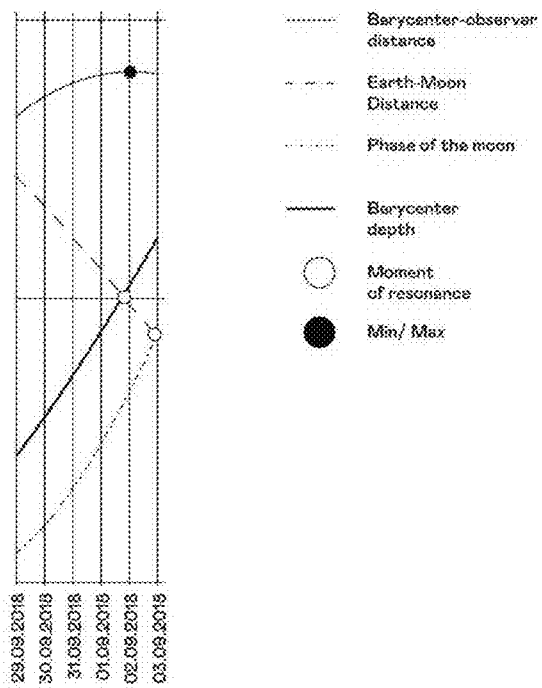
FIG. 41 shows the resonance of gravitational tides that caused the cyclone Gordon.
Figure 42:
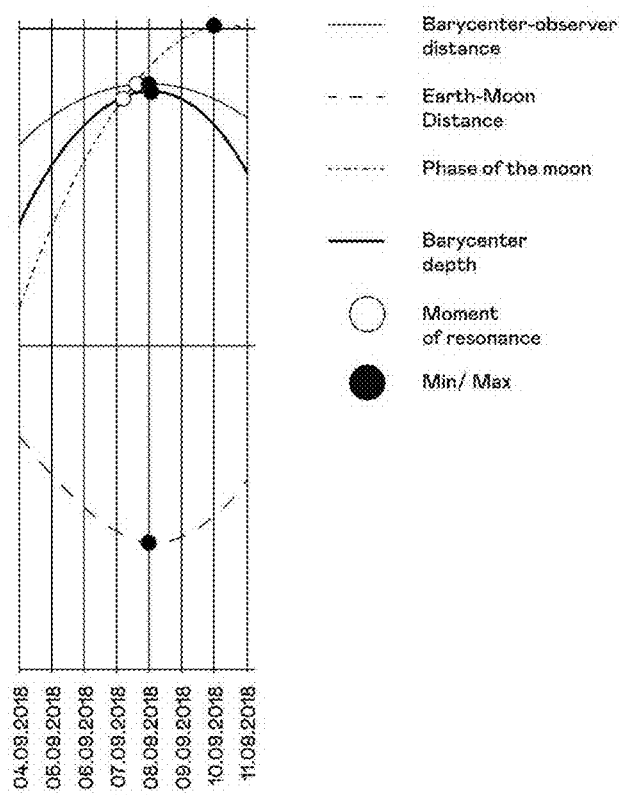
FIG. 42 shows the resonance of gravitational tides that caused the cyclone Helene 2018/9/7 (13.4N, 16.8W).
Figure 43:
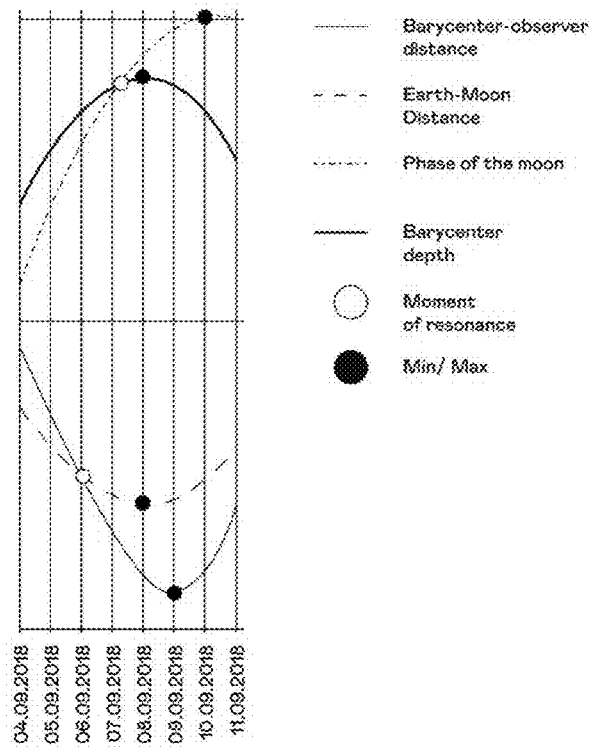
FIG. 43 shows the resonance of gravitational tides that caused the cyclone Helene 2018/9/8 (13.6N, 18.0W).
Figure 44:
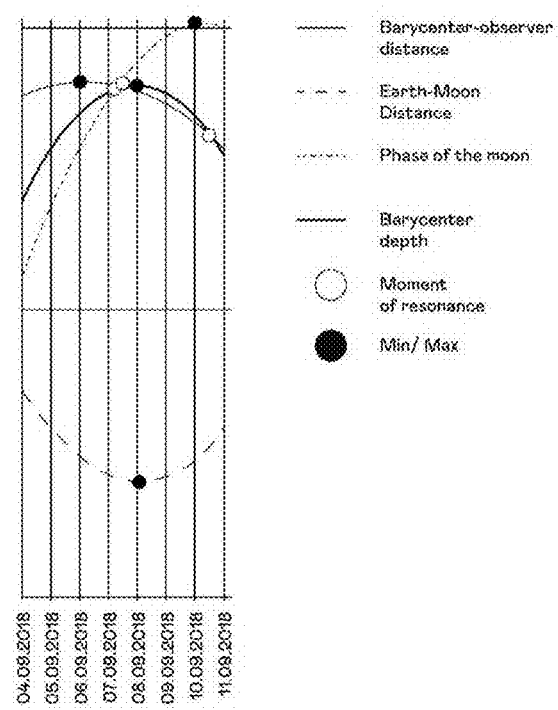
FIG. 44 shows the resonance of gravitational tides that caused the cyclone Isaak.

Now look at the map of the deserts of planet Earth (FIG. 37).

Everyone knows that the hottest place on Earth is the equatorial strip (it receives the most solar energy). But at the latitude of the equator, there are almost no deserts. The desert belt is located above and below the equator. And the reason for its formation is that the Earth-Moon barycenter is constantly moving in these latitudes and the constant resonances of gravitational tides simply "squeezed" all the water out of these places. Millions of years of resonance, constant maximum stress in the earth's crust led to the formation of deserts.

In general, three groups of gravitating factors can be distinguished:

External gravitational tides (movement of the Sun and Moon)

Movement of the Earth-Moon barycenter

Accumulated voltage in the object (in relation to which we are looking for resonance)

We can also say that there is a periodicity of antiphase of the motion of gravitating factors, but this is increasingly related to fundamental physics.

The numerous pro-turbers on the Sun, flares and dark spots on the Sun are also likely at many points to be due to the resonance of gravitational tides.

During the period of the origin of our universe, it also represented a giant fluid, a multitude of fluids, between which resonances of gravitational tides acted, various stress-strain states arose. But it all needs to be tested on supercomputers and is more interesting to fundamental physics.

If we take large time intervals (millions and billions of years) over large volumes of space (galaxies, constellations), then the constant resonance of gravitational tides can lead to various specific inhomogeneities. It is possible that, for example, the void of Volopas (and other "voids" in the universe) are caused by processes identical to the creation of a desert belt on earth.

The 79 moons of Jupiter form a huge hodgepodge of gravitational tidal resonances, which apparently support the great red spot. But to simplify it in the future, you can take the 4 largest satellites of Jupiter, calculate the location of the barycenter of the general system (with Jupiter) and compare the location of the barycenter and resonances with the location of the red spot. The dark spot of Neptune (an anticyclone in methane fluids-Neptune clouds) is also probably the result of the resonance of gravitational tides.

Characteristically, as already shown above on planet Earth, the resonance of gravitational tides always leads to energy jumps in the amplitude of Schumann resonances (from emerging Kukharev regions), but at the same time atmospheric pressure/temperature is constantly changing—that is, this is also the process of formation of a typical cyclone/anticyclone. The only question is the size of the gravitational resonance energy. On Jupiter, the gravitational resonance energy is clearly greater than on Earth, respectively, there is a large spot constantly. On Neptune, resonances appear and disappear (as on Earth).

The structure of Mercury is probably a consequence of the constant resonances of gravitational tides with the Sun. Constant stress-strain states "washed out" all the fluids, all the upper layers, leaving only essentially a solid core, which is more than half of the entire diameter of the planet, proportionally five times larger than similar terrestrial parameters.

Interestingly, the main elements of the composition of oil are carbon (83.5-87%) and hydrogen (11.5-14%). In addition, oil contains: sulfur in the amount of 0.1 to 1-2% (sometimes its content can reach 5-7%, in many oils there is practically no sulfur); nitrogen in the amount of 0.001 to 1 (sometimes up to 1.7%). Both oil and some other minerals apparently formed in the earth's mantle for many millions of years due to constantly occurring gravitational resonances in the Kukharev regions inside the Earth's mantle. Titan (one of the largest satellites of Saturn) has 100 times more oil and gas than on Earth, which is caused by similar reasons (Jupiter has 64 satellites and there are colossal gravitational resonances).

Giant vortices on Venus are also likely a consequence of the resonance of gravitational tides.

Flashes and spots on the sun are in some sense identical to the process of formation of the desert belt on earth. Just because the sun is a fluid in its purest form, we can observe it online. At the same time, the process of formation of stress-strain states due to the resonance of gravitational tides is more complex. Simply put, it is possible to liken the earth-moon barycenter to the sun-Jupiter barycenter.

In the future, it will be interesting to calculate the resonances of gravitational tides for systems of the galaxy-star, galaxy-galaxy, black hole-star type. It is important to check the possibility that such systems are sources of ultra-energetic cosmic radiation, identical to how the resonance of gravitational tides creates Kukharev regions in the Earth-Moon system in the stratopause (and in some other places) that create electromagnetic waves of the Schumann resonance. In addition, the stress-strain state of the scale of galaxies can create various inhomogeneities, voids, such as void Volopas.

About 78% of all lightning discharges are concentrated in the tropical and equatorial zone (from 30° north latitude to 30° south latitude). This is a fact. It is explained by the fact that the resonances of gravitational tides most often form Kukharev regions in this area high in the atmosphere, which actually provoke lightning discharges.

And then the author wants to show\prove that each time the resonance of gravitational tides, forming high in the atmosphere of the Kukharev region (the strongest ones are in the stratopause) creates cyclones and anticyclones. Information about all cyclones (and anticyclones) is publicly available here.

Once again, the author wants to draw attention separately—different combinations of gravitational factors at the moments of resonance of gravitational tides give different amounts of energy and, accordingly, the formation of "weak" or "strong" Kukharev region, "weak" or "strong" cyclones and other consequences.

Here are some examples of the occurrence of cyclones and, for one cyclone, the points of its movement are taken.

| No | Name of the cyclone (or anticyclone) | Year of origin | Month | day | Latitude | Longitude |
|---|---|---|---|---|---|---|
| 1 | ALBERTO | 2018 | 5 | 25 | 18.8N | 87.1W |
| 2 | BERYL | 2018 | 7 | 4 | 10.0N | 34.9W |
| 3 | DEBBY | 2018 | 8 | 2 | 41.2N | 33.7W |
| 4 | GORDON | 2018 | 9 | 2 | 22.4N | 77.0W |
| 5 | HELENE | 2018 | 9 | 7 | 13.4N | 16.8W |
| 6 | HELENE (movement) | 2018 | 9 | 8 | 13.6N | 18.0W |
| 7 | ISAAC | 2018 | 9 | 7 | 13.5N | 35.0W |

Then look at the subsequent graphs (FIG. 38-44)—each time, it was the resonance of gravitational tides that caused the formation of a cyclone.

The most interesting thing is that the cyclone is "coming" from one Kukharev region to another. If the Kukharev region is not nearby (or it is far away), then the cyclone "crumbles" (calms down, the pressure equalizes). Physically, this is understandable—it is important for the eye of the cyclone to constantly move in the area of pressure surges. But the Earth has only one satellite (the Moon). Therefore, cyclones sooner or later crumble in our country, as the Kukharev region sometimes occurs for a while. But Jupiter has 64 satellites. And a huge number of Kukharev regions constantly support the big red spot (giant vortex). Similarly, the situation with the appearance of vortices on other planets, everything depends on the resonances of gravitational tides. And vortices from the Kukharev region between the stars in the center of the galaxy are generally colossal.

Next, let's look at some examples of sprites (lightning that occurs in the upper atmosphere). Data on the facts of the appearance of sprites are taken from open sources (JOURNAL OF GEOPHYSICAL RESEARCH: ATMOSPHERES, VOL. 118, 6607-6632, doi:10.1002/jgrd.50459, 2013).

| No | Date | Latitude | Longitude |
|---|---|---|---|
| 1 | Aug. 27, 2009 | 16.07° N | 83.51° E |
| 2 | Sep. 24, 2013 | 8.41° N | 81.76° E |
| 3 | Aug. 30, 2014 | 27.4° N | 109.6° E |

Figure 45:
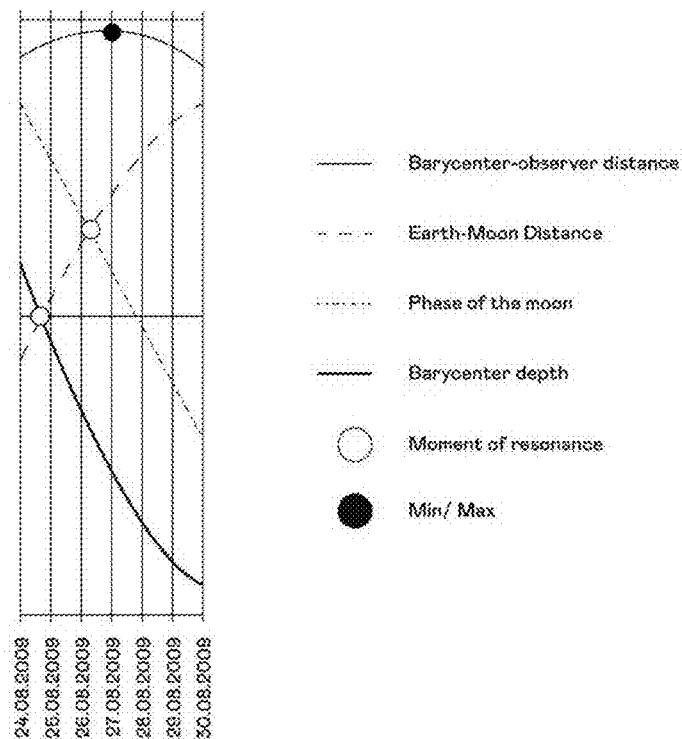
FIG. 45 shows the resonance of gravitational tides that caused the sprite Aug. 27, 2009 (16.07° N, 83.51° E).
Figure 46:
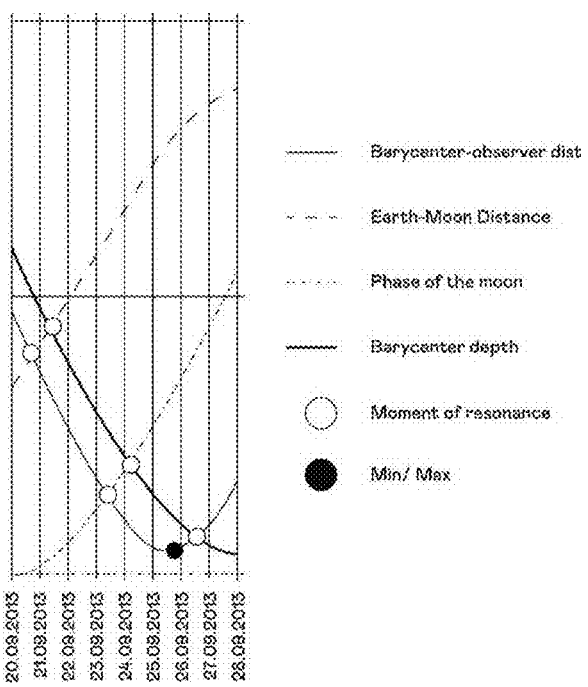
FIG. 46 shows the resonance of gravitational tides that caused the sprite Sep. 24, 2013 (8.41° N, 81.76° E).
Figure 47:
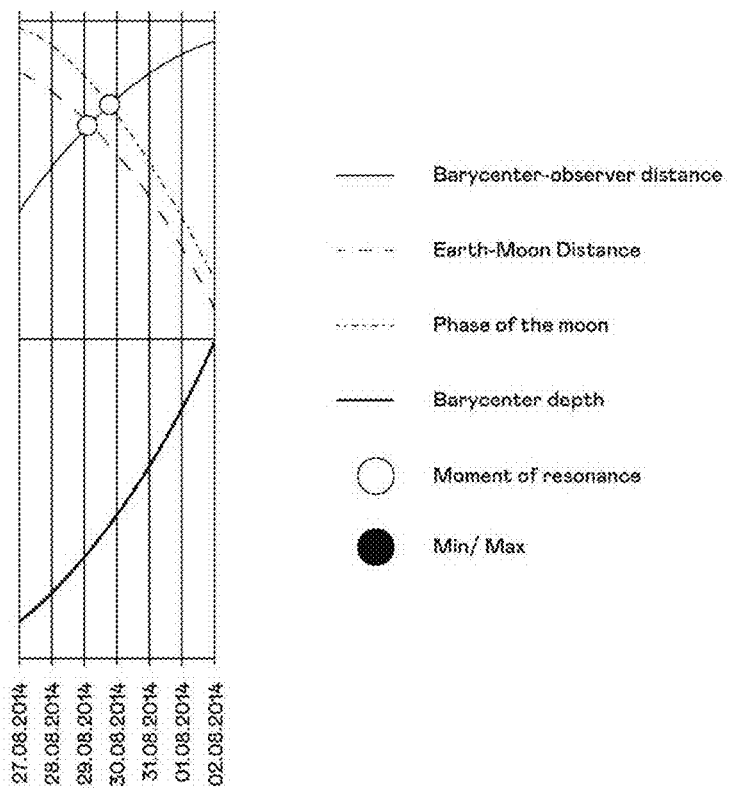
FIG. 47 shows the resonance of gravitational tides that caused the sprite Aug. 30, 2014 (27.4° N, 109.6° E).
Figure 48:
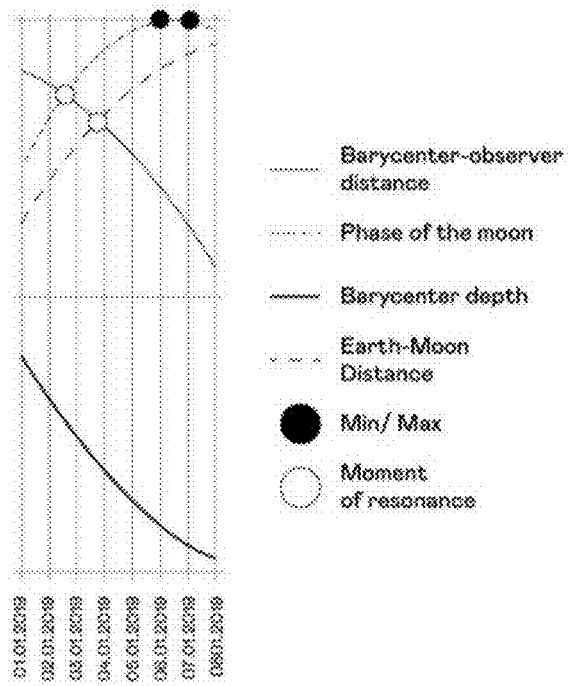
FIG. 48 shows the resonance of gravitational tides that caused the appearance of tornado 1 (Jan. 4, 2019, 31.6165N, 85.2788W).
Figure 49:
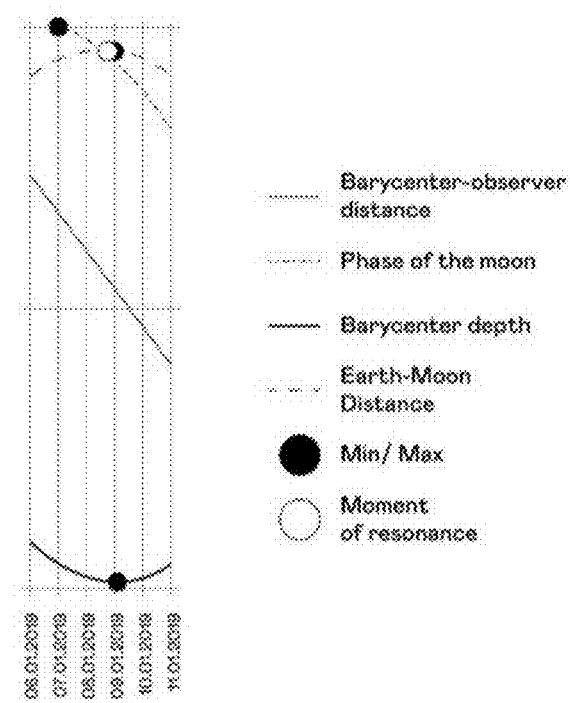
FIG. 49 shows the resonance of gravitational tides that caused the appearance of tornado 2 (Jan. 8, 2019, 41.3226N, 80.8153W).
Figure 50:
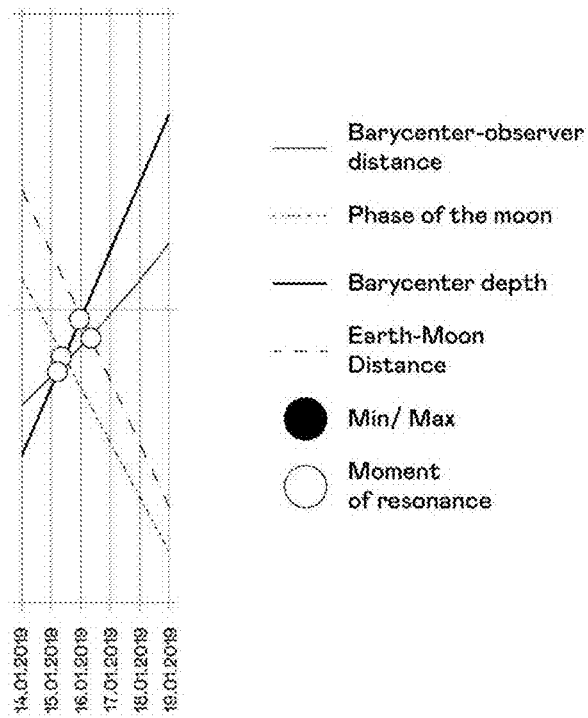
FIG. 50 shows the resonance of gravitational tides that caused the appearance of tornado 3 (Jan. 17, 2019, 41.3226N, 119.5600W).
Figure 51:
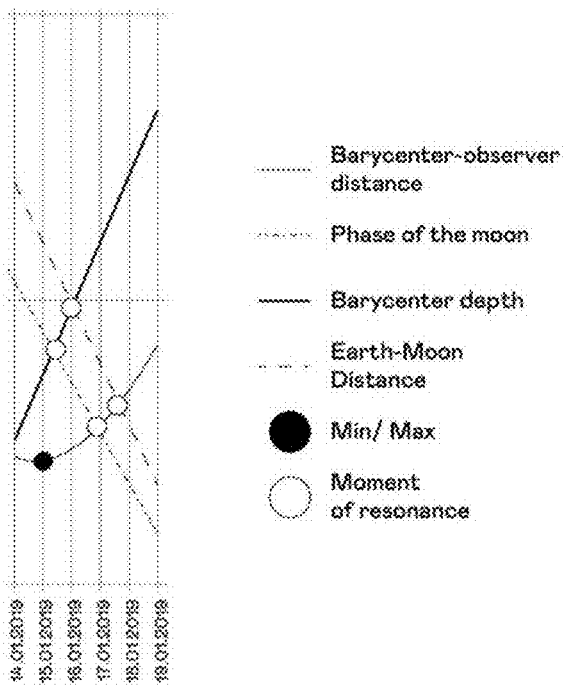
FIG. 51 shows the resonance of gravitational tides that caused the appearance of tornado 4 (Jan. 18, 2019, 41.3494N, 88.2408W).
Figure 52:
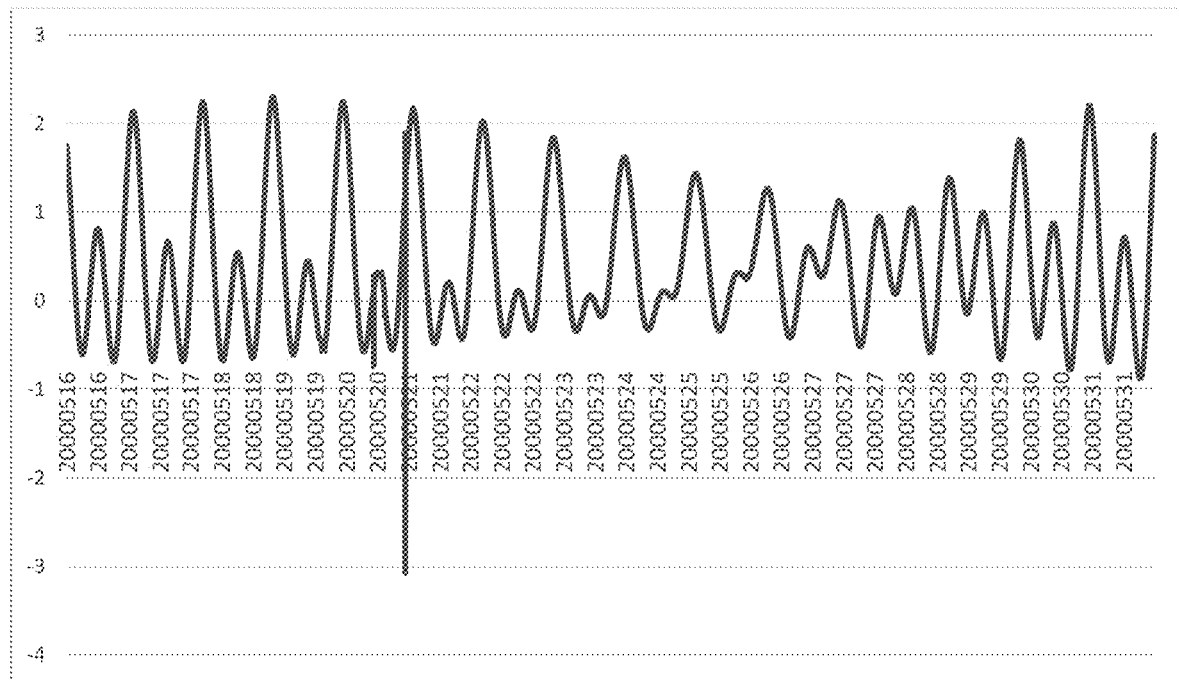
FIG. 52 shows the gravitational field fluctuations. The full analog of "flyby anomaly" is seen only at ground level. May 20, 2000, Kyoto, Japan.
Figure 53:
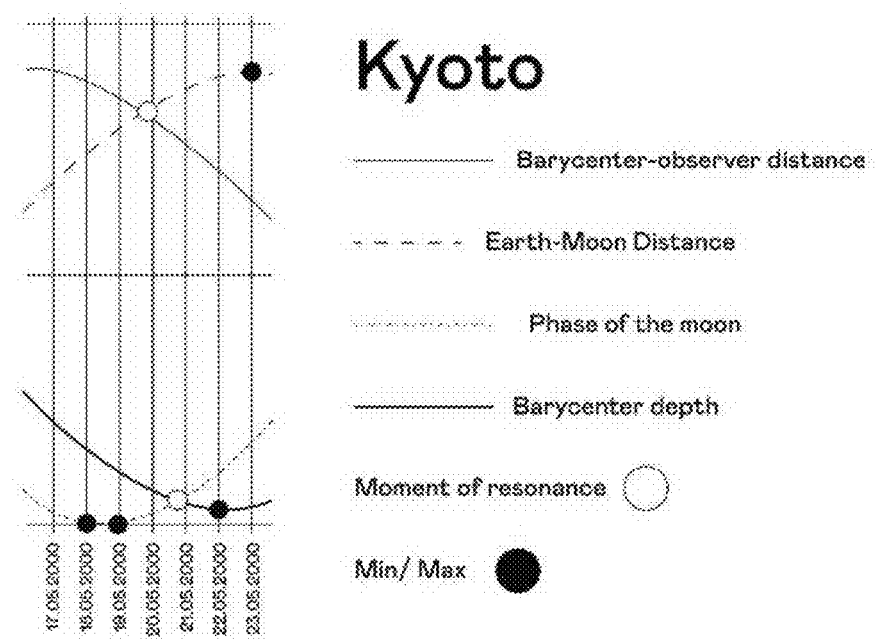
FIG. 53 shows the formation of a gravitational resonance in the Kukharev region. May 20, 2000, Kyoto, Japan. An instantaneous jump in gravity is visible here, this is a fact. When gravity decreases so sharply "a little bit", any real object in the Kukharev region will receive additional acceleration (as is happening now with spacecraft).
Figure 54:
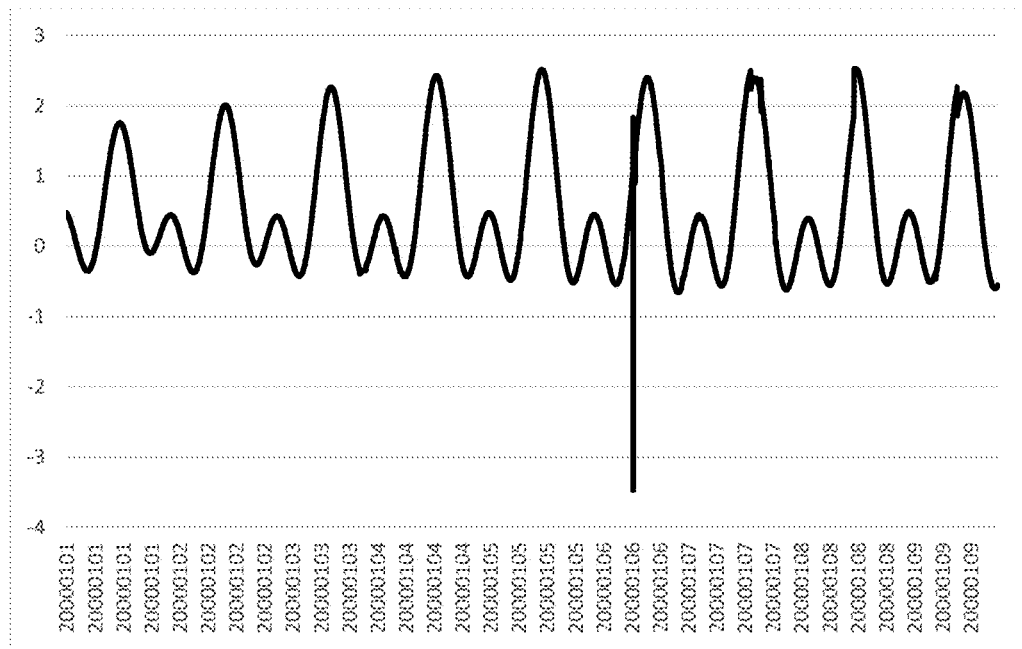
FIG. 54 shows the gravitational field fluctuations (Kyoto Tracking Station). The full analog of "flyby anomaly" is seen only at ground level. Jan. 6, 2000.
Figure 55:
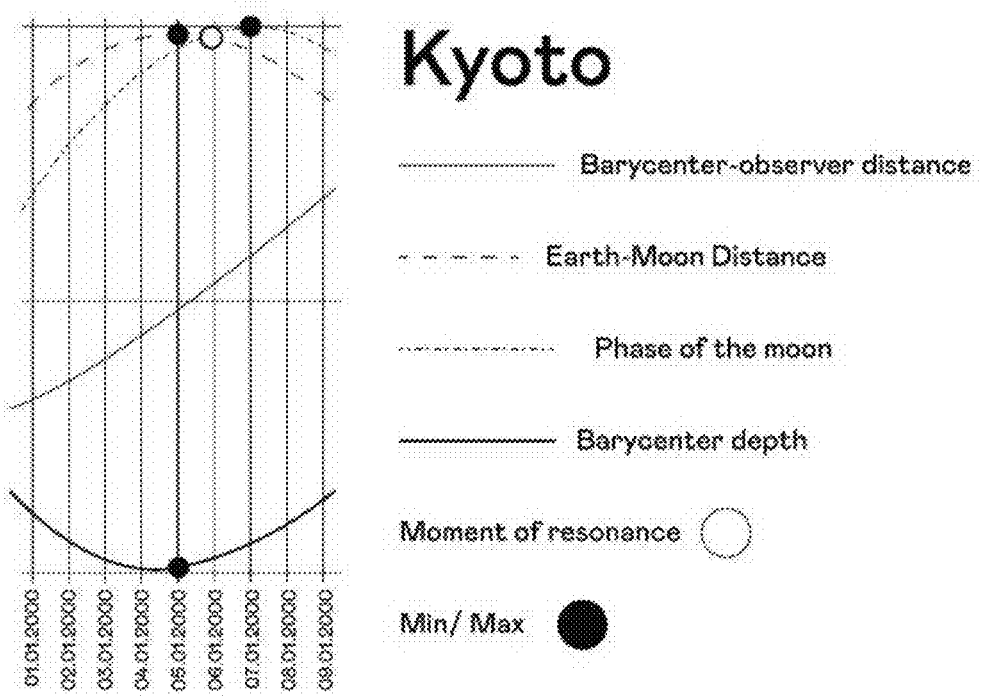
FIG. 55 shows resonance formation. Jan. 6, 2000.
Figure 56:
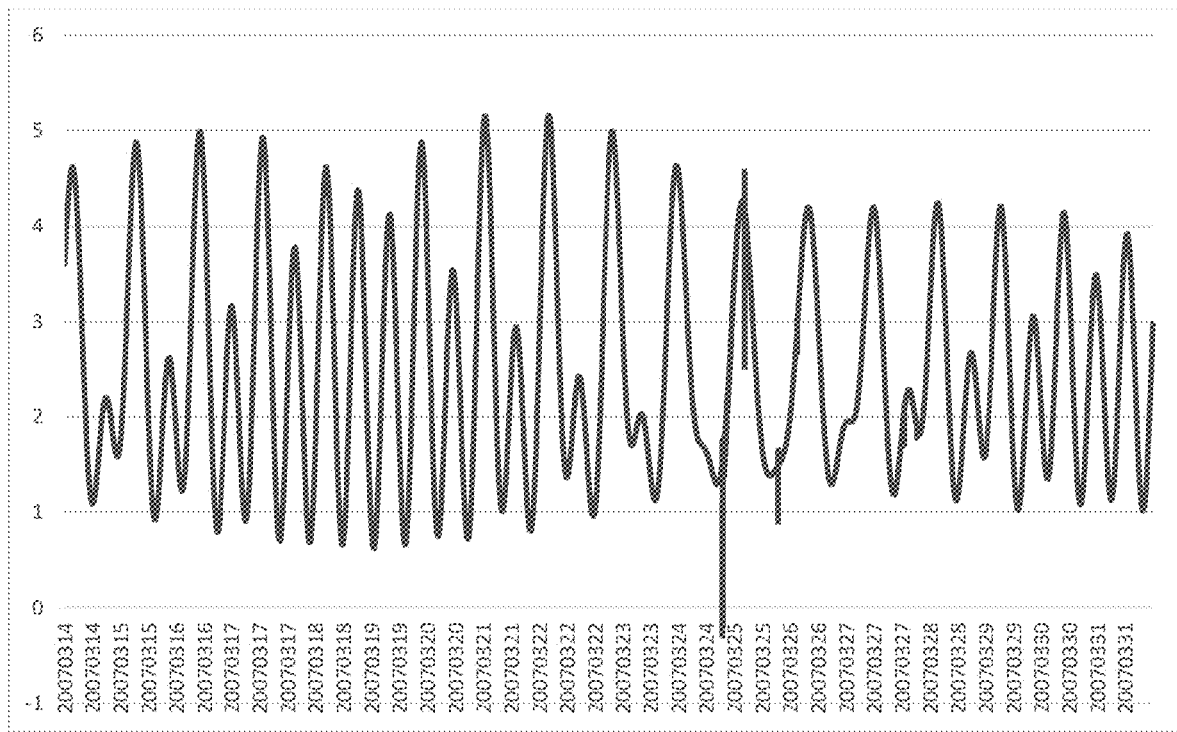
FIG. 56 shows data from Kamioka Earth Gravity Field Tracking Station in Japan (Latitude 36.42530N; Longitude 137.30840 E). The full analog of "flyby anomaly" is seen only at ground level. The Kukharev region consists of gravitons. Mar. 24, 2007.
Figure 57:
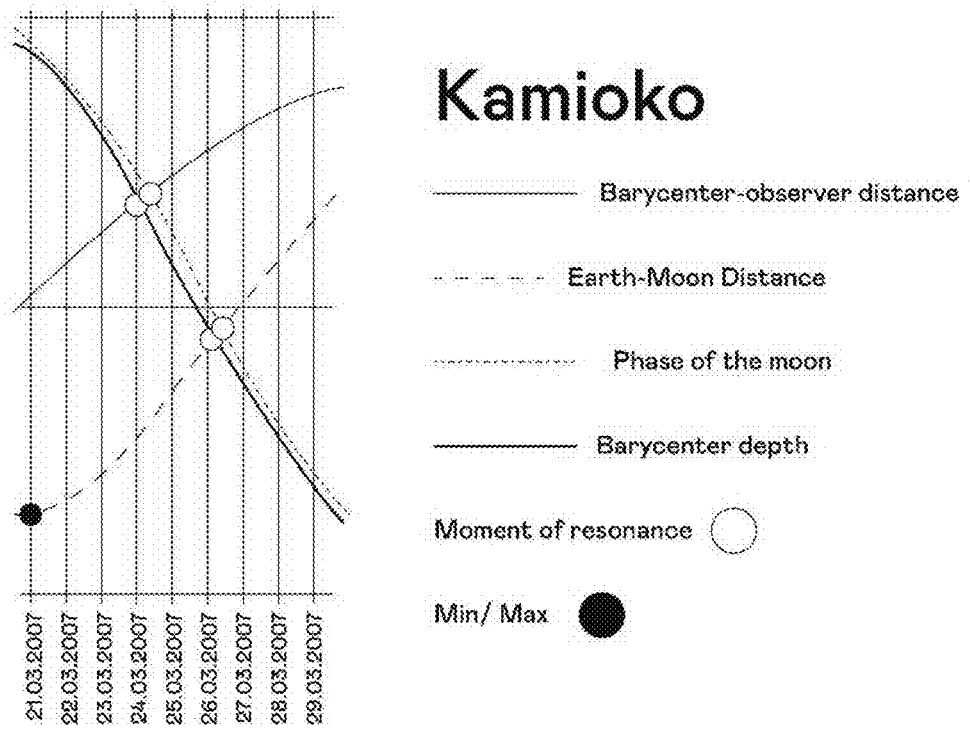
FIG. 57 shows resonance formation. Mar. 24, 2007.
Figure 58:
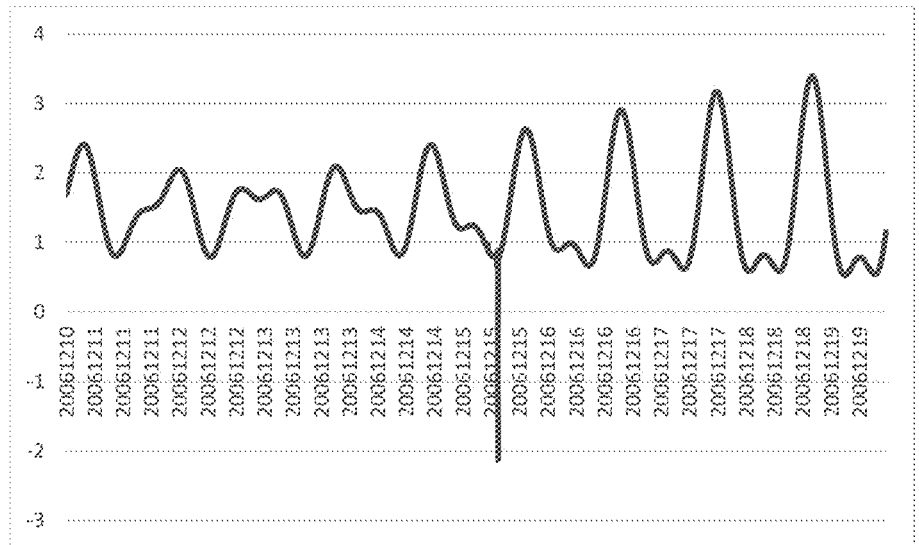
FIG. 58 shows the gravity jump at a tracking station in Vena, December 2006 (48.2493N, 16.3579E).
Figure 59:
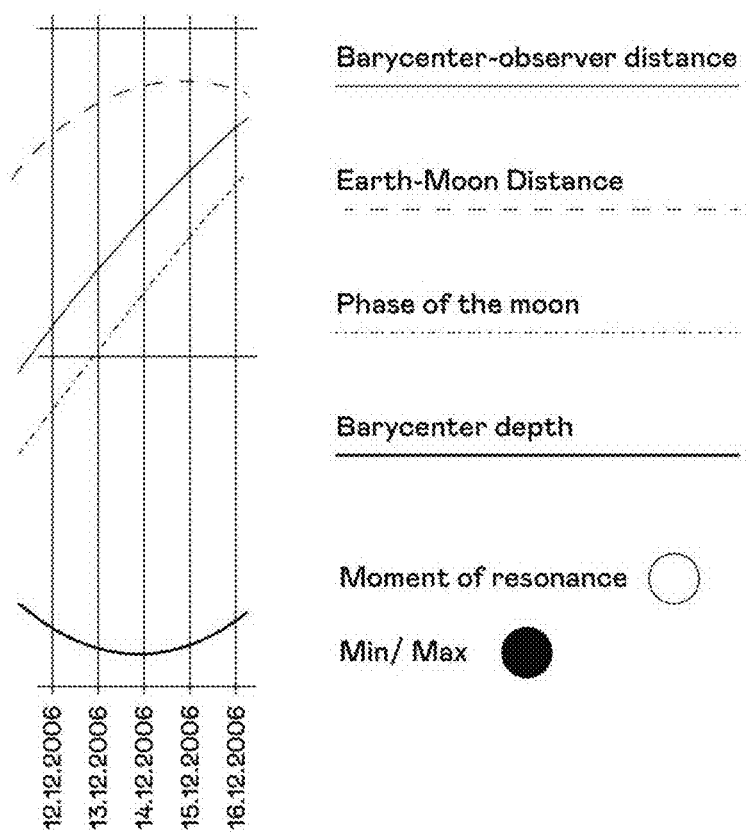
FIG. 59 shows the reasons for the gravitational jump at a tracking station in Vena (December 2006), as shown in FIG. 58.
Figure 60:
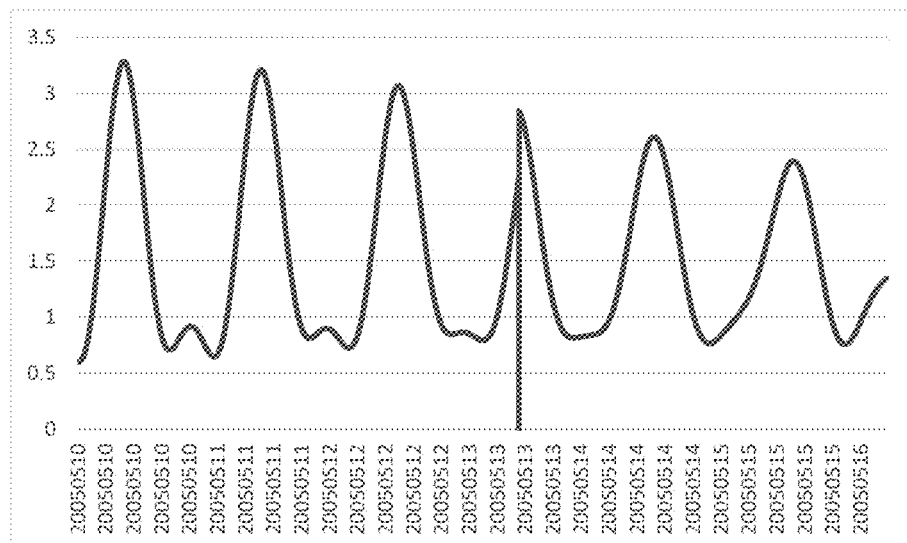
FIG. 60 shows the gravity jump at a tracking station in Vena (May 2005).
Figure 61:
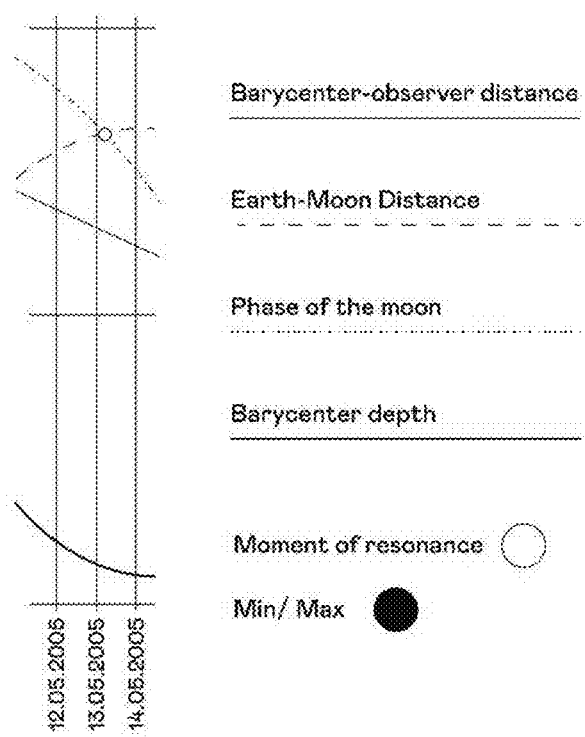
FIG. 61 shows the reasons for the gravitational jump at a tracking station in Vena (May 2005), as shown in FIG. 60.
Figure 62:
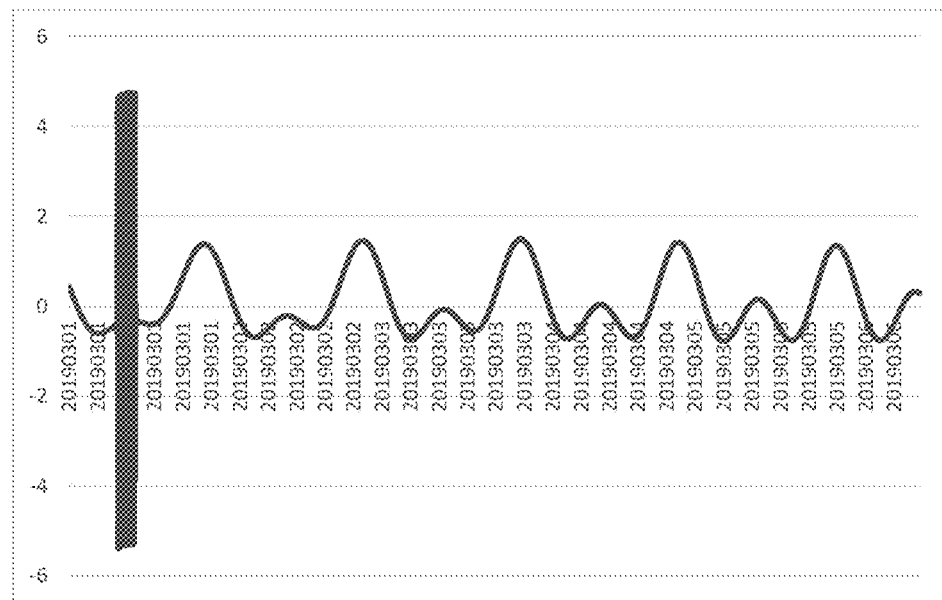
FIG. 62 shows the gravity jump at the tracking station in Germany (Zugspitze, N, Latitude (deg): 47.4207; E, Longitude (deg): 10.9847) in March 2019.
Figure 63:
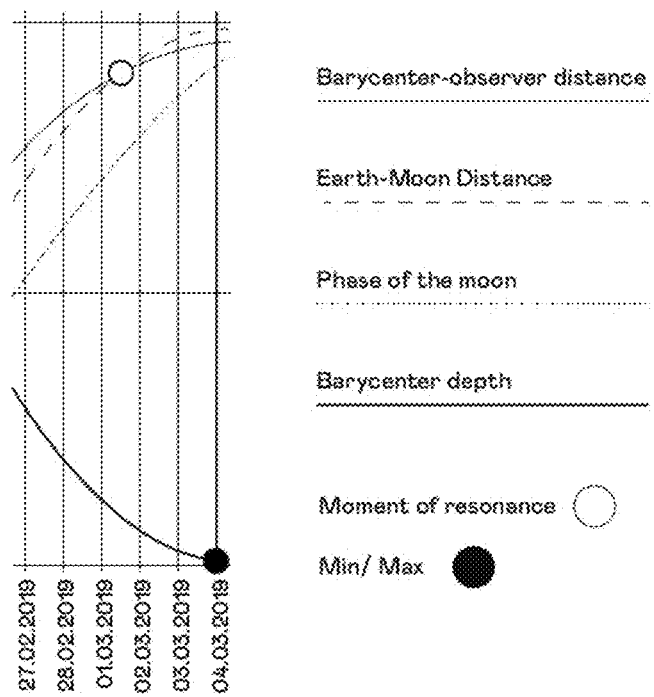
FIG. 63 shows the reasons for the gravitational jump in Germany in March 2019 (gravitational resonance on March 1), as shown in FIG. 62.
Figure 64:
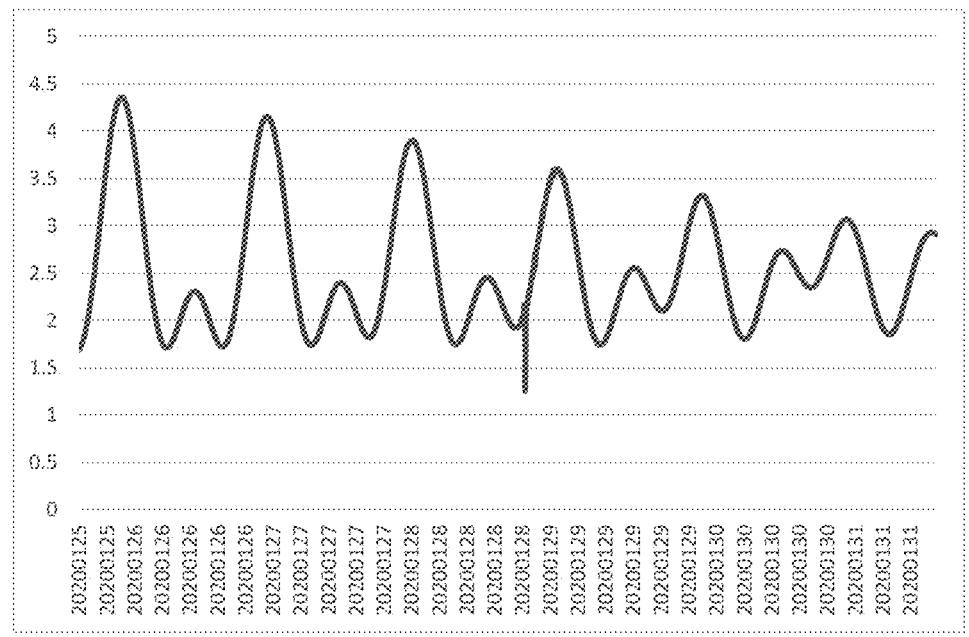
FIG. 64 shows the gravity jump at the tracking station in Germany in January 2020.
Figure 65:
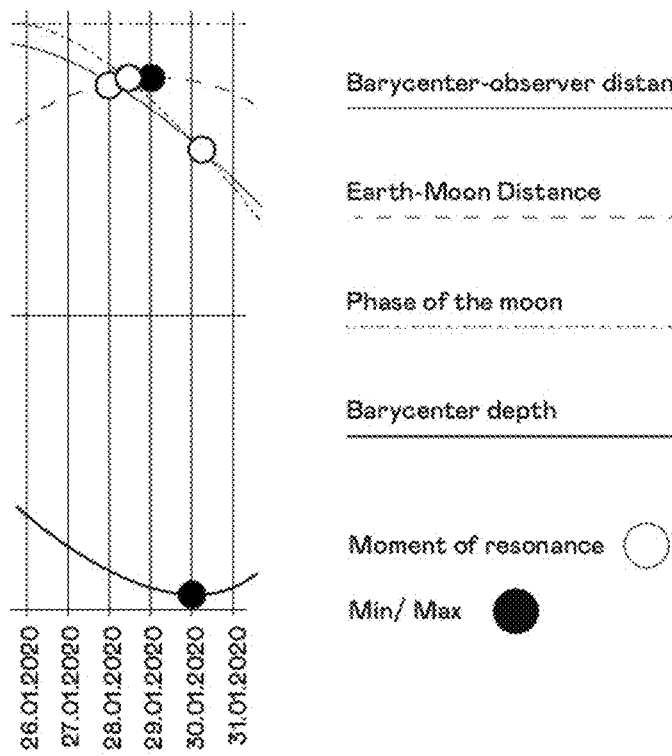
FIG. 65 shows the reasons for the gravitational jump in January 2020, as shown in FIG. 64
Figure 66:
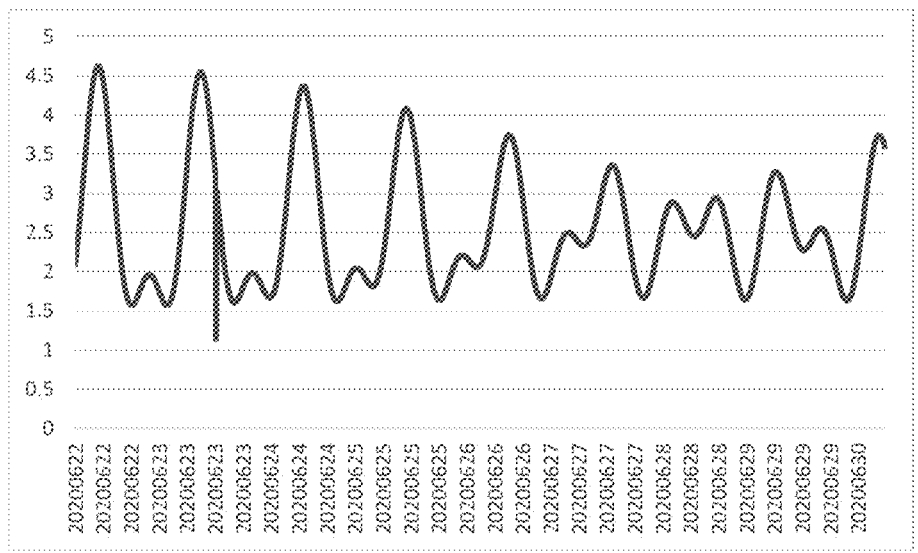
FIG. 66 shows the gravity jump at the tracking station in Germany in June 2020.
Figure 67:
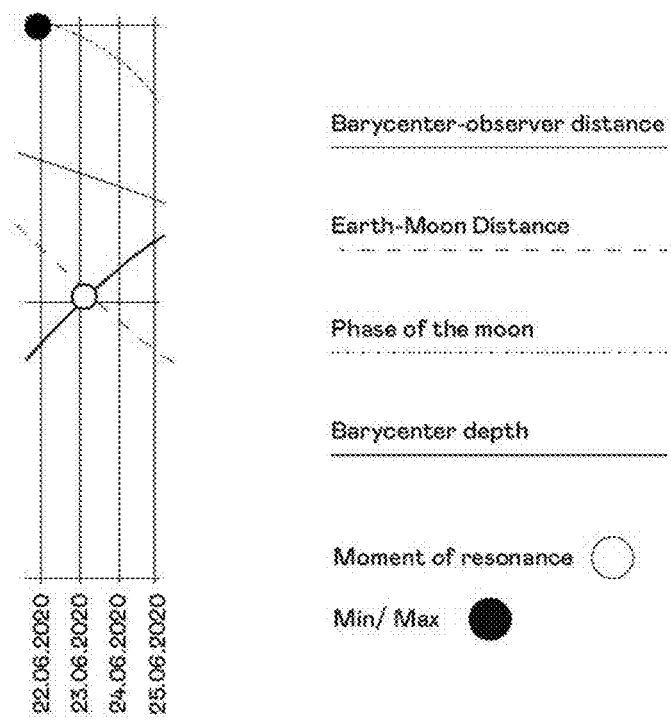
FIG. 67 shows the reasons for the gravitational jump in Germany in June 2020, as shown in FIG. 66
Figure 68:
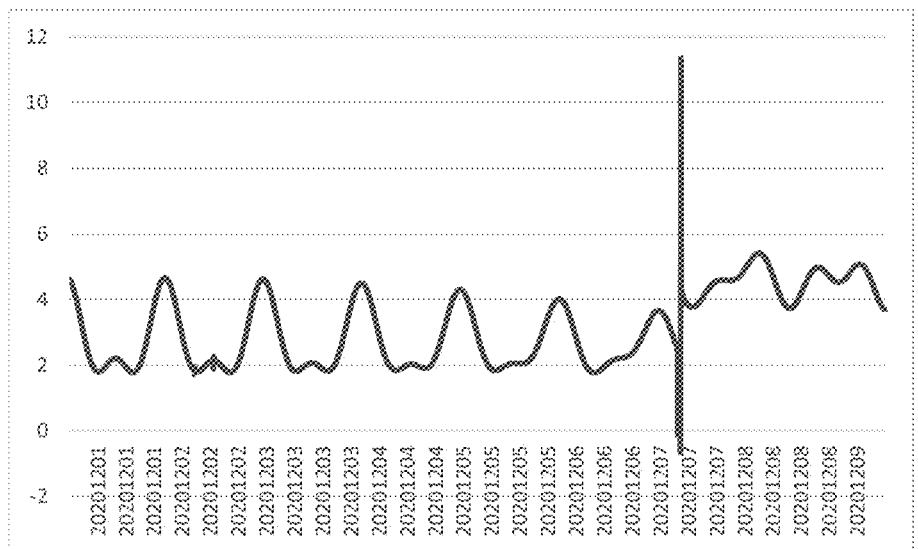
FIG. 68 shows the gravity jump at the tracking station in Germany in December 2020.
Figure 69:
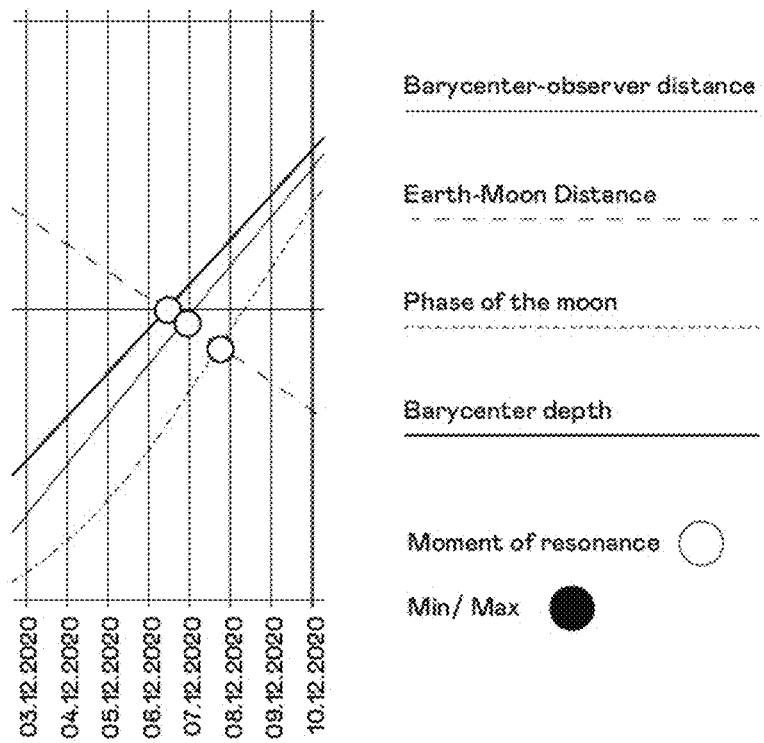
FIG. 69 shows the reasons for the gravitational jump in Germany in December 2020, as shown in FIG. 68.
Figure 70:
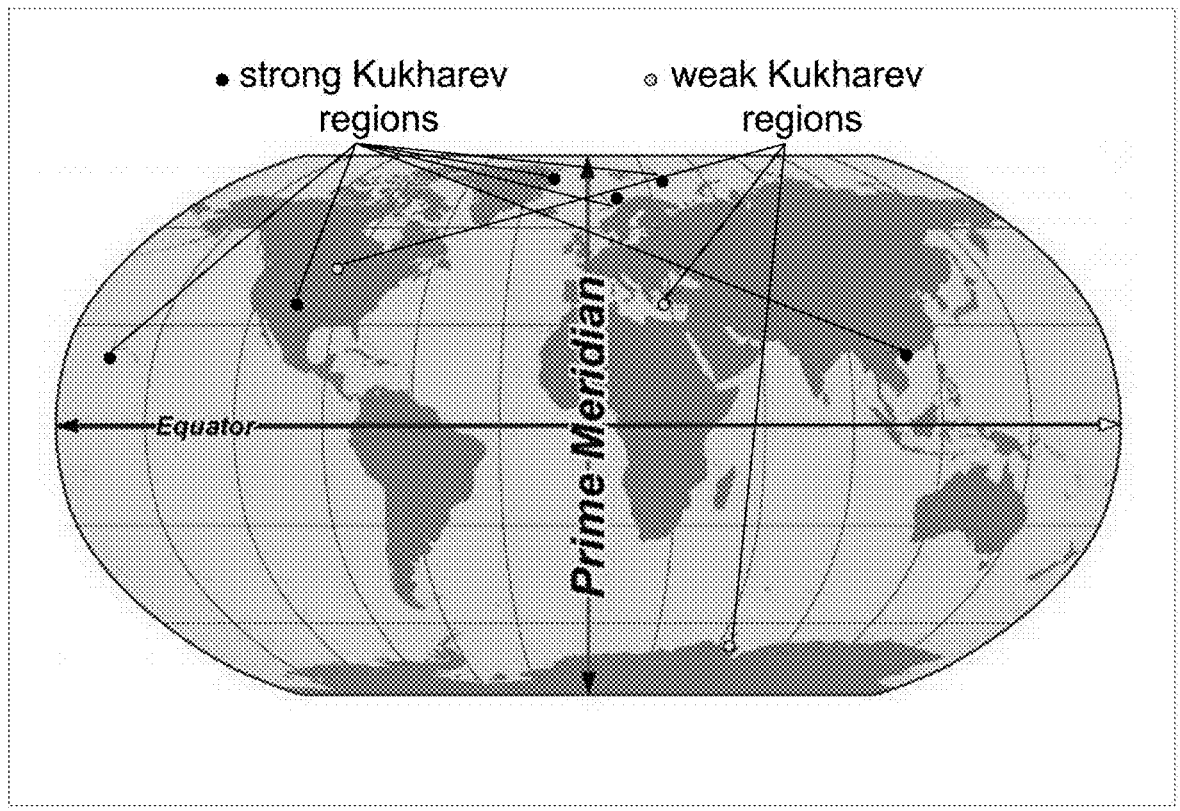
FIG. 70 shows the conditional general result of calculating the Kukharev areas for the forecast of various weather events.
Figure 71:
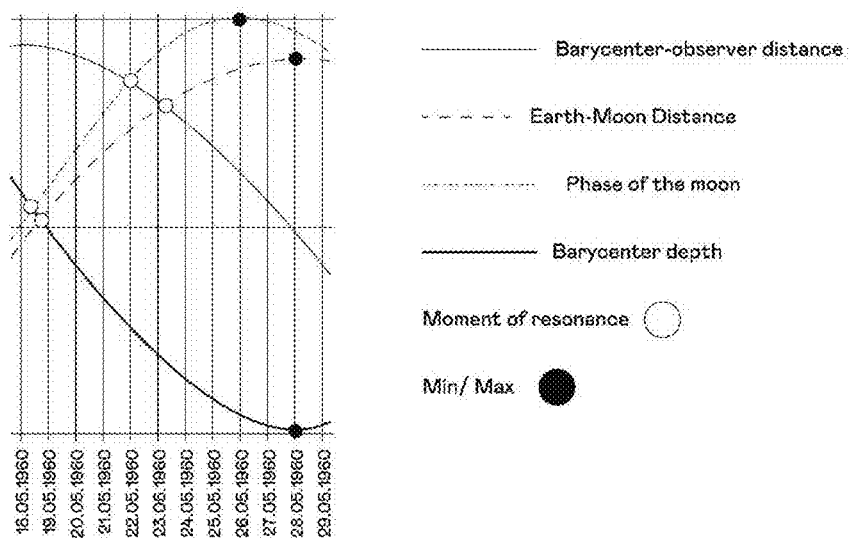
FIGS. 71-75 show gravitational resonances, each of which was the trigger for the largest earthquakes in the USA, Chile, Japan, and Indonesia.
Figure 72:
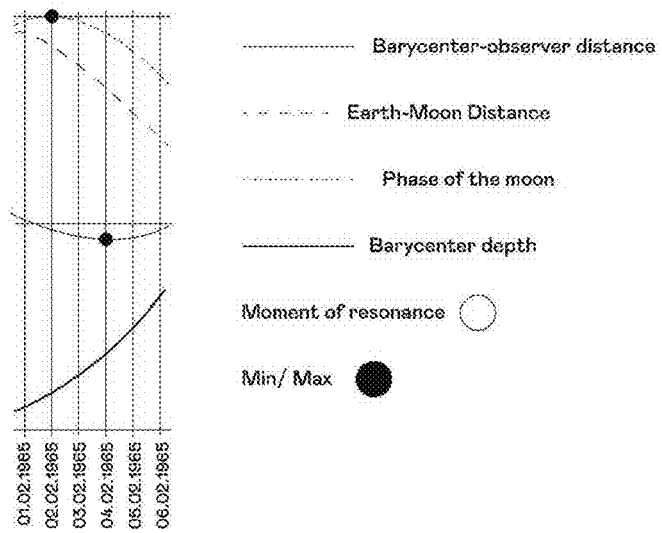
Figure 73:
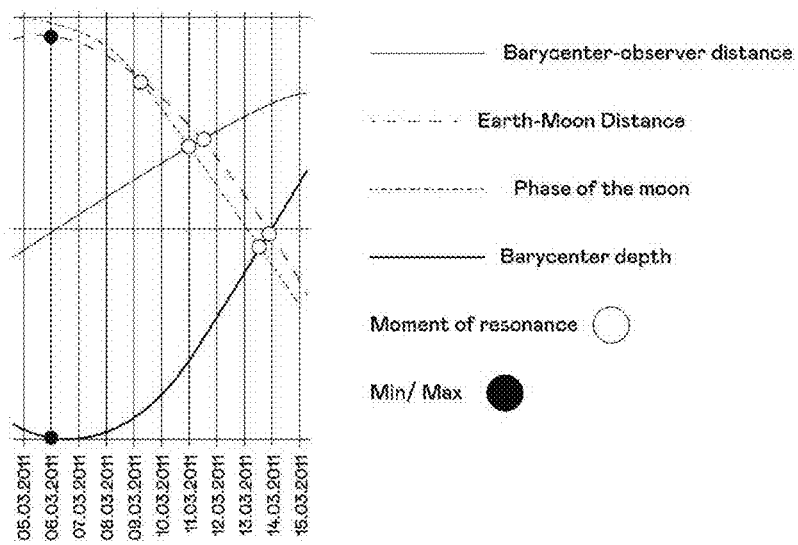
Figure 74:
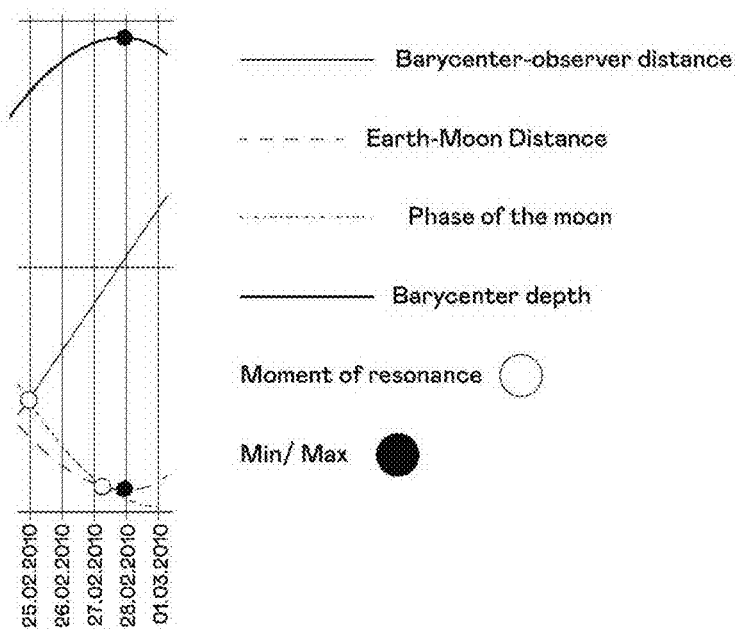
Figure 75:
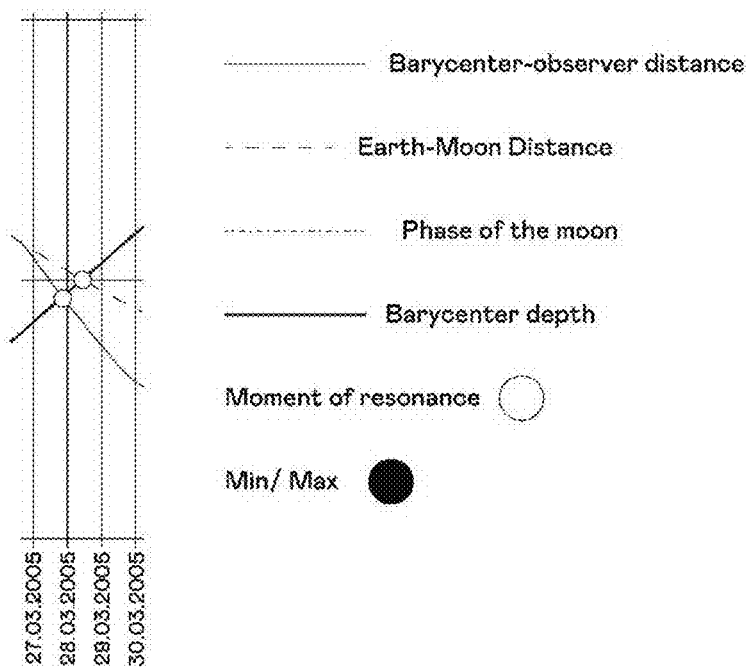

And now look at their causes—the resonances of gravitational tides (FIG. 45-47).

Next, let's look at some examples of tornadoes. The initial tornado data is taken from US Storm Prediction Center.

| No | Ordinal number in the internal reference frame | Date | Latitude | Longitude |
|---|---|---|---|---|
| 1 | 617025 | 04, Jan. 2019 | 31.61652N | 85.2788W |
| 2 | 617029 | 08, Jan. 2019 | 41.3226N | 80.8153W |
| 3 | 617031 | 17, Jan. 2019 | 36.8400N | 119.5600W |
| 4 | 617032 | 18, Jan. 2019 | 41.3494N | 88.2408W |

And below are graphs showing that it was the resonances of gravitational tides that caused these tornadoes (FIG. 48-51). You see cause and effect.

The author wanted to pay attention to several things in terms of tornado formation:

1) Using the example of a tornado, you can also see that the resonance of gravitational tides occurs immediately over a large area (when several tornadoes can occur simultaneously over an area of tens of kilometers).

2) Not every gravitational resonance forms a tornado. Additional factors are needed. But it is resonance that is a necessary and key factor that gives energy to each tornado, creating areas of discharge in the Kukharev regions. Additional factors leading to the formation of tornadoes may be the joints of atmospheric fronts, the presence of large masses of water (near the sea, for example).

3) An important factor is the amount of energy that creates a gravitational resonance. And the amount of energy depends (it was described above) it depends on which gravitational factors resonate.

The author wanted to pay special attention to the stimulation of the growth of living cells. It is known that ultrasound activates the human immune system at a certain threshold for cell growth (with a strong level of radiation, cells will simply die). The low-frequency resonance of gravitational tides causes electromagnetic radiation in the Kukharev regions over a significant area. That is, the intensity of electromagnetic waves is increasing, which negatively affects living cells. Plus, the cells additionally sway at the moment of resonance (as independent fluids).

The moment of resonance can be used as a moment when you have additional energy to activate the growth of bone and muscle tissue cells. In addition to ultrasonic radiation.

Dynamics of the angular velocity of the Earth (and other planets) around the Sun, the Sun around the Galactic core, our entire galaxy around the center of galaxies are all evidence of the existence of tension at the level of gravitational potentials in the Kukharev regions.

The Sun moves at a speed of about 220-250 kilometers per second around the center of the Galaxy and makes a complete revolution around its center, according to various estimates, in 220-250 million years. Kukharev regions—responsible for the existence of the transfer of a "portion" of sometimes positive and sometimes negative angular momentum through the surface layer of the atmosphere, which leads to long-period irregularity of the Earth's rotation. Similarly for the movement of the Sun, Galaxy, and so on. Planets move from one gravitational resonance to another, just as cyclones move from one Kukharev region to another.

The main (strongest) gravitational factors for various systems of three bodies are presented in the table.

In addition to them, there are also "weak" gravitational factors, such as, for example, daily and half-day fluctuations, but statistically they are less significant than the main ones listed. When graphically calculating the moments of resonances, of course, it is necessary to normalize the scale of the graph.

| | The system of three bodies "Sun-Earth-Moon" | The system of three bodies "The Core of the Galaxy is the Sun-Earth" | The three-body system "The center of the local supercluster-The Core of the Galaxy-the Sun" |
|---|---|---|---|
| The main gravitational factors | Moon Phase (for Earth) | Earth Phase (for Sun) | Sun Phase (for The Center of the Galaxy) |
| | Earth-Moon Distance | Sun-Earth Distance | Distance The Center of the Galaxy is the Sun |
| | The distance from the observer on Earth to the Earth-Moon barycenter | Distance from the observer on the Sun to the Earth-Sun barycenter | Distance from the observer at the center of the galaxy to the barycenter "Sun - Center of our Galaxy" |
| | Depth of the Earth-Moon barycenter | Depth of the Sun-Earth barycenter | Depth of the Galactic Center-Sun barycenter |

There are objective limits to the accuracy of modern gravimeters, "small" adjustments of the earth's orbit associated with resonances of the galactic center level (which affect the earth), we can simply not track. It is easier to track them at the level of the Sun/solar system by taking the distance to the center of the galaxy as a constant (in resonance graphs, this can be represented as a line parallel to the abscissa axis). Plus, estimates of the distance from the Sun to the center of our galaxy are "floating", there are limits to modern telescopes.

Next, the author wants to show objective open data of gravimeters for different points of the earth. And time after time, you can see evidence of the existence of the Kukharev region. Pairwise comparisons of gravity jumps and their causes are shown in FIGS. 52-69.

Bursts of the gravitational field can in some sense sometimes be considered resonances of extremes, a tug of war.

For example, at those moments when the Earth-Moon Distance (EMD) is at its maximum and the depth of the barycenter (BD) is at its minimum, or when the Earth-Moon Distance is at its minimum and the depth of the barycenter is at its maximum. Sometimes one extreme (for example, the minimum Barycenter-observer distance (BOD)) enough by itself to cause a jump in gravity.

There are cases of double resonance at one moment (Kamioka Apr. 21, 2019) when two pairs of flows (EMD-PM, BD-BOD) intersect, which also cause jumps.

There are moments when the maximum phase of the moon (new moon) at the same time you have (for certain points) the minimum depth of the barycenter and then conditionally Moon reduces the flow of absorption energons for a particular point on the Earth (gravity goes down).

A possible description of entropy is simply the density of an elastic energy-boson field. Or you can say this field itself. Imagine an energy-bosonic field in the form of seawater, with its properties such as compressibility and gravitational turbulence, which is based on the concept of seawater density. The energy-boson field equalizes the parameters in a closed system, since it is more energetically advantageous for the substance to align (diffusion process). Allegorically, this process is identical to the process of changing the spins of electrons in a magnetic field.

When calculating gravitational resonances, it is important to remember (the author mentioned this above) about calculating the order/degree of coincidence of the phases of motion of gravitational factors. Plus, we must remember that when two tides are in opposite phase, they extinguish each other, and if the phases coincide, then this is a super tide.

From the point of view of a stationary observer, the constant jumps of gravity are extremely interesting at those times when, relative to the observer, the Earth-Moon barycenter is at its extreme values (minimum or maximum distance). The whole movement of the bodies resembles alternating tug-of-war in different directions.

The graphs of gravitational factors are constructed according to Greenwich Time.

FIG. 71-75 show gravitational resonances, which became the "trigger" for the largest earthquakes in the USA, Chile, Japan, Indonesia

| N0 | Place | Magnitude | GPS-coordinates | The fact of correlation of the earthquake moment with the gravitational resonance (or energy resonance) |
|---|---|---|---|---|
| 1 | May 22, 1960 | Valdivia, Chile | 9,5 | 38.14° C 73.41° W |
| 2 | Mar. 11, 2011 | Sendai, Japan | 9,1 | 38.30° N 142.37° E |
| 3 | Feb. 4, 1965 | Rat Islands, Alaska, USA | 8,7 | 51.25° N 178.72° E |
| 4 | Mar. 28, 2005 | Sumatra, Indonesia | 8,6-8,7 | 2.09° N 97.11° E |
| 5 | Feb. 27, 2010 | Maule, Chile | 8,8 | 36.12° C 72.90° W |

Figure 76:
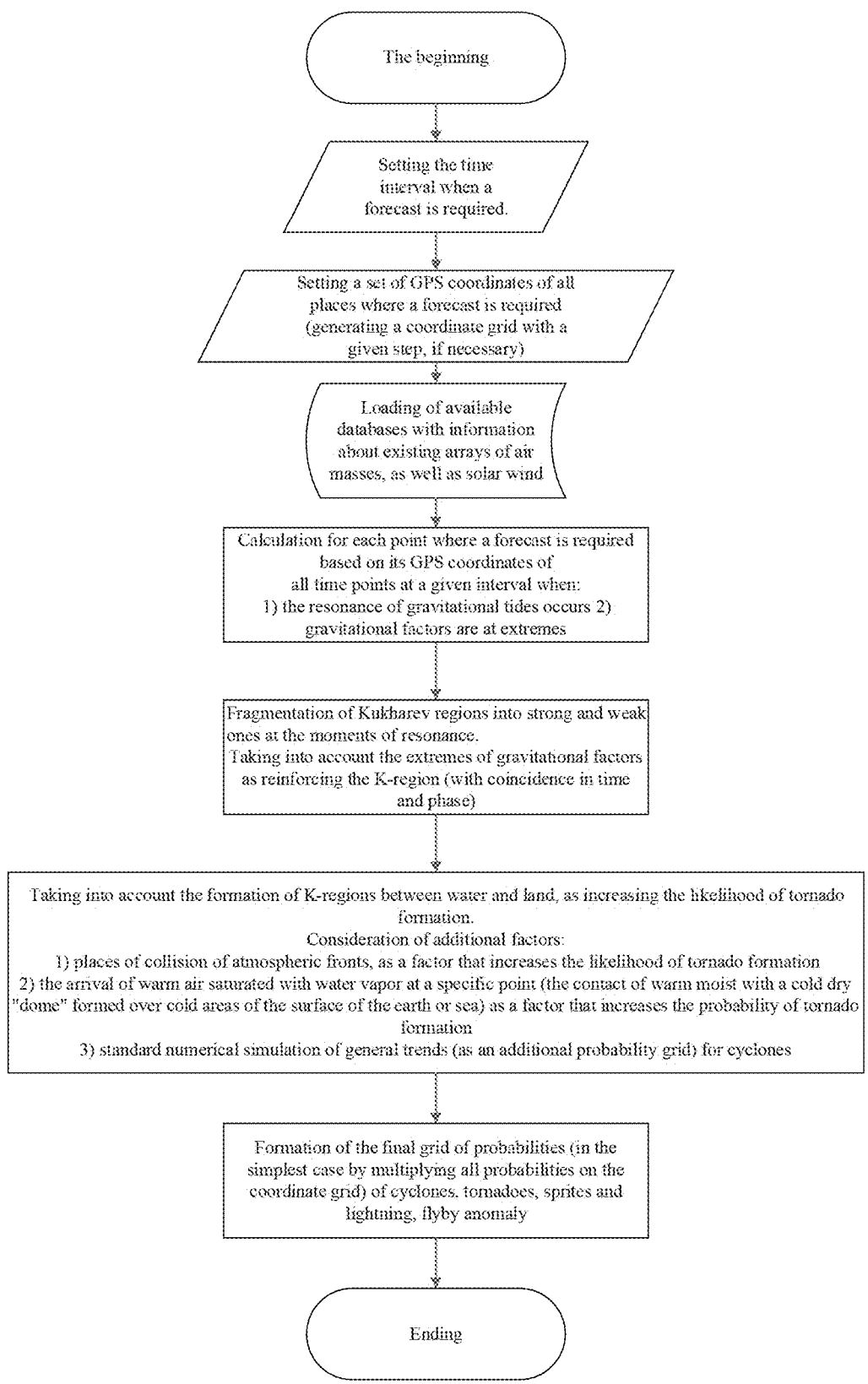
FIG. 76 shows a flowchart of an algorithm, based on the present invention, for forecasting cyclones, tornadoes, sprites, and lightning, as well as the flyby anomaly.
Figure 77:
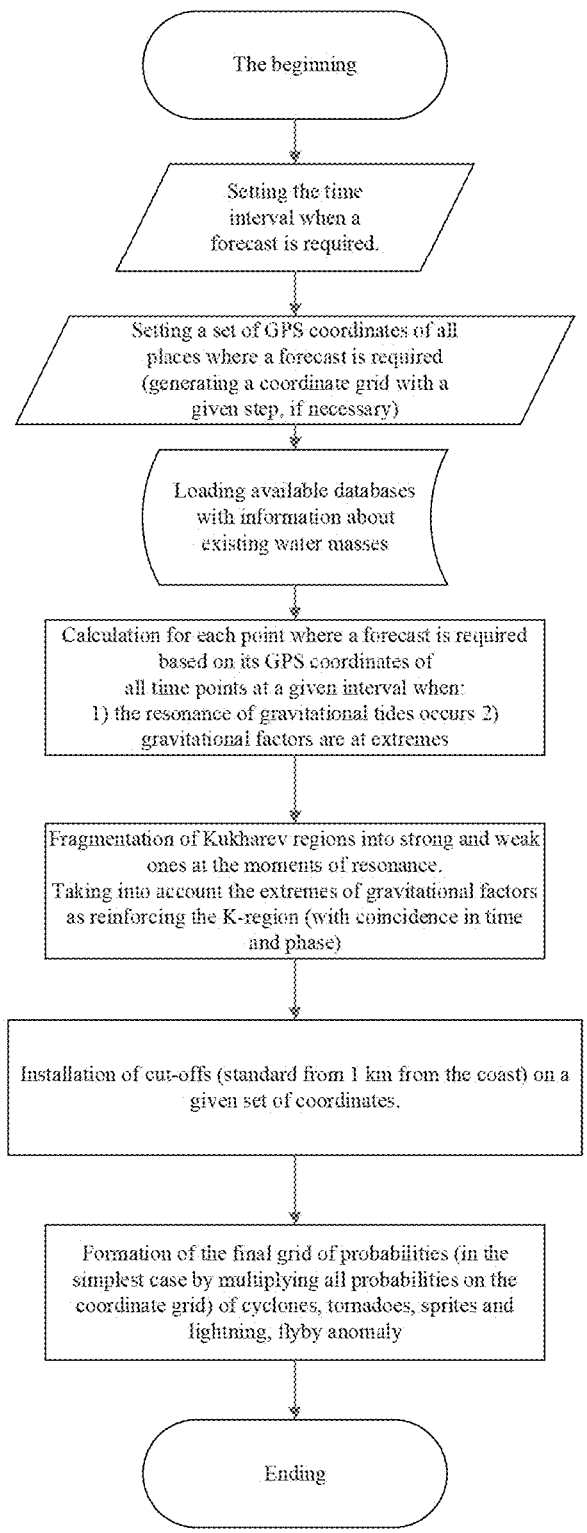
FIG. 77 shows a flowchart of the rogue wave prediction algorithm.
Figure 78:
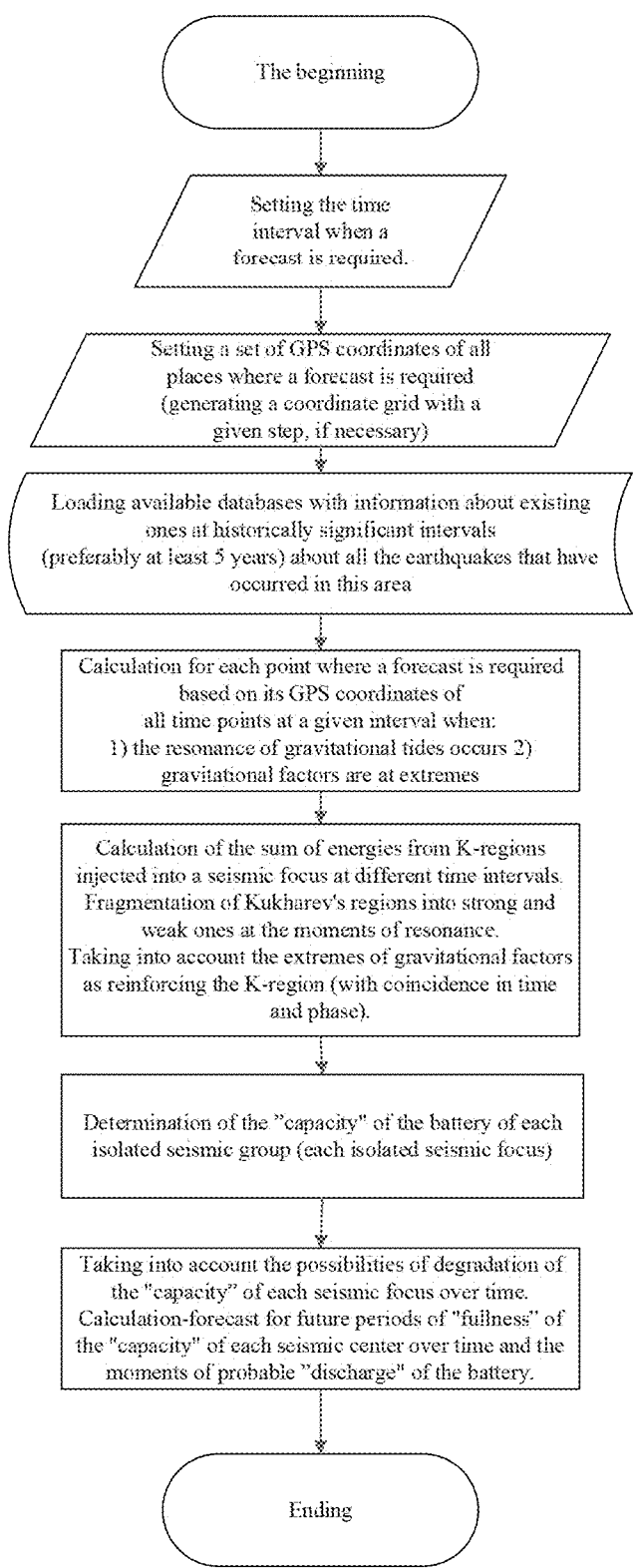
FIG. 78 shows a flowchart of an earthquake prediction algorithm. It is further noted that the above mechanism of the summation of energies in K-regions deep underground, when predicting earthquakes, also causes the formation of various minerals such as oil and the synthesis of other elements.
Figure 79:
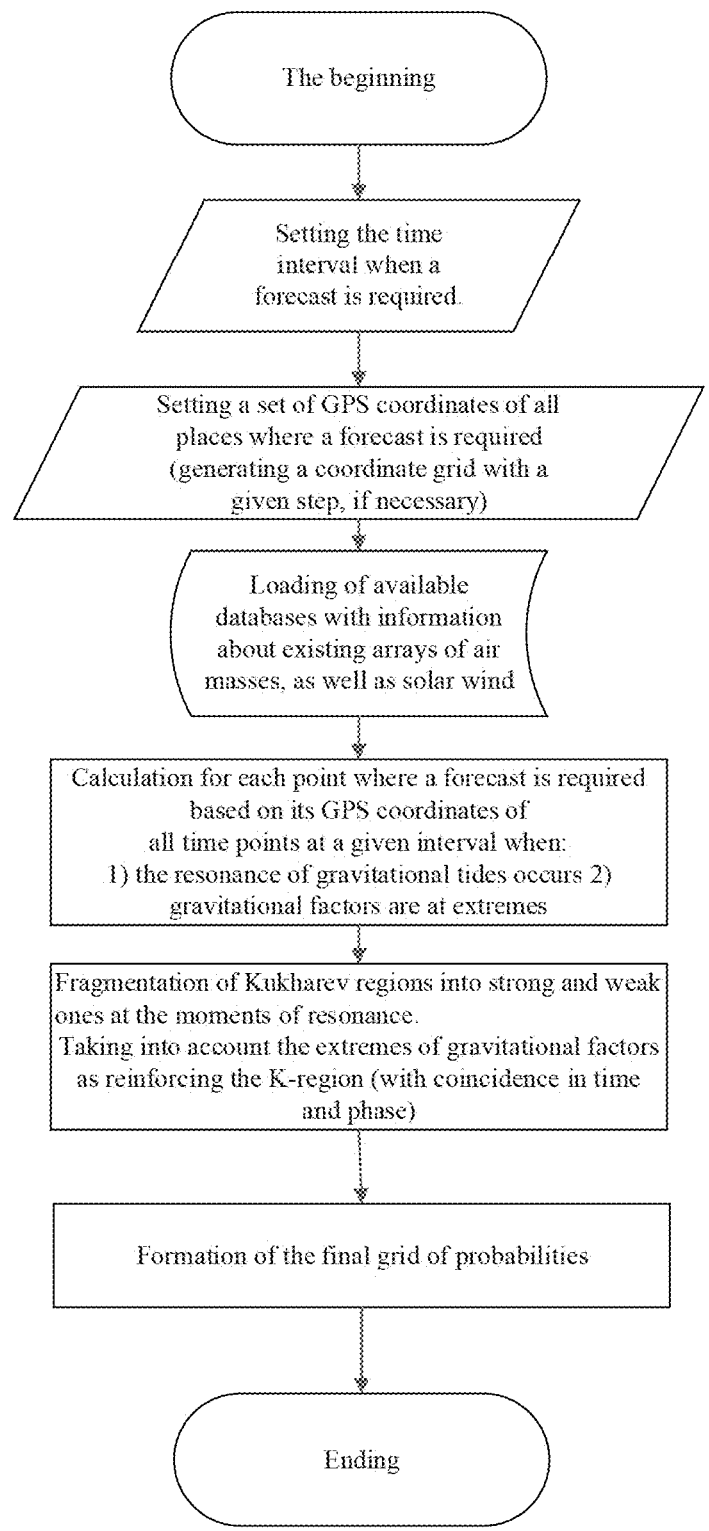
FIG. 79 shows a flowchart of an algorithm for predicting moments of time with generally unfavorable conditions for cardio-dependent individuals (e.g., increasing the likelihood of thrombosis, heart attacks, and strokes in such individuals).
Figure 80:
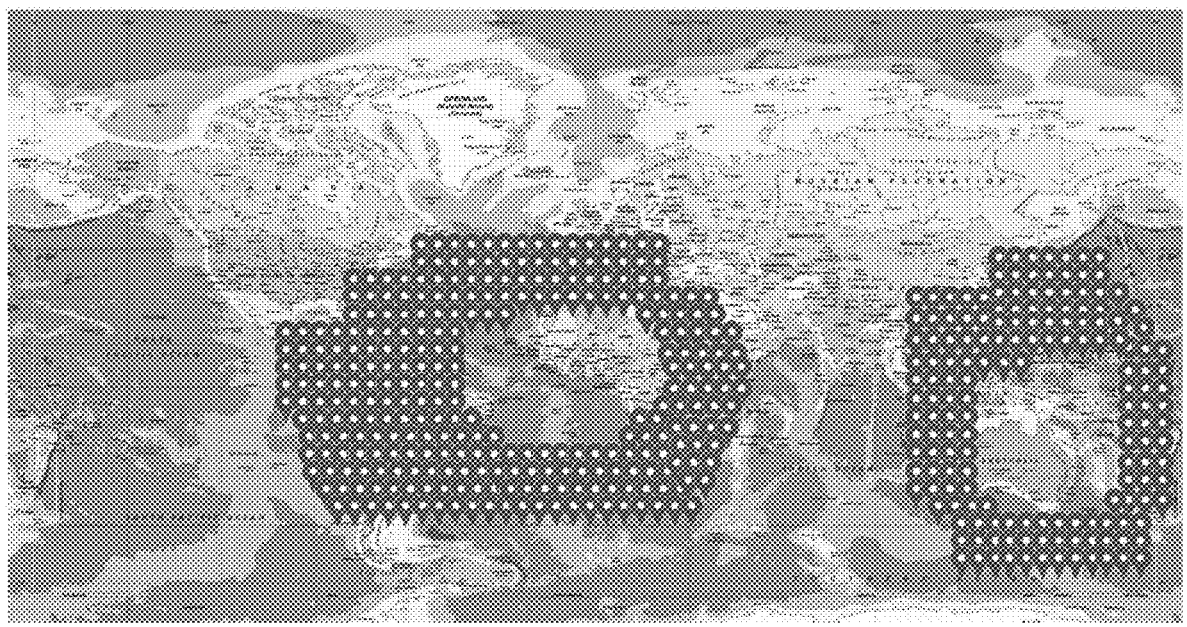
FIG. 80 shows all gravitational resonances on the scale of the planet Earth on Dec. 1-2, 2021. The grid pitch for the calculation was chosen at 5 degrees (taking into account the limited computing power of the author). In the center of one circle is the minimum depth of the Earth-Moon barycenter, in the center of the second circle is the maximum depth of the barycenter. That is, you clearly see how the movement of the barycenter constantly creates Kukharev regions.
Figure 81:
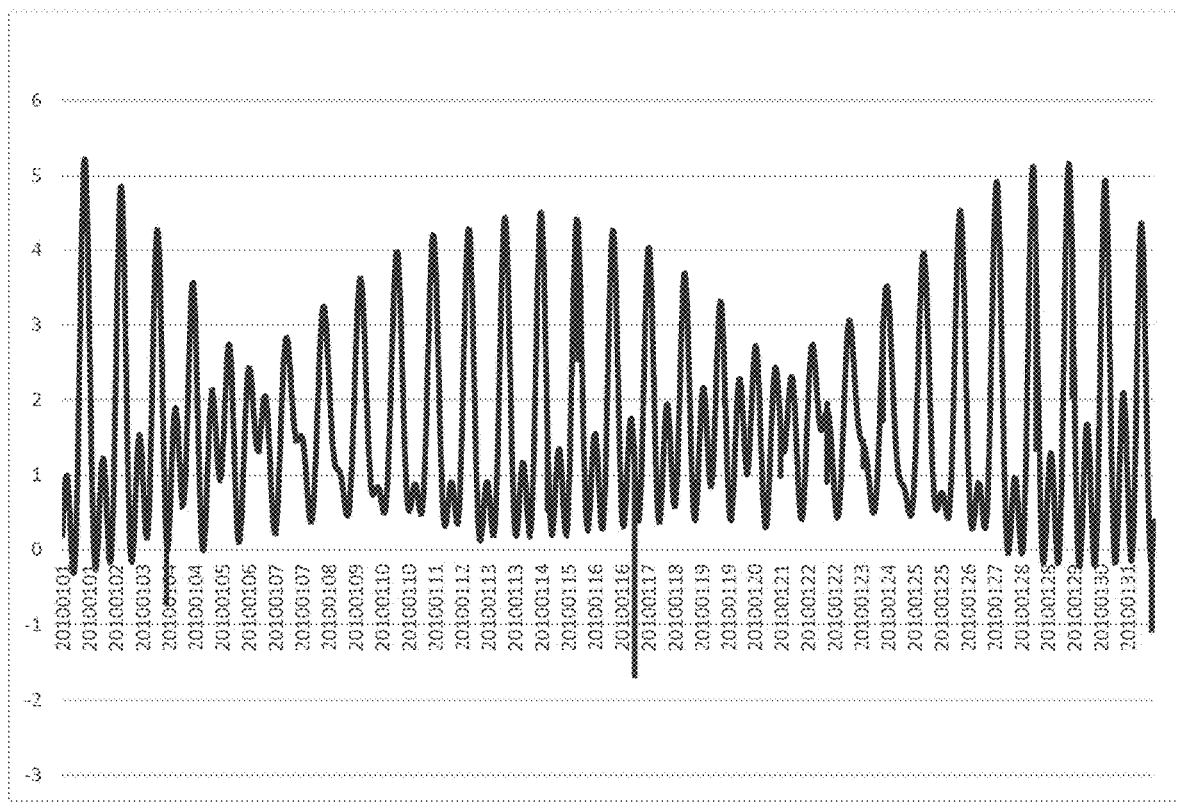
FIGS. 81-104 show monthly changes in gravity and pressure at the Japanese tracking station, Mizusawa (39.1304N, 141.1368E), throughout the year, 2010.
Figure 82:
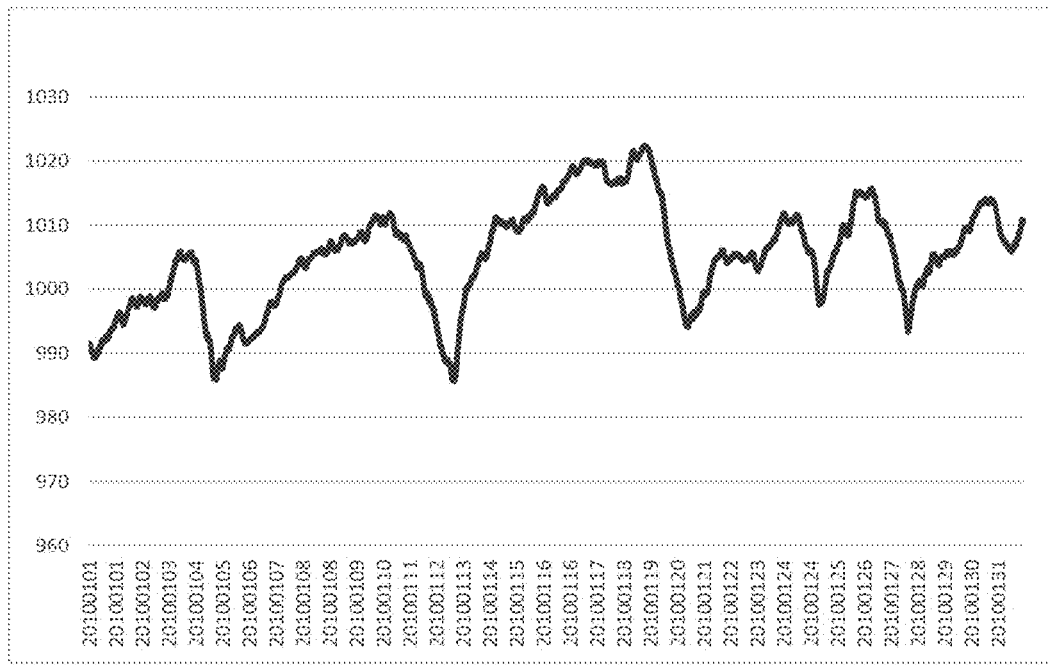
Figure 83:
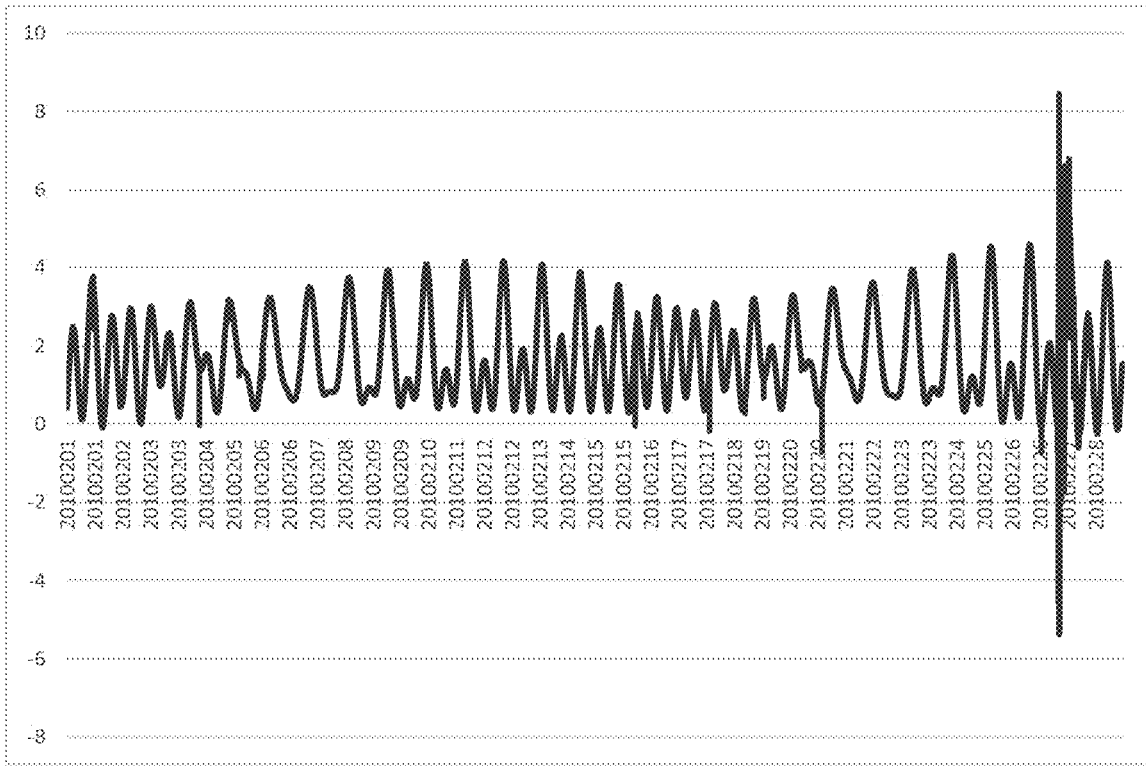
Figure 84:
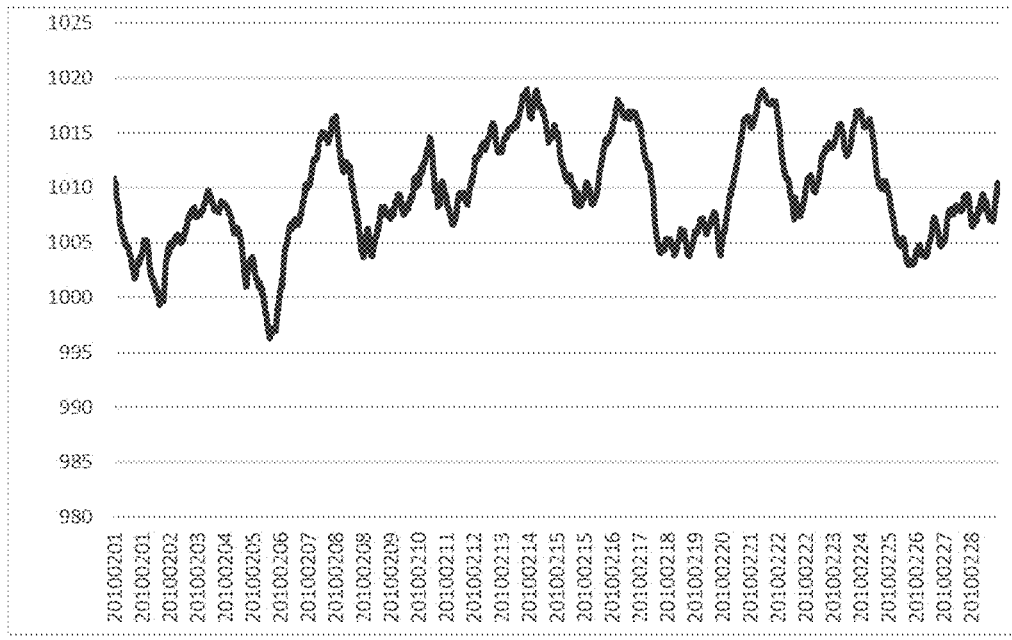
Figure 85:
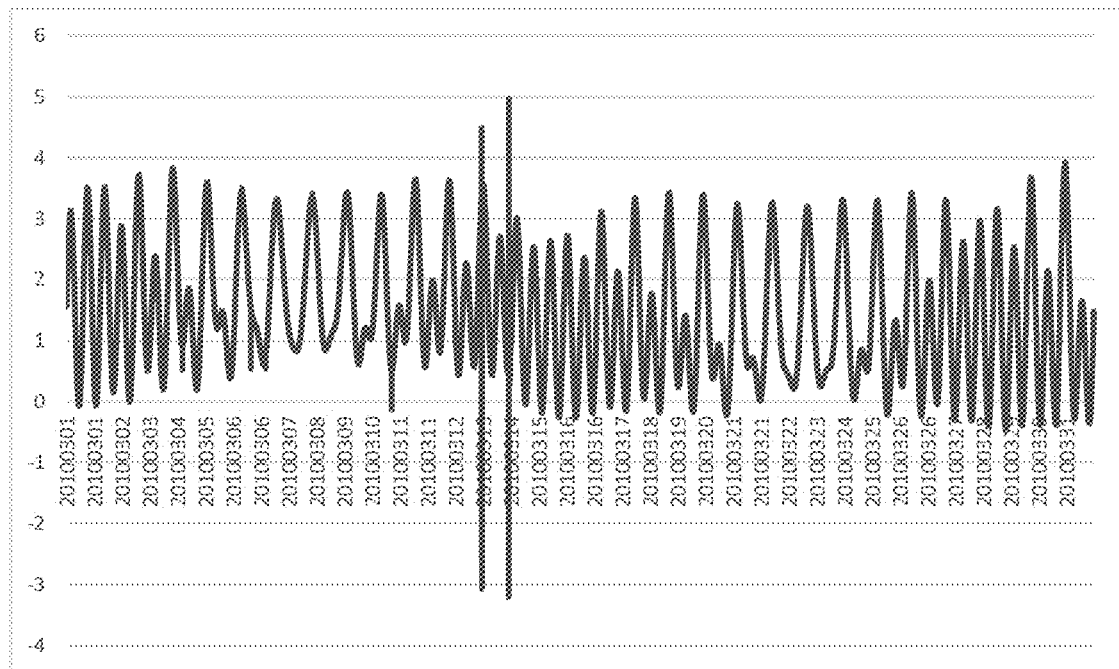
Figure 86:
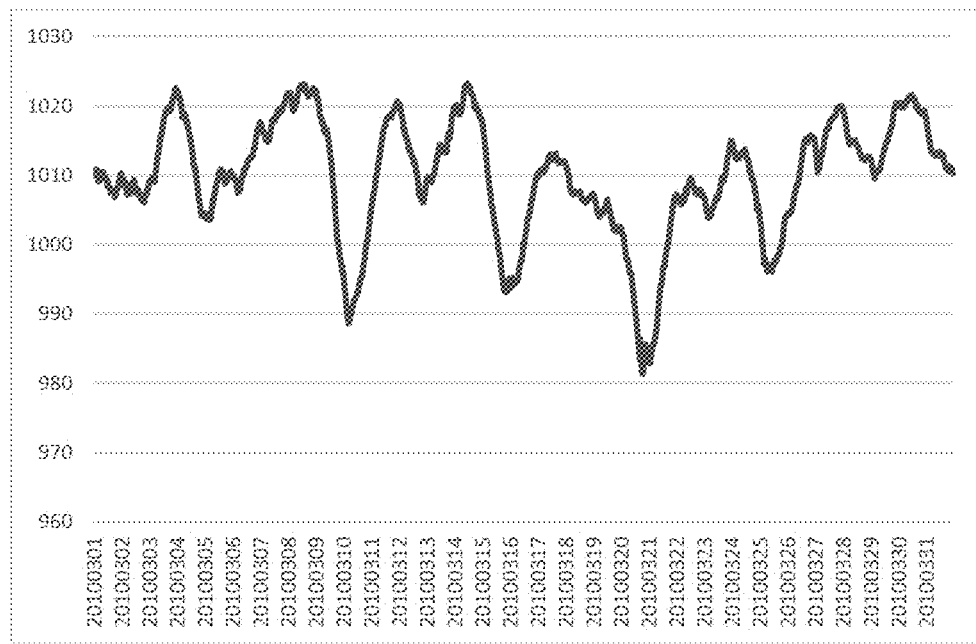
Figure 87:
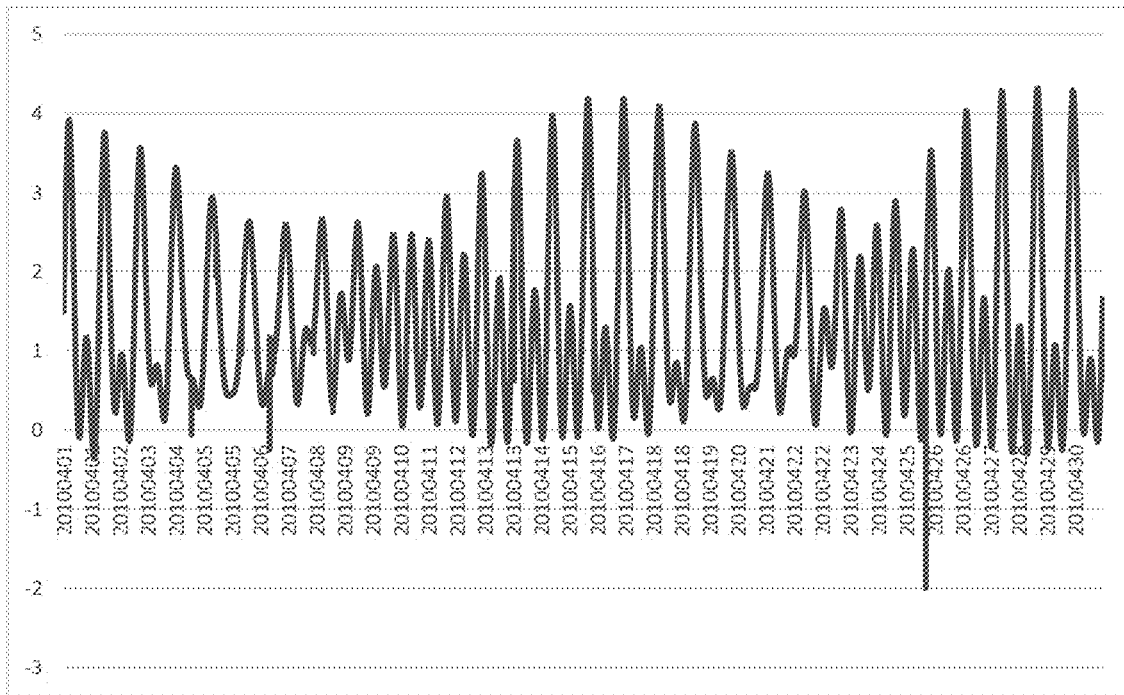
Figure 88:
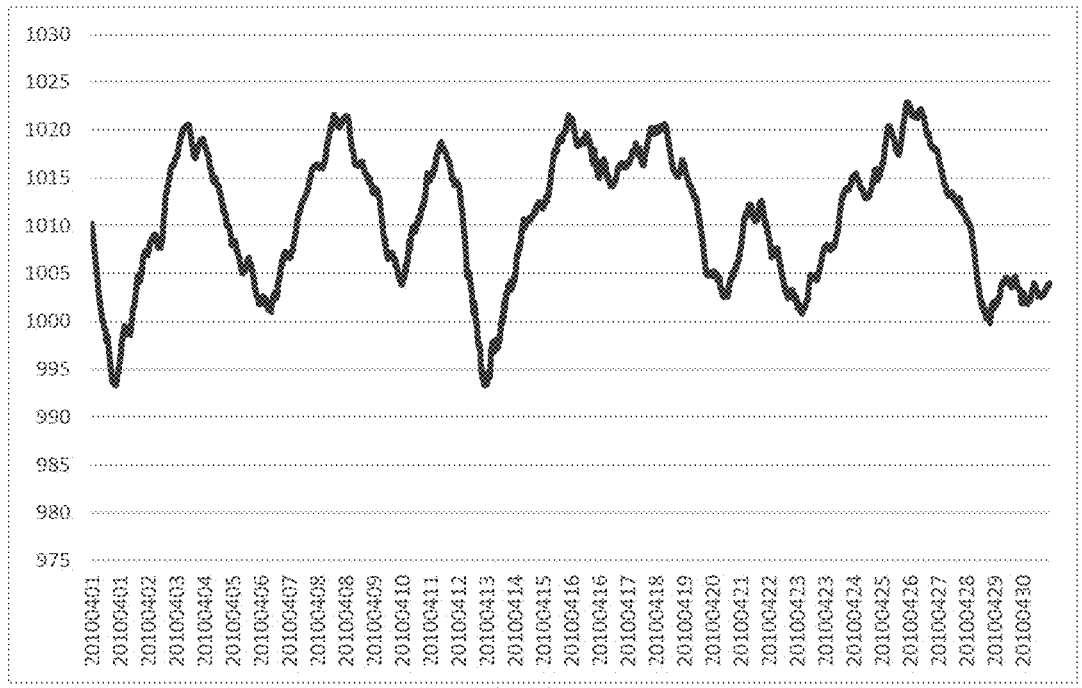
Figure 89:
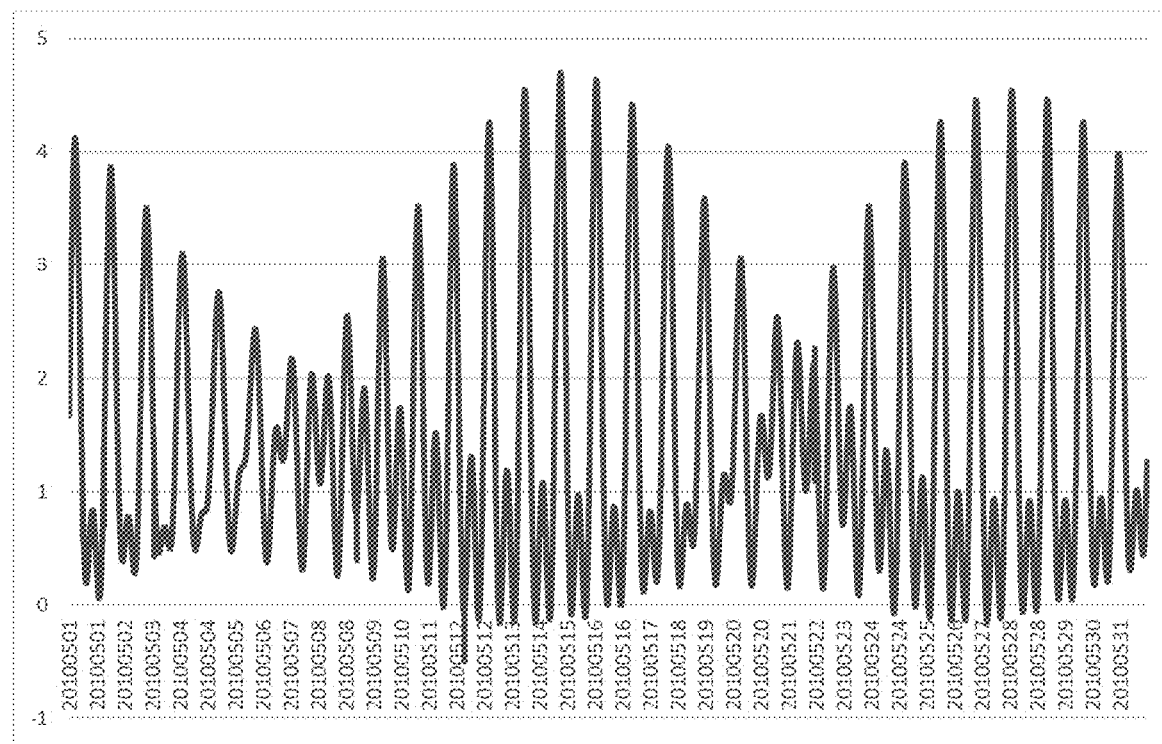
Figure 90:
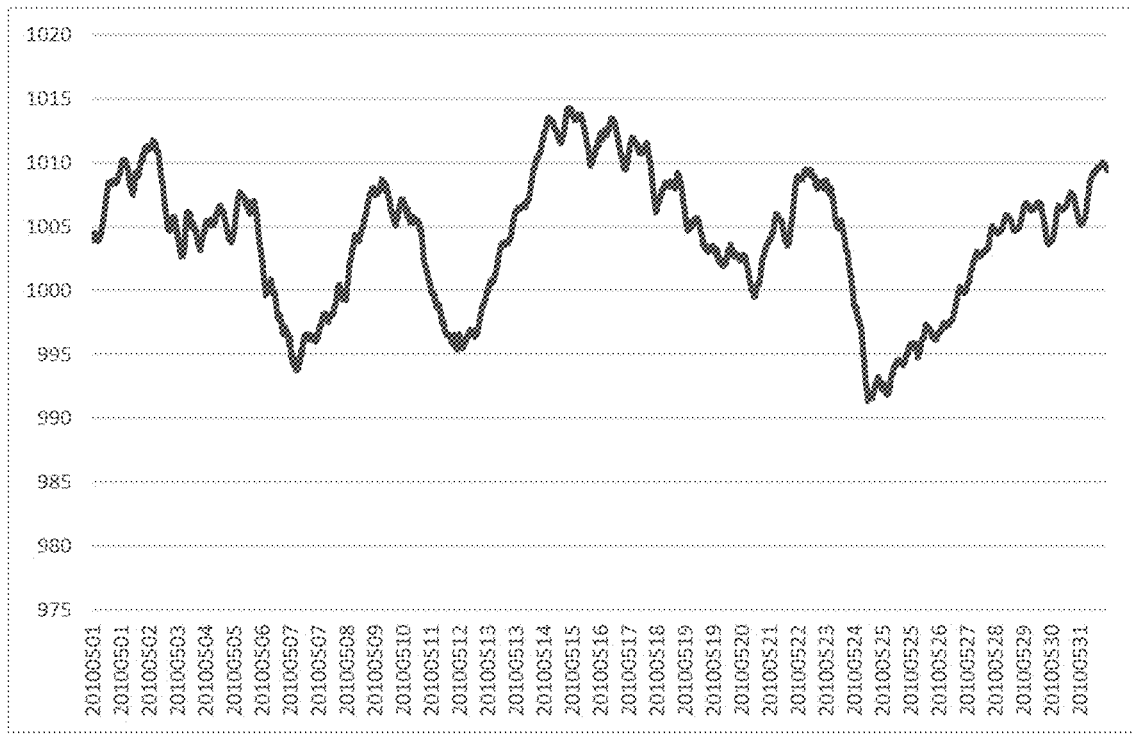
Figure 91:
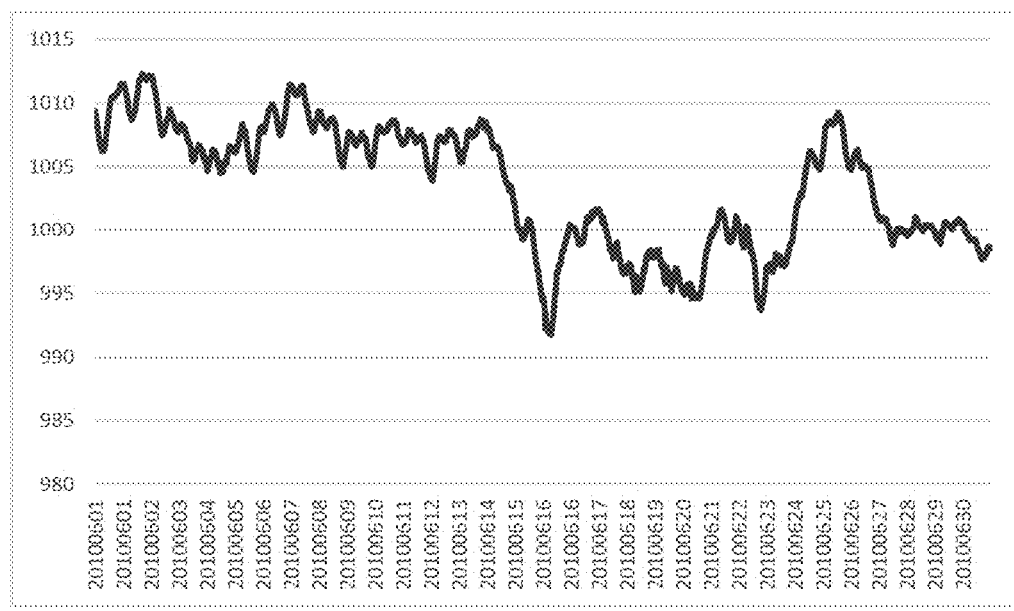
Figure 92:
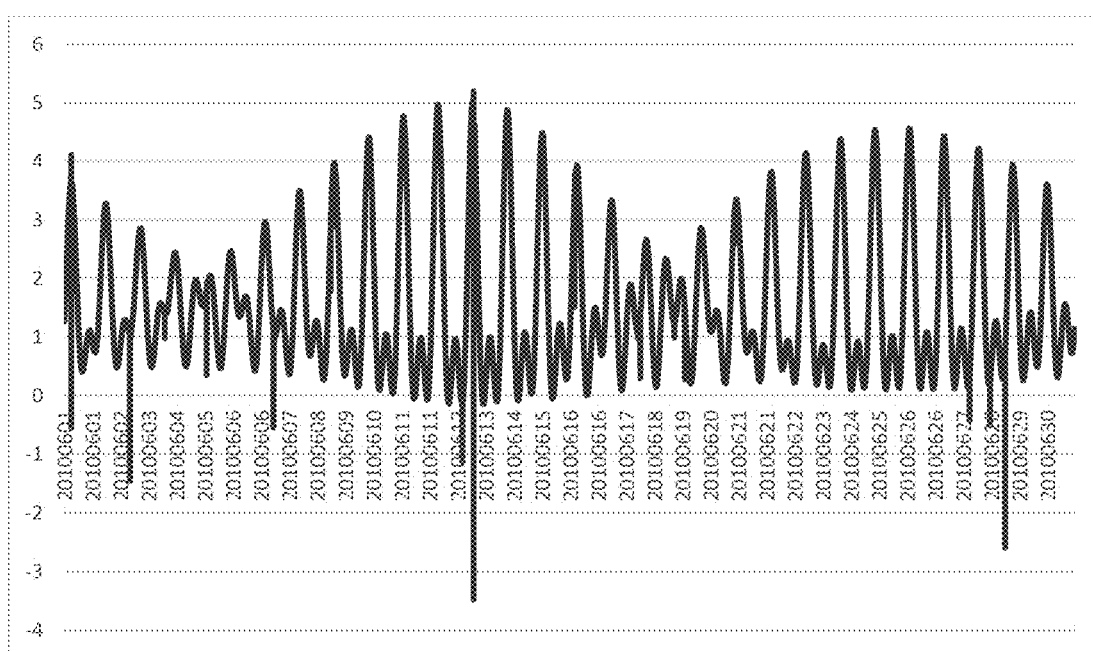
Figure 93:
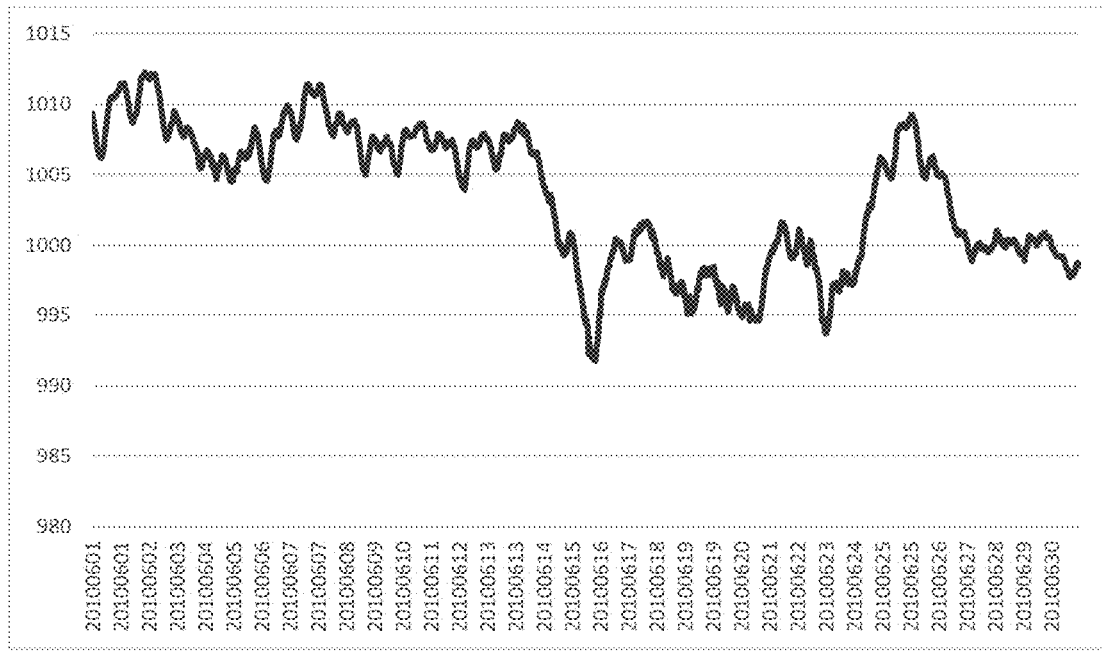
Figure 94:
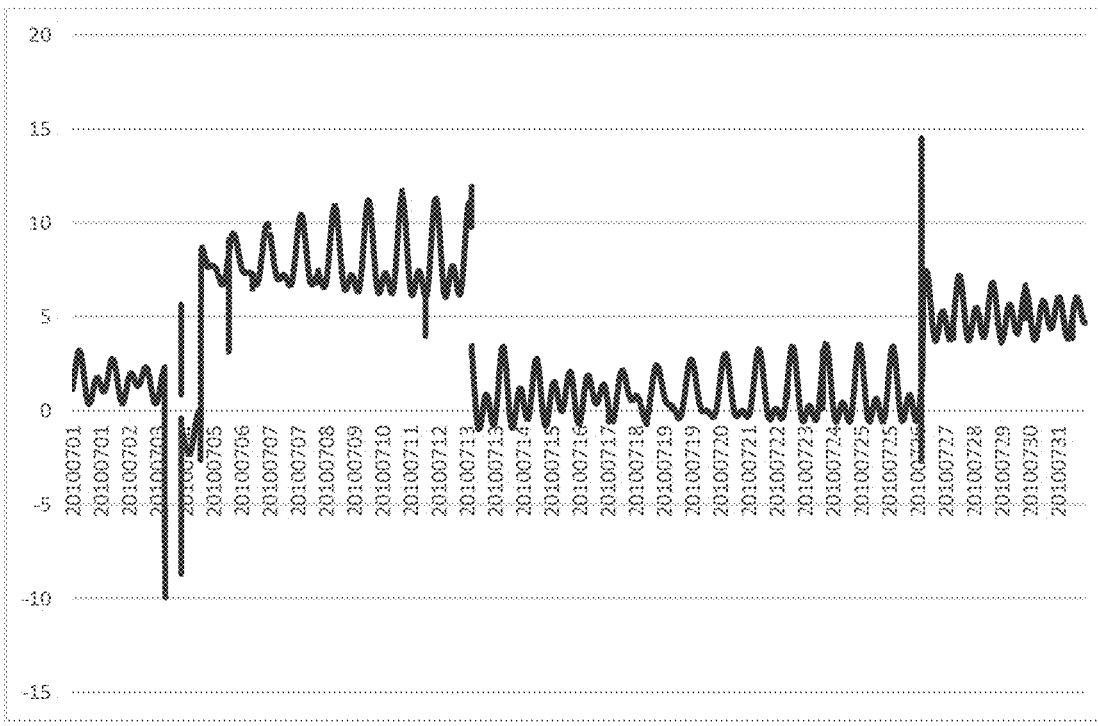
Figure 95:
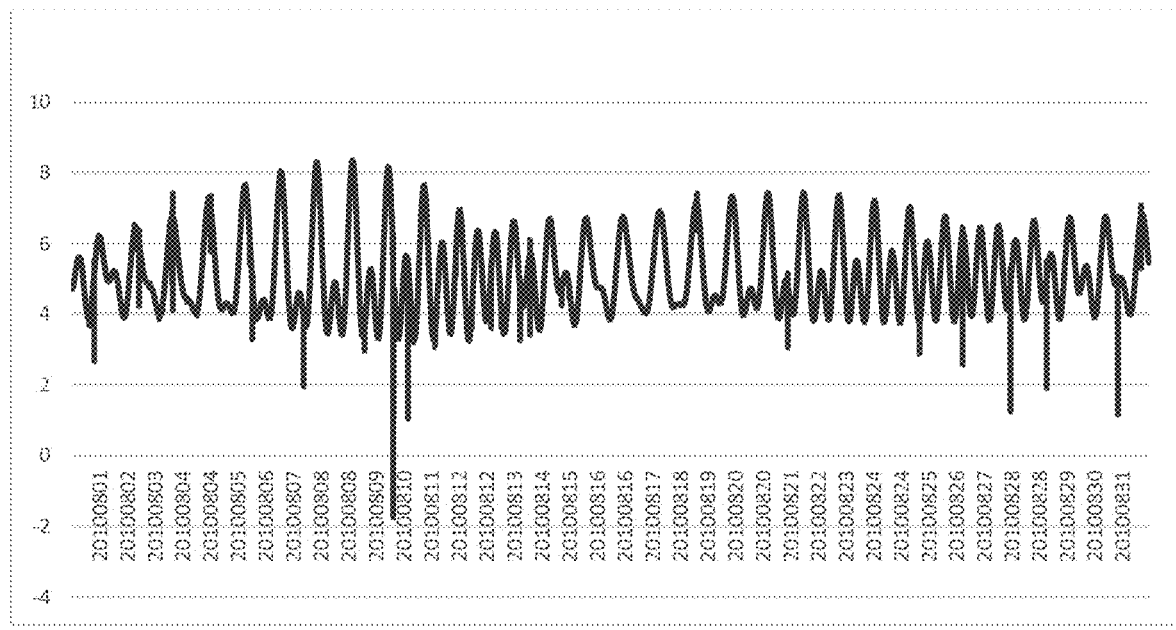
Figure 96:
Figure 97:
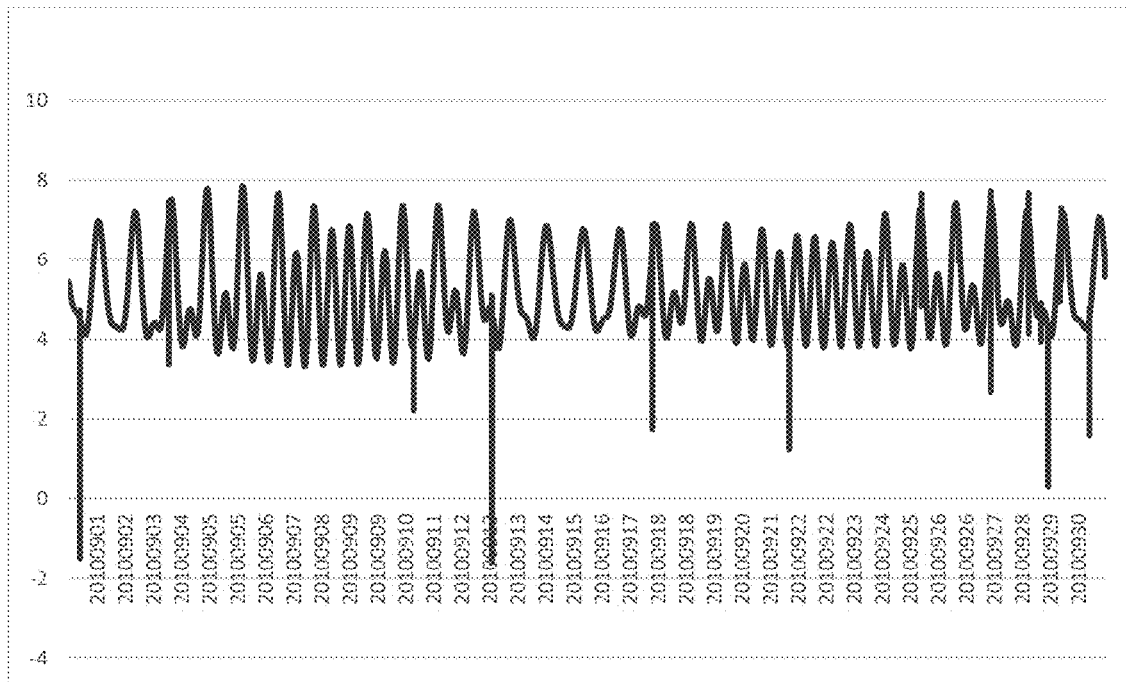
Figure 98:
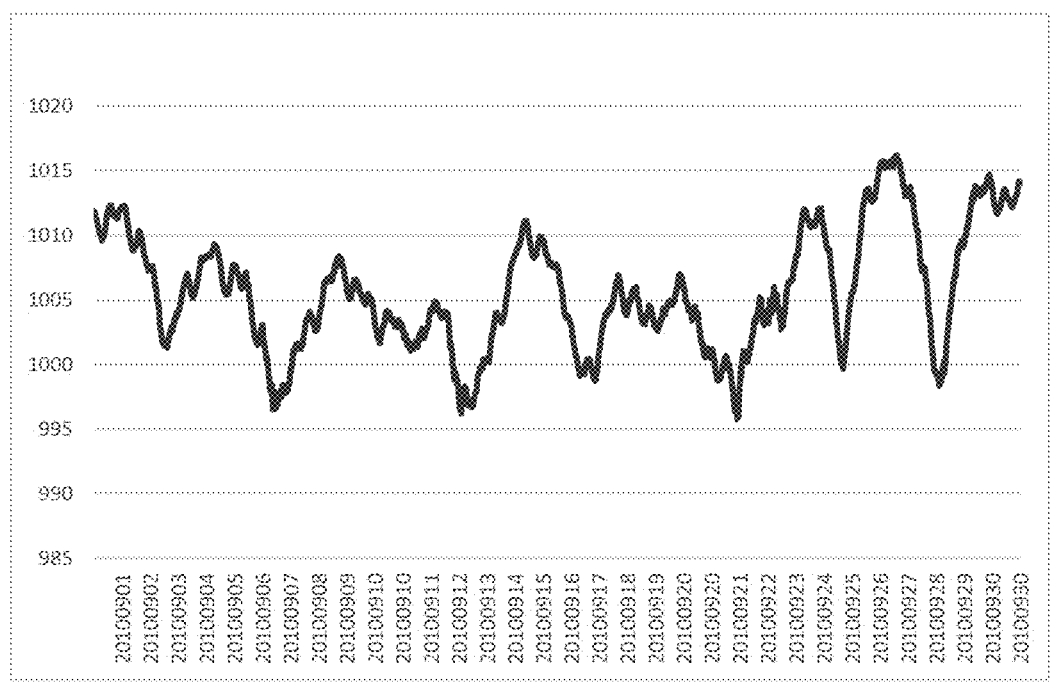
Figure 99:
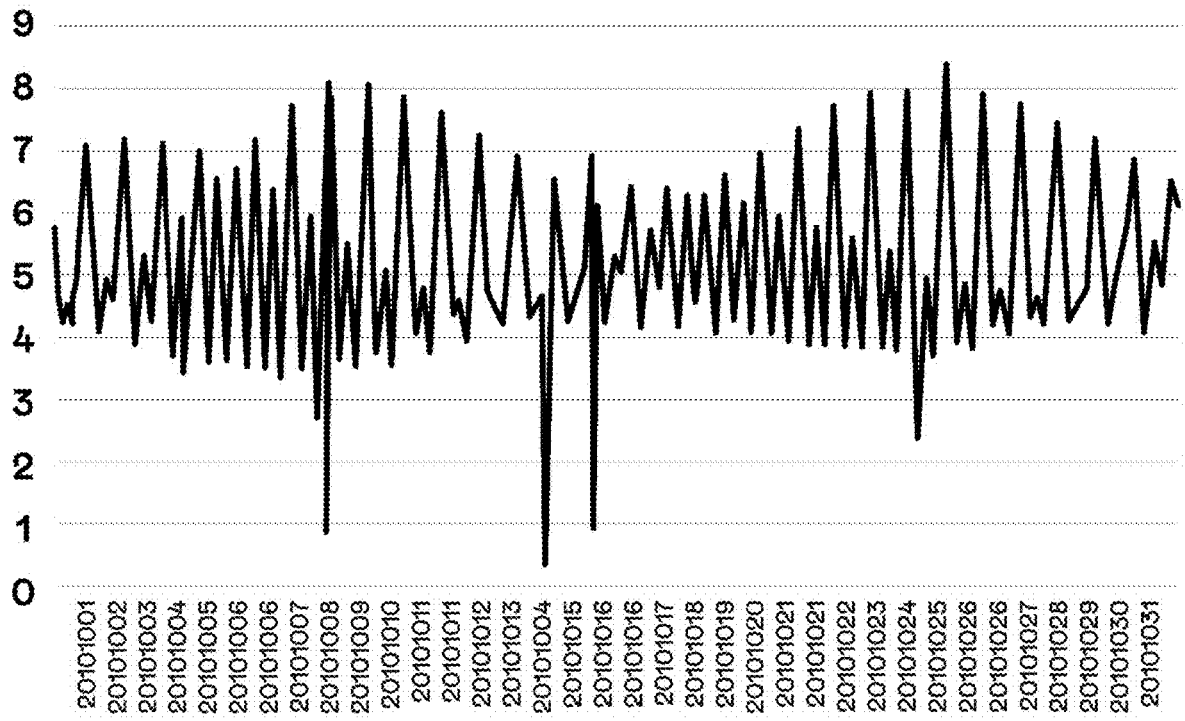
Figure 100:
Figure 101:
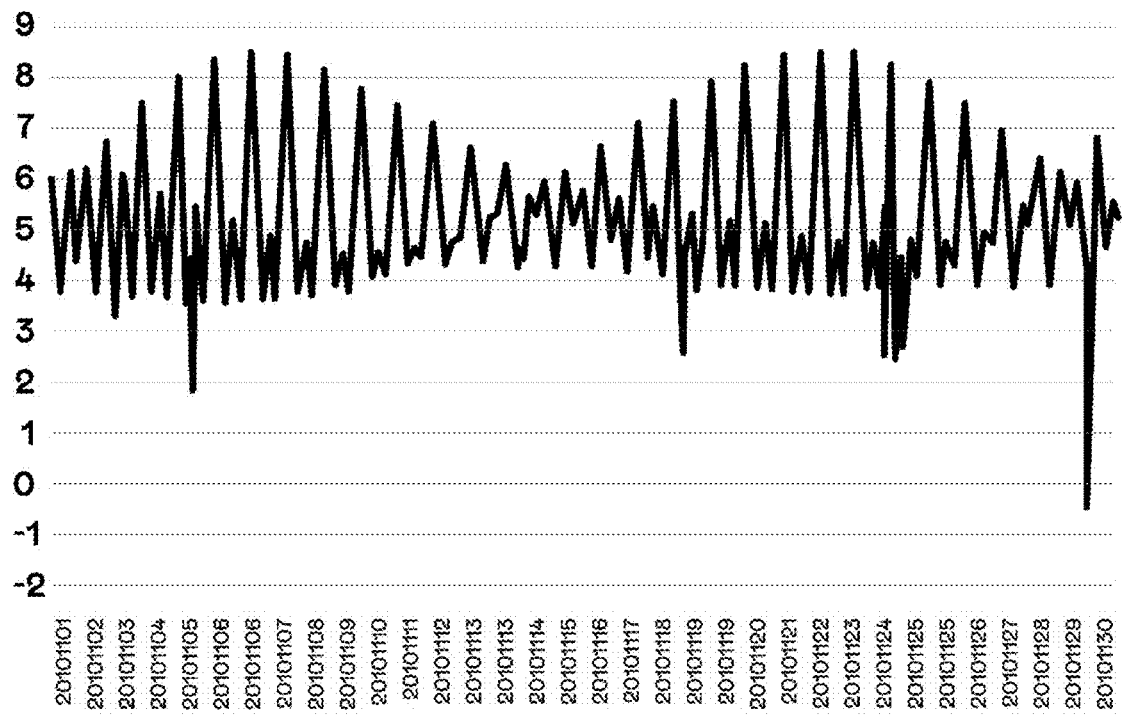
Figure 102:
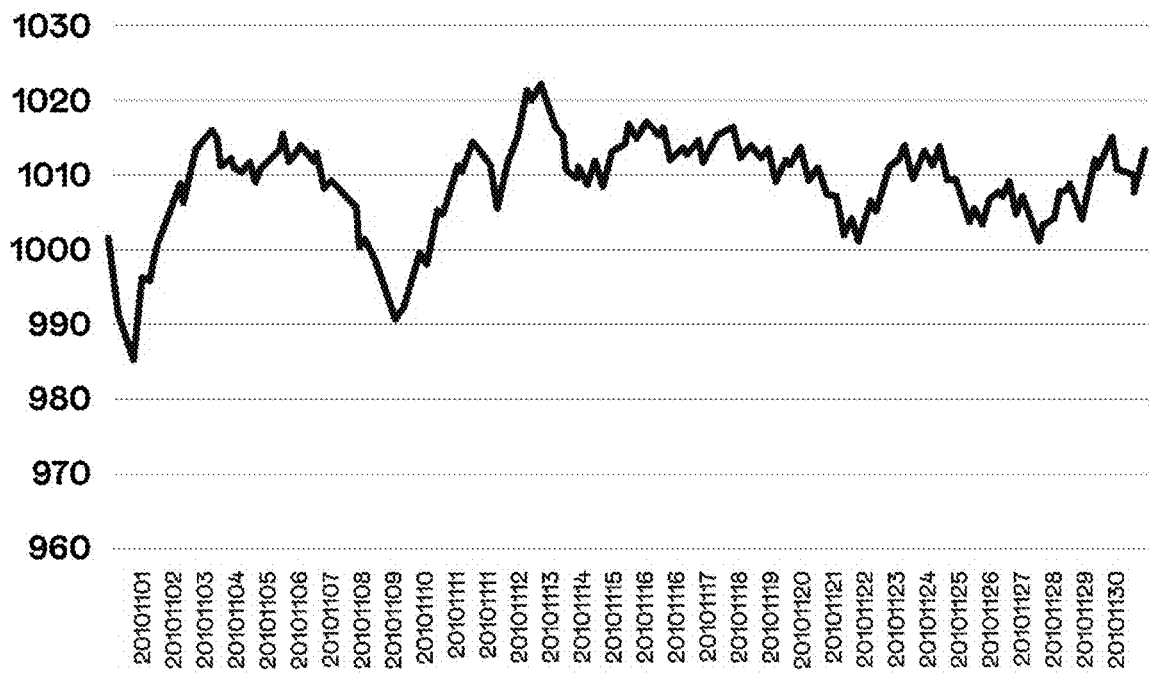
Figure 103:
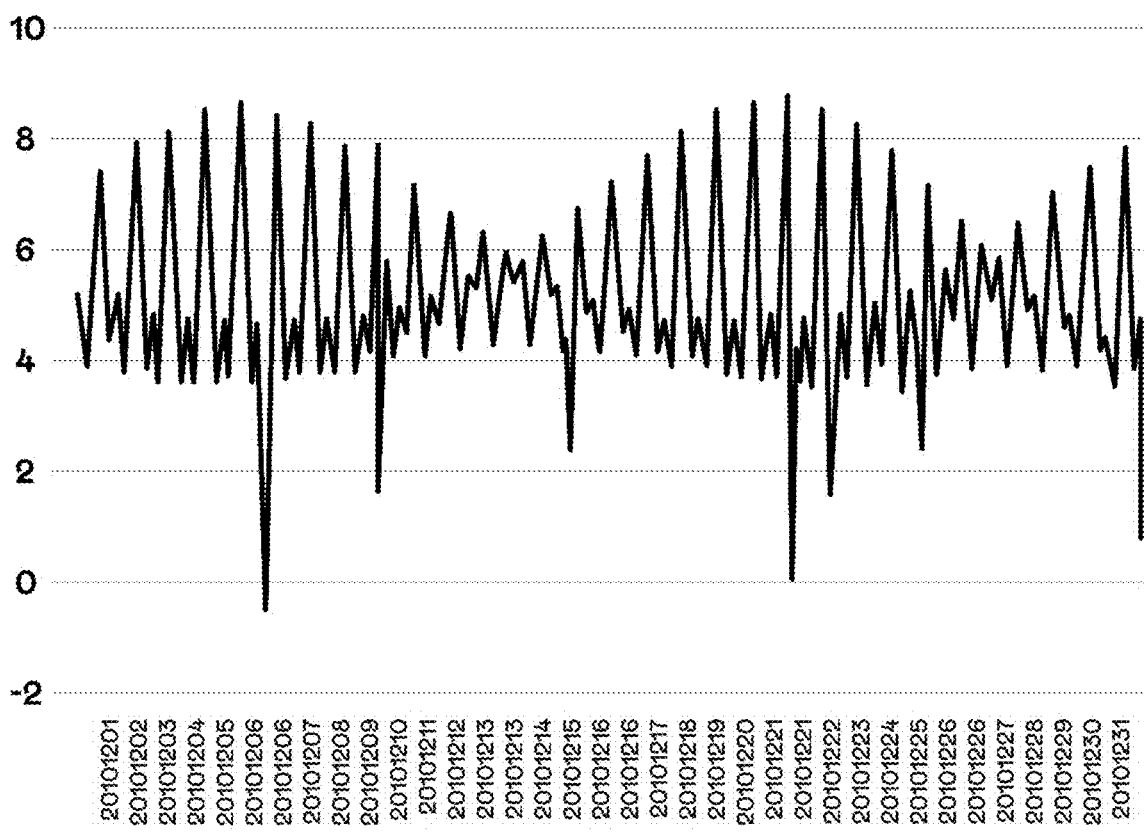
Figure 104:
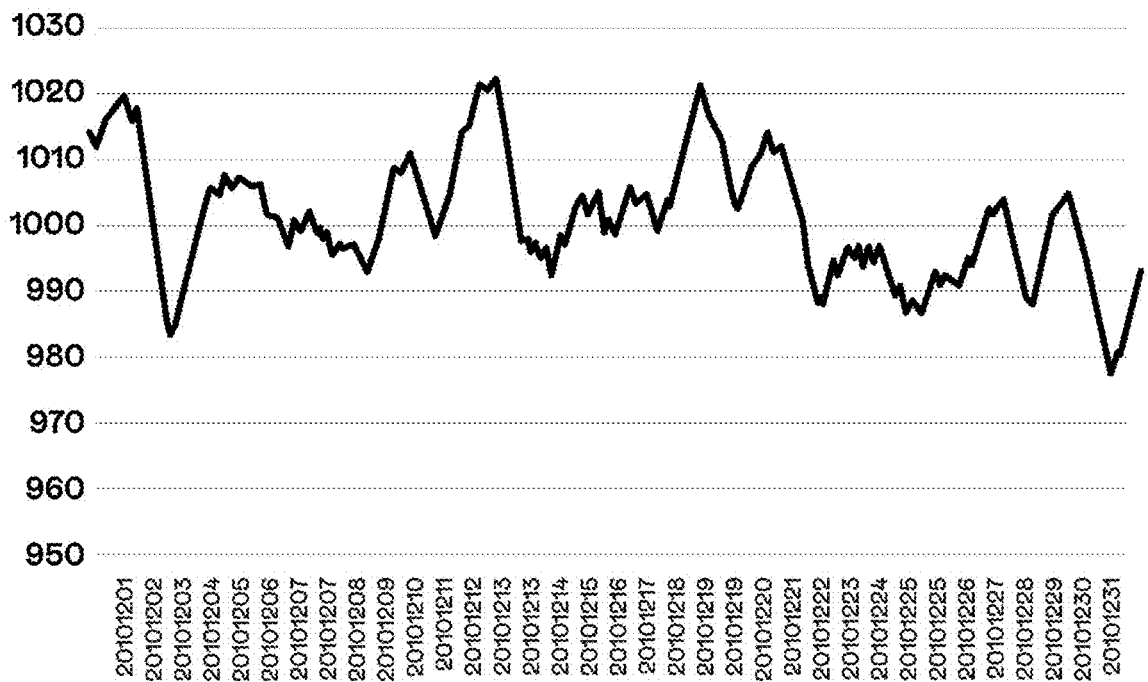
Figure 105:
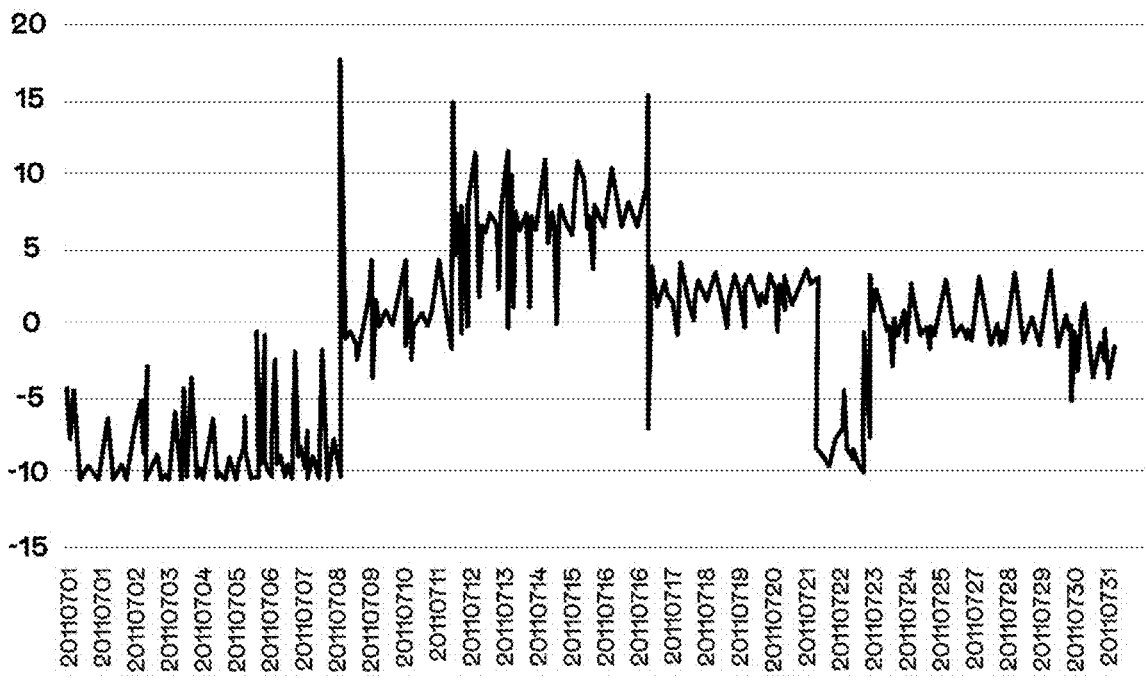
FIGS. 105-109 show the change in gravity in the month of July for the years, 2011-2015, at the Japanese tracking station, Mizusawa (39.1304N, 141.1368E). July is the point of passage of aphelion by the planet Earth.
Figure 106:
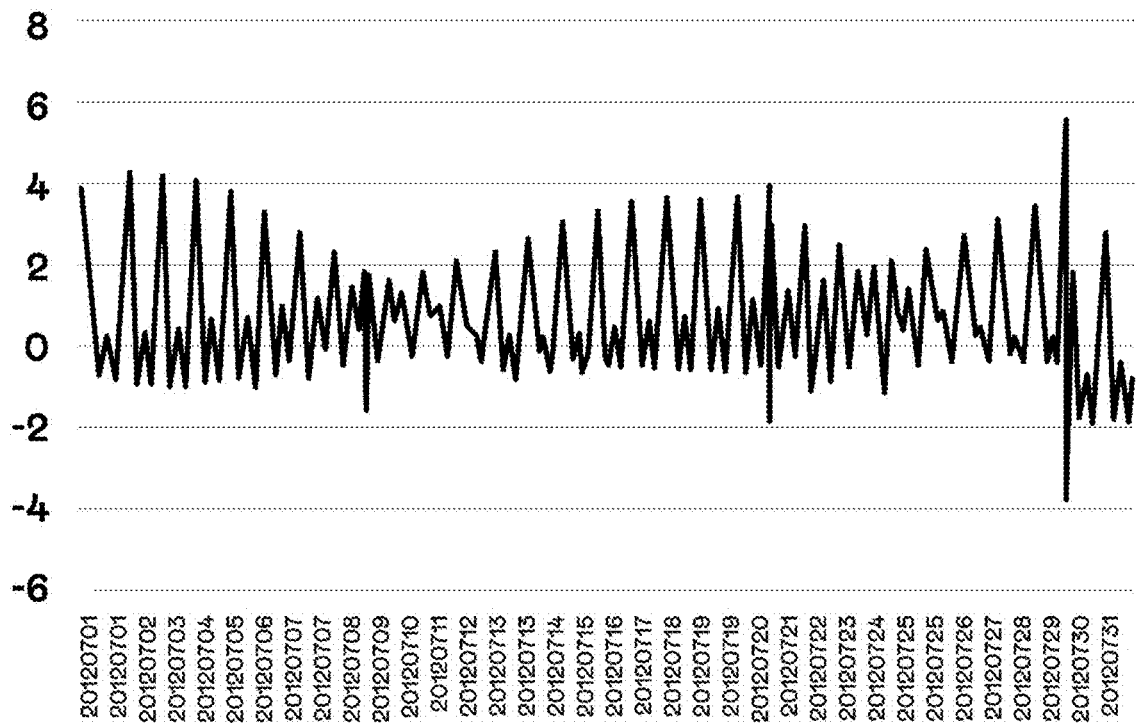
Figure 107:
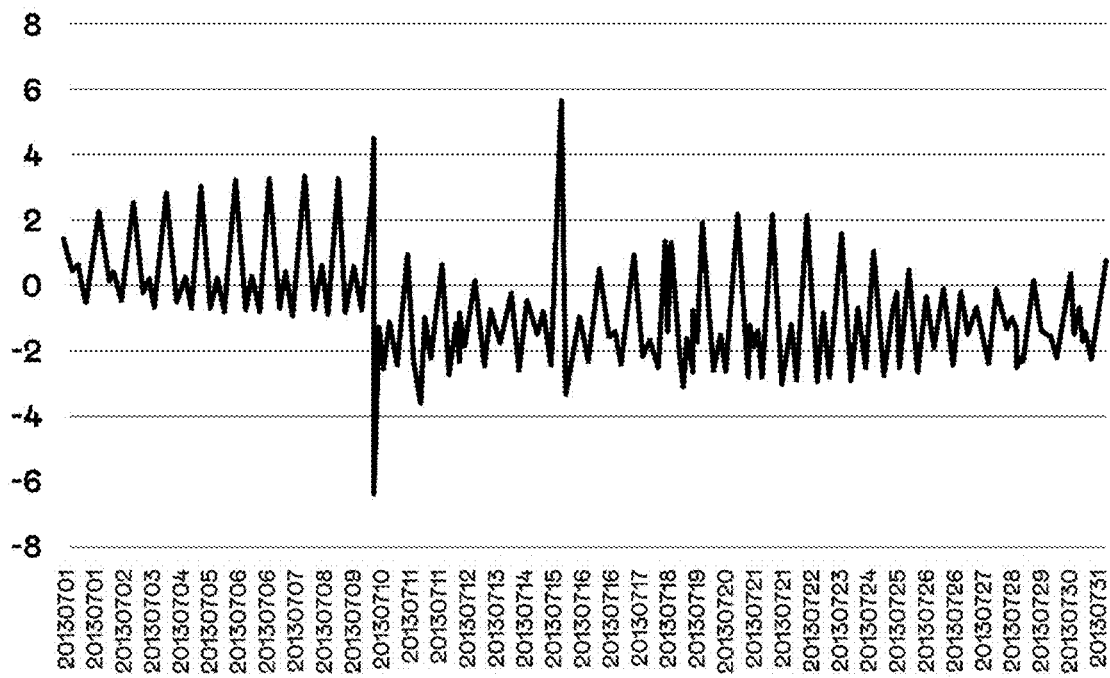
Figure 108:
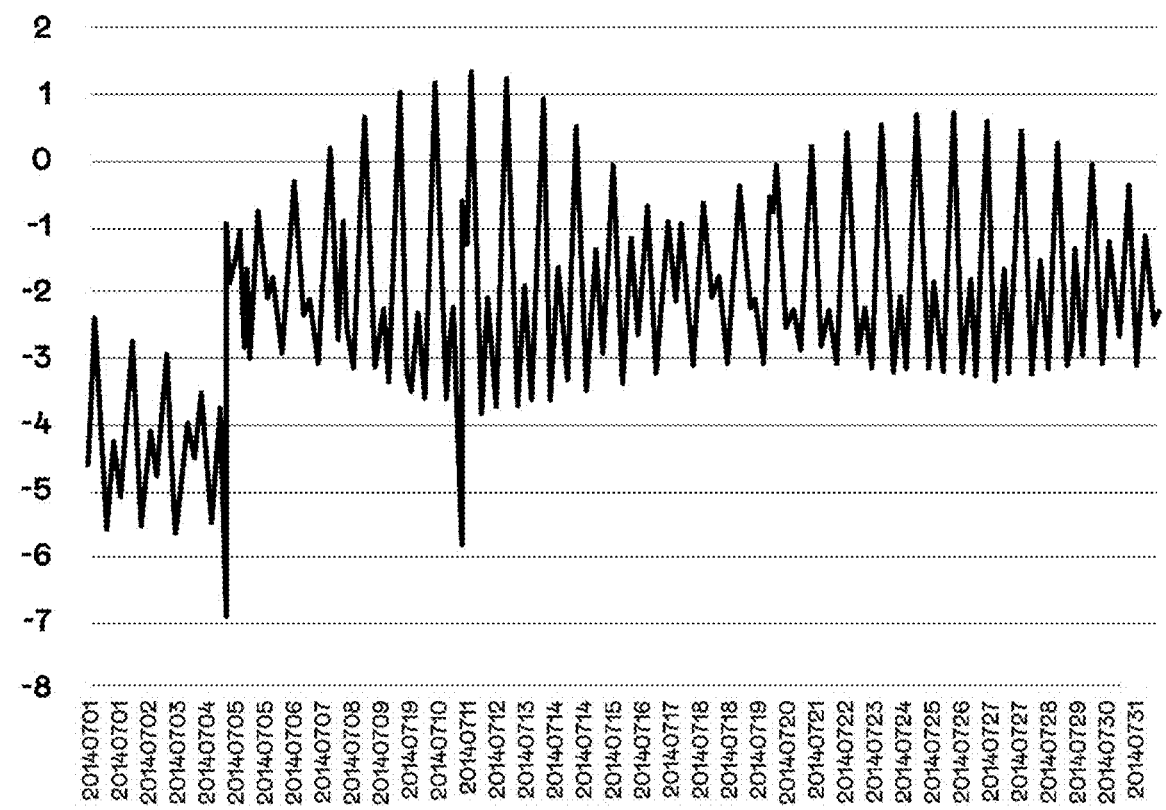
Figure 109:
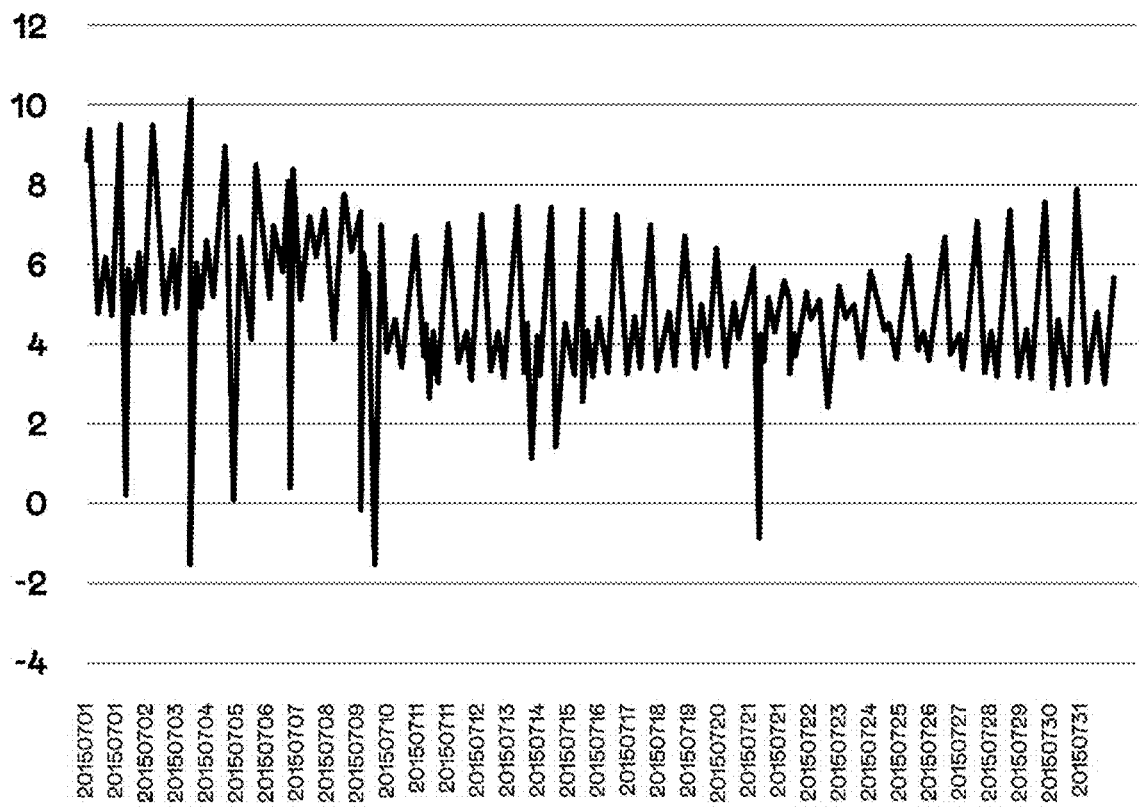
Figure 110:
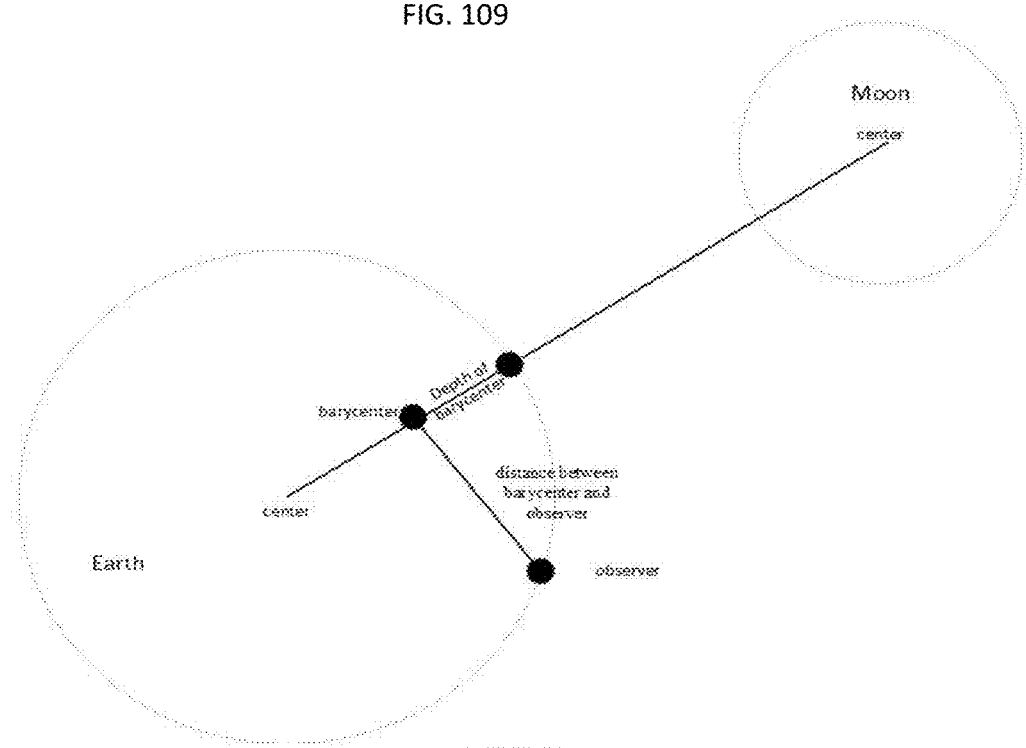
FIG. 110 shows the concept of the depth of the barycenter.
Figure 111:
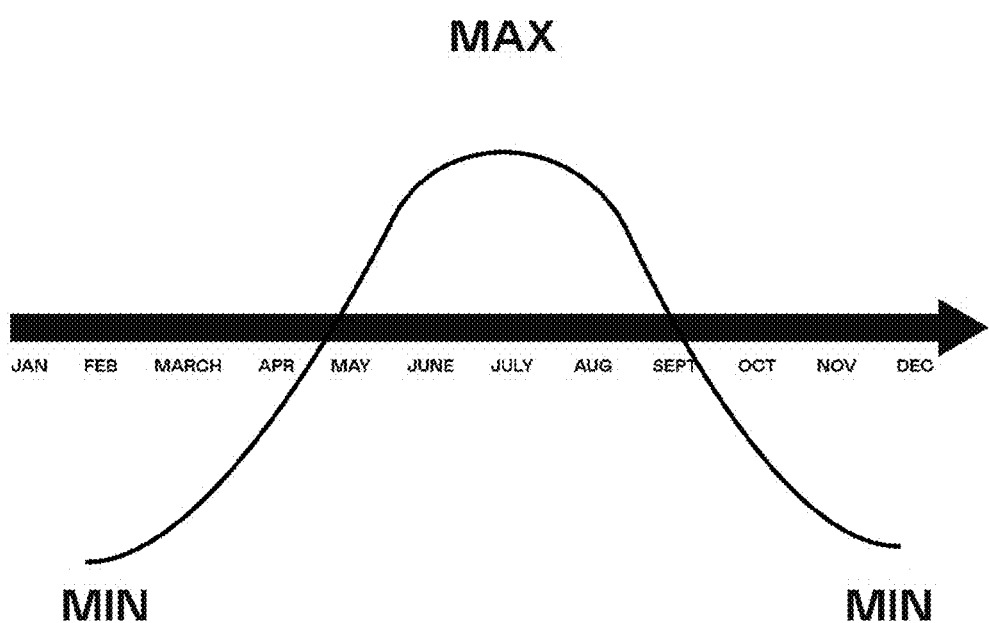
FIG. 111 shows a general example of a change in the gravitating factor ESD (the distance from the Earth to the Sun) for a period of 1 year.

FIG. 76 shows a flowchart of an algorithm for forecasting cyclones, tornadoes, sprites and lightning, flyby anomaly. FIG. 77 shows a flowchart of the rogue wave prediction algorithm. FIG. 78 shows a flowchart of an earthquake prediction algorithm. The author would like to note that the above mechanism of summation of energies in K-regions deep underground when predicting earthquakes, according to the author, also causes the formation of various minerals such as oil and the synthesis of other elements. FIG. 79 shows a flowchart of an algorithm for predicting moments of time with general unfavorable conditions for cardio-dependent people (increasing the likelihood of thrombosis, heart attacks and strokes).

Figure 112:
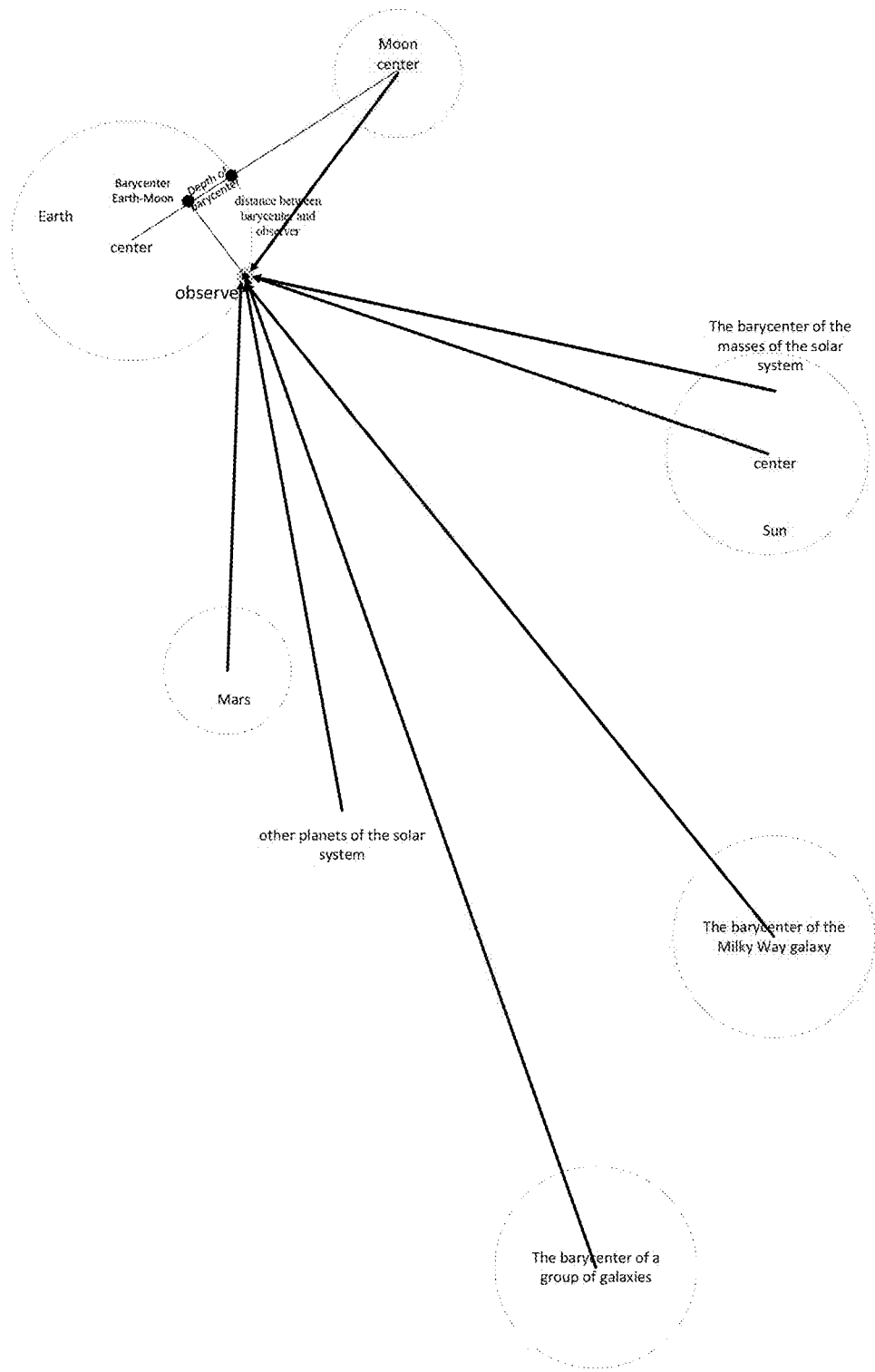
FIG. 112 shows the multifactorial nature of the solution of the gravitational resonance problem.

Generally speaking, according to current statistics:

1. The "pure" resonance of gravitational tides (the intersection of the graphs of gravitational factors in the normalized graph) causes:

(a) In 80-90% of cases, atmospheric pressure surges and (in the remaining 10-20%, the resonances in the opposite phase completely add up and level each other), these pressure surges are triggers and "roads" for atmospheric cyclones. Super-strong (7-9 magnitude) earthquakes and typhoons/tornadoes are timed to the resonances of longer gravitational tides (not 14 day cycles, but for example 6, 12, 18 and more months, which requires drawing detailed maps of gravitational tides for a multifactorial task, especially considering the influence of the barycenter of the galaxy and the Sun, FIG. 112). The net formation of new atmospheric cyclones in about 80% of cases coincides with the resonances of gravitational tides (it is important to understand that the cyclone is not associated with the tide itself, but with the resonance of gravitational tides)

(b) A 90-95% increase in the amplitude of the electromagnetic Schumann wave, which entails the risks of blood clots, which is why these moments of time are unfavorable for cardio and weather-dependent people.

2. Tug of war (the moments of time when the gravitational factors are at extremes)—the "sliding" of parallel lines of gravitational factors causes at least 70-80% of cases of flyby anomaly and killer waves.

3. The time points from points 1 and 2 are "attracting" triggers for the onset of female menstruation.

It is possible to make more accurate physical and mathematical forecasts and explain the causes of weather phenomena only after solving the issues set out in the supplementary theoretical part at the end of this application.

The author would also like to note that the above mechanism of summation of energies in K-regions deep underground when predicting earthquakes, according to the author, also causes the formation of various minerals such as oil and the synthesis of other elements.

The general description of the blocks of algorithms (FIG. 76-79) is presented below:

| No | Block name | Description |
|---|---|---|
| 1 | Setting the time interval when a forecast is required. | This algorithmic block implies setting the time interval for which the forecast is required. The start and end date. |

| No | Block name | Description |
|---|---|---|
| 2 | Setting a set of GPS coordinates of all places where a forecast is required | Setting the set of coordinates for which a forecast is required. In practice, for convenience, for the planet Earth, the grid can be made in increments of 1 degree. The shape of the square can be any, the easiest way is to take a rectangle and count all the points in a square-nested way. |
| 3 | Loading databases | There are many different databases that can provide up-to-date information about the state of the oceans, the current position of atmospheric cyclones and other natural events as they are now (and in the past). For example, there is USGS data where all historical earthquakes are visible (unfortunately, only more than two points), and there is a NASA website with all natural AS-IS data.<br>These data need to be uploaded to the software package in order to 1) for earthquakes to be able to check the capacities of seismic foci on historical data 2) to predict the movement of current cyclones |
| 4 | Calculation resonances for each point | For each point, using its GPS coordinates at a given time, it is necessary to calculate the position of the main gravitational factors (EMD—the distance from the Earth to the Moon, BD—the depth of the barycenter, ESD—the distance from the Earth to the Sun, PM—the phase of the Moon, BOD—the distance from the Earth-Moon barycenter to the observer). The resonances and influence of these factors are given in the text for different weather phenomena. It is also advisable, if possible, to calculate secondary, less significant, gravitational factors, such as the distance from the Earth to the planets of the solar system, the distance from the Earth to the barycenter of the galaxy (in reality it is just a line parallel to the axis Ox) |
| 5 | Calculation of the sum of energies from K-regions injected into a seismic focus at different time intervals. Fragmentation of Kukharev regions into strong and weak ones at the moments of resonance. Taking into account the extremes of gravitational factors as reinforcing the K-region (with coincidence in time and phase). | It is necessary to summarize according to paragraph 4. In abstract units (in pieces) or in the presence of gravimeter data in mGal. |
| 6 | Determination of the "capacity" of the battery of each isolated seismic group (each isolated seismic focus) | Calculation of the average capacity of the hearth according to historical data. Assuming that each earthquake over 5-6 points discharges the focus. More complex mathematical modeling is possible in the presence of long-term statistics, taking into account the dynamics of changes in the capacity of the foci, its degradation, for example. |
| 7 | Taking into account the possibilities of degradation of the "capacity" of each seismic focus over time. Calculation-forecast, for future periods of "fullness" of the "capacity" of each seismic center over time and the moments of probable "discharge" of the battery. | You have already calculated the maximum capacity X for the selected seismic hearth at this step, above which the hearth cannot hold energy. You can count the current "fullness" of the hearth, predict how many gravitational resonances are left before full "fullness" and a strong earthquake. |

On the issue of earthquake forecasting (the algorithm is shown in FIG. 78), the following is noted. Any closed system has a certain ability to accumulate (accumulate) energy to one degree or another. This ability can be expressed numerically. If you try to "pump" energy into the system beyond this ability to accumulate, then there is a gradual release of excess energy and its dissipation (dissipation) into the environment or explosive release of energy (but not only excess energy). In the second case, the destruction of the entire system may occur. Moreover, one part (or all) of the energy goes to the destruction of the system, and the second part is dissipated into the environment.

It should be noted that energy can be pumped into the system both discretely (in portions) and continuously. The difference here is not fundamental, since continuous "pumping" can be considered as discrete infinitely small portions of energy.

Consider an example. When charging the battery, it accumulates electrical energy up to a certain capacity limit (battery capacity, usually expressed in ampere-hours at a known terminal voltage or—in kWh). When the battery is overcharged beyond its capacity—it begins to discharge, that is, excess energy is gradually released from the system (battery).

Another example. When an elastic medium is deformed, in particular its limited volume—for example, a wooden stick, mechanical energy (elastic deformation energy) accumulates. When a certain limit is reached, the stick breaks with a bang. That is, there is a second case: energy is released explosively. The system (stick) is being destroyed. The main part of the energy goes to the destruction of the system: the rupture and stratification of wood fibers. Much less goes to acoustic radiation (the audible crackling when the stick is destroyed is due to the generation of sound waves that propagate into the environment).

And now imagine that the whole planet Earth (the earth itself) is a set of accumulators (seismic foci), and gravity fluctuations, the formation of the Kukharev region have an impact on each battery, constantly pumping energy. Each time the occurrence of the Kukharev region affects the tension of the earth's crust and the rocking of the underground oceans. But the battery can "absorb" energy only up to a certain limit, because there will be a discharge in the form of an earthquake.

The concept of "closure" of any seismic center is rather conditional (taking into account a single planet). Therefore, when "isolating" stable, geographically isolated seismic foci, it is desirable to take earthquake statistics for as long a period of time as possible.

Note. The energy will be discharged within the entire seismic center. The above algorithm will show the approximate discharge time of the hearth as a whole within its radius. The exact location of a large discharge usually shows a small (2-3 points) earthquake a few days before the main one. Plus, a radon gas analyzer a few hours before an earthquake can show the exit point of the discharge of energy (unless, of course, the territory is covered with seismographs).

For the convenience of imagination, the process of pumping energy into a seismic hearth and discharging this energy in the form of an earthquake can be compared with a portion charge of a car battery or with a gradual pressing on a wooden "stick" (before it breaks). Imagine what would happen if you "poured" 60 milliampere-hours into a regular car battery, with a capacity of, for example, 3000 milliampere-hours, 50 times, and then "pour" more energy—it will also "pour out".

To accurately predict earthquakes, it will be correct to enter units of measurement of all capacities and energies. The change in the gravitational field is usually measured in milligals (mGal), sometimes in gal (Gal). Gal is a unit of acceleration equal to 1 centimeter per second squared. One milligall is one thousandth of a Gal. The average value of g on the Earth's surface is 979.7 Gal.

Accordingly, the capacity of each portion of energy (which is pumped into the accumulator of the seismic hearth by gravitational resonances) can be measured:

milligals per second (of course, if you have accurate data of the Network of gravimeters in the forecast area)
conventional units of gravitational resonances of various types (BD-EMD and so on).

The capacities of various seismic accumulator foci on the planet are different, these capacities depend on the internal geology, density and structure of specific areas of the earth. There are places on our planet (for example, local foci in the Philippines, in Japan) where the capacity of foci is relatively "small", at the level of several hundred/thousand mGal*seconds, so earthquakes are constantly occurring there, and there are places (for example, Central Europe) where the capacity of foci is "large", at the level of millions and billions of mGal*seconds. The discharge of the battery, the "splash" of excess energy can also be conditionally measured in the same way. Strong earthquake (more than six points, for example) it can be conditionally considered a spark gap that "completely" discharges the "battery".

From a practical point of view, it is convenient to make calculations, forecasts of the earthquake time by choosing a zero reference point when the battery (seismic focus) is completely discharged (or close to it). That is, you can choose the time when a strong earthquake occurred in the seismic area selected for the forecast, and then sum up the energy portions.

Using the example of "breaking a stick", you need to understand that a month and 10,000 years can pass between the discharges of batteries of different capacities. The "stick" may be made of "plasticine", or it may be made of "titanium". Furthermore, the hearth can "crack" (splash out the accumulated energy) immediately (at the moment of time spilling out all the energy), or it can be in parts. Different seismic foci have a different tendency to discharge energy (in portions, relatively speaking, small earthquakes of 2-3-4 points, or massively (just conditionally 6-8 points). The "propensity" of each particular seismic focus to one or another type of "discharge" can be established simply by looking at the historical data of a particular focus and simulating battery charging and discharge.

In general, there are general rules for "discharging" the batteries of seismic foci:
the release of the energy of the focus mainly takes place during earthquakes of the largest magnitude
weak earthquakes are safety valves that safely release energy that could otherwise manifest as strong earthquakes.

Based on the above materials, an infinite number of derived mathematical models can be constructed, but they will all essentially be the same—integrating portions of energy that are pumped into seismic foci in the manner described above at the specified moments of resonances\extremes of gravitational factors and calculating the moments of time when the focus can no longer store the accumulated energy.

Seismic foci are possible, from which energy is constantly "poured out" over time (as it happens with machine batteries). This should be taken into account when modeling "accumulators". Moreover, all values can be dynamic.

Everything in this application that further concerns the Kukharev energon is a separate potential theoretical addition, an application—an explanation of the reasons for what occurs in reality. The theoretical explanation of the deeper foundations of gravity in no way affects the practical conclusions drawn earlier. All practical conclusions on the calculation and forecast of various weather events (which are given above) are independent, theoretical ones can be expanded and clarified in separate works without affecting the practical conclusions already made. The following theoretical description of the actually established dependencies based on energons is one of the possible, but not necessarily the only one.

Additional Theoretical Part. Energon-Time Bosons (Kukharev Time Bosons, Energy-Time Bosons).

The text given below is one of the possible theoretical explanations-conclusions of all the collected facts on gravitational resonance, as a possible way for fundamental physics to go beyond the standard model. This text in no way affects the patterns already formulated, but only tries to draw theoretical conclusions. Everything presented below is a theoretical assumption about the work of quantum gravity.

The theoretical description of the Kukharev time bosons (energons) was given back in 2016 (the copyright was posted in the Library of Congress of the USA, registration number TXu 2-028-810, Nov. 4, 2016).

Prerequisites for the introduction of new particles and fields into physics:
  the facts of experiments on quantum entanglement refute the theory of relativity (the transfer of information between entangled particles occurs much faster than the speed of light, this has been confirmed many times);
  a significant mass in the universe is invisible (dark matter, invisible particles), which until now has not been explained;
  electrons and photons in all theoretical physics "conditionally" are both a wave and a particle (classical experiment about interference, double-slit experiment), but it is more logical to assume that a photon is only a particle, while "waves" from other particles/fields act on it (and in the double-slit experiment, a de facto addition of two forces is observed). The same applies to other elementary particles, which are "both particle and wave";
  known black holes are at room temperature, which is extremely low given their enormous mass and energy
  the potential interference of gravitational waves at the moments of gravitational resonance creates "Kukharev regions", which forces us to look in more detail at the interaction of gravity and pure energy, the very essence of understanding gravity.

The Kukharev energon performs the functions of a coordinator—calibrator of elementary particles in such a way as to link all 4 fields (gravity and the standard model) into a single physics. The function of Kukharev energons is to integrate (sorb) numerous elementary particles with the help of their inherent energy, while lowering the dimension of the multidimensional space-time continuum according to string theory to Einstein's 4-dimensional general theory of relativity. At the same time, finally, it becomes possible to fit gravity into a standard model or, in other words, to obtain a unified physics of known force fields.

At the heart of such a combined model/theory is the Kukharev energon as responsible for the integration of elementary particles in the energy field of dimension 12. As an operator for reducing the dimension of the energy field, the Ricci tensor can be used, since it was the Ricci tensor that allowed Grigory Perelman to prove the identity of a multidimensional sphere to its three-dimensional counterpart.

It is advisable to reduce the topology of the multidimensional universe to a 3-dimensional sphere using the Ricci tensor apparatus. The original classical multidimensional spaces that appear in string theory are not reduced to a 3-dimensional space, without using the Ricci apparatus, the dimension is not reduced. This problem arises due to the fact that people proceed from an incorrect estimate of the dimension in string theory: 10-11 instead of the minimum required 12. It is the Kukharev energon that brings the initial dimension of 4 physical fields to 12, and then you can reduce the dimension to 3× according to the Euclid-Newton model or to 4× according to the Einstein model. At the same time, you can use any mathematical apparatus that is optimal for solving, it is more logical to use the Ricci apparatus, which has already shown its effectiveness in analyzing the topology of the Universe.

The Poincare problem and the problem of the Great Unification of 4 force fields is the problem of taking into account the features of the Topology of Space. Therefore, the standard known methods of reducing the dimensionality of the initial data are weakly/hard to apply (in other words, they are not applicable) to problems of multidimensional space, which follows from the fact that the Poincare problem was solved on the basis of the Ricci tensor. It is known that the Ricci tensor lowers the dimension of the topological space, and not the dimension of the original data in Euclidean space. Accordingly, the task of adding the Kukharev Energon to string theory (as a separate string) relates more to multidimensional topological spaces, and not to the multidimensionality of Euclidean space. Therefore, the use of the Ricci tensor is more promising.

In the above mathematical interpretation, we can consider that:
  closed 3-manifolds (circle, sphere, torus, . . . ) create elementary particles
  open 3-manifolds create fields
That is, the problem of a unified field theory, due to the multidimensionality of space, is similar to the solved Poincare problem.

The mass must absorb the energons. The mass should strive to fly to where it is energetically advantageous (for example, planets). The orbits of the planets of the solar system lie almost in the same plane. This, in theory, shows the plane of generation of energons from the Sun.

Kukharev's energon can also be imagined not as separate from entities known in the microcosm, but as a kind of integral term that allows replacing known elementary particles with a certain property common to them—energy. Such integration of the properties of numerous elementary particles can also make it possible to combine all the known 4 forces into one continuum. In any case, Einstein's general theory of relativity is a four-dimensional space-time continuum, and there are also four forces known to us (gravity, electromagnetism, weak and strong intra-nuclear interaction). I draw your attention, based on the principles of supersymmetry, the Theory of Everything can be built based on string theory, which has a dimension of 10 (standard) or 11 (M-string theory). But 10 and 11 are not completely divisible by 3 and 4, respectively, for an accurate (without remainder) multidimensional Theory, you just need to have 12 dimensions—12 is divisible by 4=3 (remember the constant triples of the type of three quarks at the base of the proton and others, 4—the basis of space-time—at the macro level of the universe). The introduction of the Kukharev Energon into the construction of the Microcosm allows, on the one hand, to build a Theory of Everything based on the 12-dimensional dimension of supersymmetry, and on the other hand, provided that the Energon is endowed with the ability to integrate the energies of numerous subatomic/elementary/particles into a certain 12-dimensional space-time continuum, which is associated with the usual Macrocosm by a simple ratio—3.

It is only necessary to analyze the number of elementary particles discovered today and build on the basis of their properties a kind of analogy of the periodic table in such a way that their symmetry is based on the Kukharev energon. That is, a new classification of elementary particles and fundamental fields should be done on the basis of the dimension of the space-time continuum in connection with the energy of each elementary entity. At the same time, for example, a photon, as a carrier of electromagnetic interaction, is the boundary state of the Kukharev energon, it lies on the border of dark energy/matter and real matter. From the standpoint of constructing the Theory of Everything, respectively, the classification of elementary particles can only be one that corresponds to the energy tensor 12/4. Otherwise, it is impossible to obtain a stable symmetry between macrogravity and the forces of the microcosm. Plus, this way it turns out to explain the existence of elementary particles, to solve the landscape problem (limiting the number of 3 manifolds to the number of particles), which can also be solved with the help of the 12th string (Kukharev Energon).

In total, here is the basic scheme (but not the only one) of dimension reduction. We take the standard well-known 11-dimensional M-theory and add a 12th string (Kukharev energon). Further work options:
1. Make 2 symmetric six-dimensional manifolds
2. Work with individual strings as one-dimensional objects, combine them by 3 and 4
3. Apply the Ricci tensor and reduce a 12 dimensional manifold to a 3 or 4 dimensional one There is another separate option to take 10 strings from the usual string theory and then work with two symmetries 5+1 and 5+1 (where 1 is the Kukharev Energon). But all these options are essentially the same (you just need to take into account all of the above).

At the same time, M-theory is approximated by supergravity in eleven dimensions. However, the problem with the finite form of the Calabi-Yau space in M-theory still remains unsolved—on macroscopic scales, the theory should be reduced to the well-known and very well-tested elementary particle physics. But there are incredibly many ways of such information/collapse.

12 string F-string theory is an extension of M-theory. But this theory is also still under development. Kukharev energon is just a potential F-element for this type of string theory. At the same time, the energon, in a sense, performs the functions of a graviton and a tachyon. Energon logically allows you to approximate all strings.

It should be noted that the microwave background radiation is warmer in the direction of movement of the local group of galaxies, including the Milky Way. This is an additional fact in favor of the absorption of energons by real mass, that both planets and stars fly to where it is warmer, where there is more energy from energons. At the same time, the sun absorbs and emits energons.

When inserting an energon into F-string theory, the main tensor matrix must include particles of all fields. By analogy with the Periodic table of chemical elements, the classification of elementary particles should reflect the most stable property, in chemistry the most stable property is the charge and atomic weight of the nucleus is the macrocosm, and the microcosm is the stability of elementary particles over the lifetime in such a way as to ensure the components of the nucleus—protons, neutrons, electrons, quarks. One-day particles that live for a fraction of a second hardly determine the properties of the microcosm as a reflection of the macrocosm (Universe). Plus, it is necessary to classify elementary particles by energy levels. A stable set of at least 4 el particles responsible for the stability of 4 fields should be responsible for the quantum stability of gravity, electromagnetism, strong and weak interaction.

In order to insert the energon into the tables of elementary particles in different ways, you need:
1) it is necessary to find in these matrices with a dimension multiple of 3-4 a free space for the future energon in such a way that the matrices include particles participating in the known 4 force fields and meet the requirements of 3-4 fold symmetry. If it is possible to obtain a multidimensional/probably 9, 12, 16 dimensional matrix, a convolution operation is necessary—lowering the dimension of the matrix to a 3-4 dimensional space. If, at the same time, the energon remains in a 3-4-dimensional topological space (Newton or Einstein) together with elementary particles participating in known force fields, then we can hope that it is the Energon that is responsible for the connection of gravity with other fields. True, it is possible that, for a Newtonian 3-dimensional space, it will be necessary to exclude the weak interaction, which is essentially an analogue of Einstein's time, since it is responsible for the spontaneous decay of nuclei in time.

The facts of quantization of dark matter/energy/gravity presented in this paper, together with its maps in the universe, allow the probability of solving the Fermi paradox through the organization of other forms of life at the level of Kukharev energons. And not only others (not from Earth), but also people, as inertia/reflections of the electromagnetic field of the brain in the environment of energons (for simplicity of explanation—just imagine that dark matter can be structured). To check this probability, we need a "receiver" of Kukharev's energons, by analogy with modern means of radio communication. It's all about understanding the mass of energons and the frequency of their oscillations. The receiver device and frequency description will be presented in another patent application of the author. The thing is that among the energons, the signal can be propagated in the same way as with quantum entanglement, that is, many times higher than the speed of light, which is much more convenient at large distances than radio communication/radio waves on which the search is currently underway, and which cannot fly faster than light. The fact that with quantum entanglement of particles, the signal transmission rate is many times faster than the speed of light is well known. Accordingly, for projects like SETI@home, the search must be conducted at completely different frequencies (frequencies of Kukharev's energons) and on other equipment. The radio signal is too slow for long distances. Look at this approximate classification of the ranges of the spectrum of electromagnetic radiation and Kukharev energon.

| Class | Frequency | WaveLength | Energy per Kukharev energon |
|---|---|---|---|
| Kukharev energon | More than 3000 EHz | From 0.1 pm to $1.6*10^{-35}$ m (possibly down to $10^{-48}$ m) | More than 12.4 MeV |

| Classic electromagnetic spectrum | | | | | |
|---|---|---|---|---|---|
| Class | | | Frequency | WaveLength | Energy |
| Ionizing radiation | γ ss | Gamma rays | 300 EHz | 1 pm | 1.24 MeV |
| | | | 30 EHz | 10 pm | 124 keV |
| | HX | Hard X-rays | 3 EHz | 100 pm | 12.4 keV |

-continued

|  | | | | | | | | |
|---|---|---|---|---|---|---|---|---|
| | SX | Soft X-rays | 300 | PHz | 1 | nm | 1.24 | keV |
| | | | 30 | PHz | 10 | nm | 124 | eV |
| | EUV | Extreme ultraviolet | 3 | PHz | 100 | nm | 12.4 | eV |
| | NUV | Near ultraviolet, visible | 300 | THz | 1 | μm | 1.24 | eV |
| | NIR | Near infrared | 30 | THz | 10 | μm | 124 | meV |
| | MIR | Mid infrared | 3 | THz | 100 | μm | 12.4 | meV |
| | FIR | Far infrared | 300 | GHz | 1 | mm | 1.24 | meV |
| Microwaves and radio waves | EHF | Extremely high frequency | 30 | GHz | 1 | cm | 124 | μeV |
| | SHF | Super high frequency | 3 | GHz | 1 | dm | 12.4 | μeV |
| | UHF | Ultra high frequency | 300 | MHz | 1 | m | 1.24 | μeV |
| | VHF | Very high frequency | 30 | MHz | 10 | m | 124 | neV |
| | HF | High frequency | 3 | MHz | 100 | m | 12.4 | neV |
| | MF | Medium frequency | 300 | kHz | 1 | km | 1.24 | neV |
| | LF | Low frequency | 30 | kHz | 10 | km | 124 | peV |
| | VLF | Very low frequency | 3 | kHz | 100 | km | 12.4 | peV |
| | ULF | Ultra low frequency | 300 | Hz | 1000 | km | 1.24 | peV |
| | SLF | Super low frequency | 30 | Hz | 10000 | km | 124 | feV |
| | ELF | Extremely low frequency | 3 | Hz | 100000 | km | 12.4 | feV |

Dark matter is energons at rest (up to light and zero speeds). Dark energy is energons in the superluminal state (one can also imagine/imagine dark energy simply as a kind of interaction between energons at rest). In those places of the studied galaxies where there is a cluster of objects with a large mass, there are a large number of small clusters of dark matter (absorbed sublight energons).

In the presence of a real mass, the energons slow down and coagulate around it, this attracts even more energons, thus strengthening the force of gravity near the mass.

Electrons (and other elementary particles), particles that fly through the waves of the ocean energon, hence the two slit experiment (when an electron and a particle and a wave).

One and the same object (with the same atomic structure) in different gravitational fields (for example, on Earth and on Jupiter) affects different number energons, so the object weighs differently.

Time slows down when the speed increases or near massive objects. This is a fact repeatedly verified by atomic clocks. In both of these cases, we are dealing with a local increase in the number of Kukharev's energons. A massive planet-type object is engaged in the absorption of energons, and a black hole or star is engaged in the generation of energons. That is, there are a lot of energons (or pure dark energy) around the star and the black hole. Well, when an object increases its speed, then, accordingly, it passes more and more energons.

Energons at rest can be bound to mass, real objects. The attractive and repulsive behavior of energons depends on their local density. The mass of the energons can be negative.

Usually, spatial symmetry is called the letter P, symmetry with respect to time reflection is called the letter T, and symmetry with respect to the replacement of a particle with an antiparticle is called the letter C. There is a CPT theorem that the theory of elementary particles should be invariant with respect to CPT transformations. It is known that strong electromagnetic interactions are invariant with respect to all these transformations separately, while weak interactions are not. This happens precisely because weak interactions work with time energons.

The author recommends looking at three formulas—the elementary magnitude formula, the Shenon formula, the Boltzmann entropy formula. It's all the same. About the connection of entropy and energy. Any process (biological, physical) is stopped by entropy as a brake.

Einstein imposed a ban on instantaneous long-range action. But this is for the substance. Not for energy. Any ordinary particle in the physical sense has mass and cannot have a speed greater than light. Quantum entanglement is the transmission of a signal precisely by the time energons (dark energy).

Planets are energy clusters that absorb energons. Stars (and black holes) are generators of energons (what we call dark energy). We do not consider the question of what is a real mass here (although it is probably easiest to consider a ring-closed (rotating) Energon as an elementary source of independent mass).

The problem of two bodies is reduced to flows (streams) of energons and absorption of energons. Each body is looking for a more energetically advantageous position. Any object (mass, clot of energy) tends to a more energetically advantageous location. The barycenter is a node of the flow of energons.

The equivalence of gravitational and inert masses at high speeds is the equivalence of the constant passage of particles of matter through the flow of energons. Or, if you like, the same density of energons per unit mass.

In February 1960, the director of the Paris Observatory, A. Danjon, noticed a fact—after registering a bright flash on the Sun, a slowdown in the rotation of the Earth by 0.85 milliseconds per day was recorded. This can be interpreted as the participation of energons in the moment of rotation of the Earth.

At the end of January and July, the Earth rotates faster (the day is shorter by 0.001 s), and in April and November—slower. The January cycle is shorter than the July one. Such seasonal accelerations and decelerations of the Earth's rotation speed are associated with flows of energons, gravitons and resonances associated with the barycenter of our galaxy.

The correct question is: why can't light (photons) fly away from a black hole? Answer: because it is energetically more profitable to stay there.

At the beginning of its formation, the Earth rotated around its axis much faster—the day lasted about 6 hours. 530 million years ago, a day on Earth lasted 21 hours, and 400 million years ago, a day lasted 21 hours and 30 minutes. 200 million years ago, the day was already close to our time 23 hours. And the older the Earth gets, the longer the day becomes—every 100 years it slows down its rotation around its own axis—by about 46 seconds. The slowing down of the Earth's rotation is probably due to a gradual decrease in the amount of energons that the Sun generates. The sun loses about 179 trillion tons of its mass annually.

On the issue of the emergence of the Earth's magnetic field. The proposed picture of the world is as follows. Shortly after the birth of the Earth, the flows of energons from the Sun and the barycenter of our Galaxy caused it to rotate, the mantle and other layers also began to rotate like a dynamo and a magnetic field arose.

Entropy slows down all biological processes to a complete stop. That is, entropy performs the function of an inertial brake. As the energy level decreases, entropy increases. Physically, this follows from the fact that as the volume increases, the energy of the process that arose in the original volume inevitably dissipates. It is known that the Sun generates not only photons, but also various types of electromagnetic fields. The nature of electromagnetic fields is known—the interaction and mutual conversion of magnetic and electric fields. At the same time, it does not matter what is moving—a magnet or a conductor—as a result, an electric current arises/that is, the movement of electrons in the conductor. A necessary condition for the occurrence of an electric current (more precisely, an electromagnetic field) is the movement of a magnet relative to a conductor or a conductor relative to a magnet. But then what about the Sun? Or rather, with any star—emitter of electromagnetic fields. After all, it is known that the Sun, unlike planets, has many magnetic advantages, which, nevertheless, generate electromagnetic fields/radiation/in a wide frequency range when interacting with plasma. Thus, the Sun (and all the stars) is a kind of complex generator of electromagnetic fields/a kind of symbiosis of many familiar electromagnetic wave excitation technologies. And first of all, the stars should be generators of temporary energons. But the author does not manage orbiting gamma-ray telescopes to accumulate statistics and create a database of evidence. Proceeding from this, dark matter (Kukharev's energons) is at rest because it has reached the maximum of inertia in its development/Entropy/and has stopped/or, rather, has practically stopped its development and interaction with ordinary matter, with the exception of gravitational interaction/. At the same time, the author would very much like to draw attention to the fact that Einstein's postulate about the speed of light as the limiting speed is applicable only to matter (and Kukharev's energons are particles of "pure" energy). In the early stages of stars and galaxies, they behave like active wave particles, then lose the ability to emit energy (the dark matter stage), but, having mass, they slow down the development of the material part of the Universe/However, the energy potential of dark matter is close to exhaustion 10 billion years after the Big Bang. The entropy of the Real Universe-Dark Matter system tends to a minimum (and not to a maximum in the heat death model).

Stars generate exactly dark energy (superluminal energons), which cool down (slow down) unevenly.

Exceeding the speed of light (where quantum entanglement occurs due to energons) should be considered as a "separation" of an object (mass, energy clot) from the energons of time (that is why the classical equations of relativity show zero time).

Once again, I remind you here it is important to remember Einstein's principle of equivalence of mass and energy, to translate it into a "pure" form, where the Earth is an energy "clot" that flies across the ocean of energons of different densities and speeds.

We know that the faster you move, the more time slows down for you. The right question is: what does it mean to move faster? Answer. This means that you are going through more and more energons. What happens to the energy at the same time? The answer is given by the photon. Photons can travel billions of kilometers from distant stars and galaxies before we see them. Why, according to the theory of relativity, for a photon (or a body flying at the speed of light and higher), time stops, and energy goes to infinity? Because in this state (at this speed), the object itself becomes an analogue of energons. And he himself already "works, exists" at the level of the general ocean of energons, where there are currents, levels of different densities, generators (stars, black holes) and receivers (planets, people, real mass).

A very interesting correct question is how the human body absorbs (if it absorbs) energons. After all, the growth of entropy with age stops biological processes. The Periodic table shows us a set of chemical elements that essentially consist of the same atoms. The differences between chemical elements are only in the number of atoms. Similarly, it is likely that at the level of time energons, there may be different stable elements, there may be its own periodic system.

In stars and black holes, there is a transformation of real mass into time energons, so the universe is expanding. Planets absorb energons, fly through the ocean of them. It's all about the desire of the energons to occupy an energetically more advantageous place. The "profitability" of a place is determined by the different density of energons. There are many "streams" of different energons in one common ocean. Analogs of "Gulfstreams" can flow through the barycenters of different planetary systems.

In the numerical series, there are transcendental jumps between integers and other types of numbers. The simplest and most well-known transcendental leap is −3.14. In the microcosm, many similar jumps are already known+many are still unknown. It is possible that energon is the transcendental numerical equivalent of gravity quantization.

It is fair to ask why energon has not yet been fixed at the hadron collider? Apparently, the energy level of modern colliders is not sufficient to manifest the energon. Theorists claim that gamma radiation occurs during supernova explosions, but we cannot build a collider with such an energy level in the foreseeable future, which means that the hypothesis of an energon (based on its frequency and other properties) cannot be tested on a collider.

According to personal opinion, it is more correct to assume that dark matter, dark energy, photon, graviton, energon are all the same things. These are all different forms of the energon of time, its different speeds and states, flows. Think about how a photon travels billions of light-years, due to what it happens, where does it get its energy?

As a result, the question of the formal solution of the Kukharev energon search problem boils down to the search for a particle with the following parameters:

frequency—more than 3000 EHz (above gamma radiation)

wave-length—from 0.1 pm to $1.6*10^{-35}$ m (possibly down to $10^{-48}$ m)

energy—more than 12.4 MeV the gravitational interaction is very weak (much weaker than an electron)

the rest mass is several orders of magnitude less than the mass of the electron, a transition to negative values in our number system is possible (so there can be a whole family of elements inside the energons).

functions of the graviton\tachyon, responsible for the connection of gravity with other fields, gravity field quantization functions lifetime (stability)—significant to perform the functions of quantization of the gravitational field and thus perform the functions of the operator of the unification of the physics of fields Kukharev energon can be studied in the following basic cases:

1) at moments of gravitational resonances of various types using Wilson cameras and other elementary particle detectors. it is not even necessary to count the moments of gravitational resonance, just put a gravimeter next to the elementary particle detector and track, for example, the moments of strong resonances, with gravity fluctuations of more than 3 units, in order to analyze what is happening in the particle detector.

2) during the decay of transuranic elements, studying levels above gamma radiation 3) studying gamma-ray anomalies (and higher ones) by directing orbiting gamma-ray telescopes to the places of the true, and not the visible position of the stars (for example, the true position of the Sun differs from the visible position by about 2 degrees).

Figure 113:
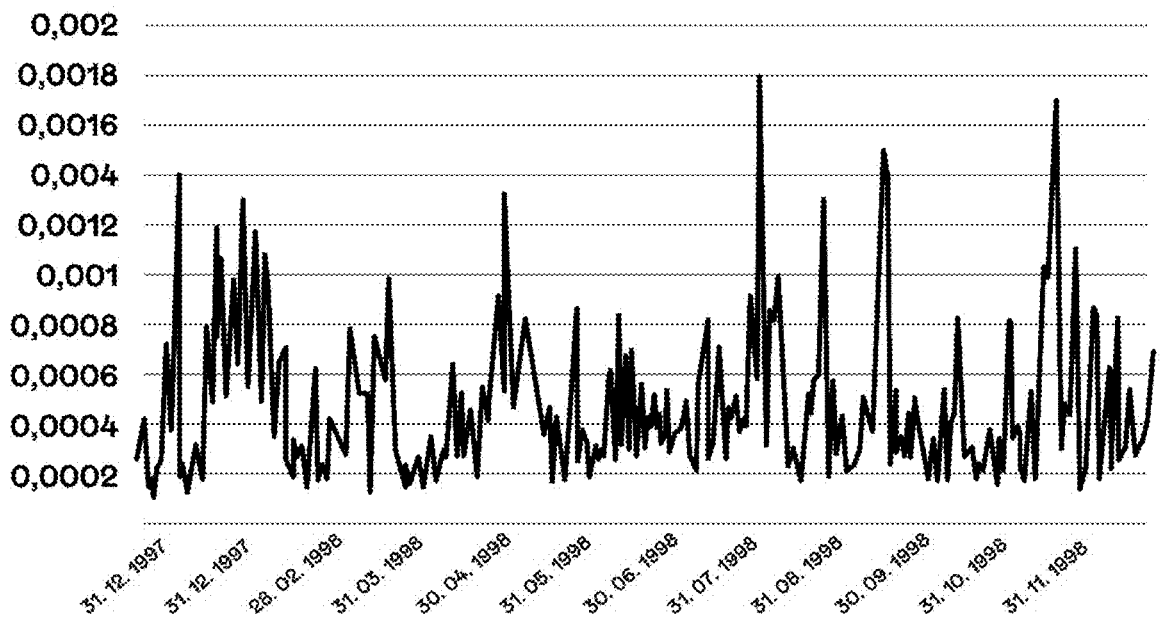
FIG. 113 shows the official European statistics for Strasbourg (France) on natural environmental radioactivity for 1998.

FIG. 113 shows the official European statistics for Strasbourg (France) on natural environmental radioactivity for 1998. Peaks, i.e., jumps of high-energy radiation at the moments of gravitational resonances are clearly visible. Below is the detail in the mapping table (the main explicit jumps are given). This mapping is a potential proof in practice of the above theoretical concept of Kukharev energons. It is important that significant factors of the Sliding BD+PM type are identical to the pattern of formation of the terrestrial flyby anomaly. That is, from here, one can draw a potential practical conclusion that the quantization of gravity is carried out by high-energy particles (i.e., Kukharev energons).

Comparison table of jump times of high-energy particles and moments of gravitational resonance.

| No | Date of the jump of high-energy particles | What happened in terms of gravitational resonance |
|---|---|---|
| 1 | 12, Jan. 1998 | BOD min, Sliding BD + BOD + PM |
| 2 | 27, Jan. 1998 | BOD max, Sliding BD + PM |
| 3 | 6, Feb. 1998 | Sliding BD + PM, Intersection BD + EMD |
| 4 | 10, Feb. 1998 | BOD min, Sliding BD + PM |
| 5 | 20, Feb. 1998 | Sliding BD + PM, Intersection EMD + BOD |
| 6 | 4, Mar. 1998 | Sliding BD + PM |
| 7 | 17, Mar. 1998 | Sliding BD + PM |
| 8 | 30, Mar. 1998 | Sliding BD + PM |
| 9 | 22, Apr. 1998 | Sliding BD + PM, Intersection BD + BOD |
| 10 | 11, May 1998 | Sliding BD + BOD |
| 11 | 5, Jun. 1998 | BD min, EMD max |
| 12 | 21, Jun. 1998 | EMD min, BD max |
| 13 | 23, Jul. 1998 | Intersection EMD + BD, PM max |
| 14 | 11, Aug. 1998 | BD max, EMD min |
| 15 | 2, Sep. 1998 | Sliding PM + EMD, Intersection BOD + EMD, BD + EMD |
| 16 | 25, Sep. 1998 | BD min, EMD max, Intersection PM + BOD |
| 17 | 22, Oct. 1998 | BD min, EMD max, PM max, BOD max |
| 18 | 9, Nov. 1998 | Intersection BD + EMD + BOD |
| 19 | 25-26, Nov. 1998 | Sliding PM + EMD, Intersection PM + BD, EMD + BD |
| 20 | 3, Dec. 1998 | EMD min, BD max |
| 21 | 11, Dec. 1998 | Sliding PM + EMD |
| 22 | 18, Dec. 1998 | EMD max, BOD max |

Similar comparisons of gravitational resonances of the "flyby anomaly" class were made for other cities (for example, Ajaccio, in France), but the meaning remains the same everywhere. Resonances of exactly the type, Sliding BD+PM, Sliding PM+EMD, "tug of war" type EMD min, BD max (and other extremes), cause gravity jumps (about 0.5-5 millionths of the norm on Earth), and the ground-based flyby anomaly. But, if at the same moments of time, at the same resonances, there is a jump in the number of high-energy particles, then it is logical to assume the correlation of these events, that is, the quantization of gravity, and the transfer of gravity by such particles.

It is important that the Kukharev energon (K-energon) is as stable as, for example, an electron. That is, on the basis of the Kukharev energon, an entirely separate periodic table of stable elements may potentially exist.

Further fundamental research on K-energons is easiest to build by placing gravimeters and alpha particle detectors together, synchronizing their results in time. It is expedient to consider joint work of K-energons and neutrinos at the moments of resonance. From all of the above, it potentially also follows that K-energons (those which are not at rest) are dark energy—this is the entropy of the universe. Despite its expansion and huge size, the universe can be considered as a closed system in which entropy grows. The cosmological constant is the integral value of entropy. Complete symmetry would inevitably lead to the elimination of the arrow of time and, as a consequence, the absence of time, that is, to statics instead of the dynamics of physical processes; hence, the consequence that entropy is the result of symmetry breaking. And it becomes extremely important to understand how stable the electromagnetic field of the human brain is realized in K-energons.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for forecasting weather phenomena, comprising:
   setting a time interval for a forecast period, said time interval comprising a start time and an end time,
   providing a set of GPS coordinates for a forecast location,
   loading one or more databases comprising environment data of said forecast location,
   calculating all time points, at said forecast location and within said forecast period, when:
      resonances of gravitational tides occur, and
      at least one gravitational factor is at an extreme value,
   forming a probability grid for said forecast period and said forecast location, said probability grid comprising strong moments of any one of said time points and weak moments of any one of said time points, wherein said strong moments correspond to at least one maximum value of said at least one gravitational factor, and wherein said weak moments correspond to at least one minimum value of said at least one gravitational factor,
   calculating a sum of energies from said strong and weak moments to determine a capacity of said forecast location relative to said forecast period, and
   determining a possibility of a full state of said capacity and a probability of a discharge due to said full state within said forecast period.

2. The method of claim 1, wherein said at least one gravitational factor is selected from the group consisting of: an Earth-Moon distance, a barycenter depth, an Earth-Sun distance, a moon phase, and a distance between an Earth-Moon barycenter and said forecast location.

3. The method of claim 2, comprising at least 2 gravitational factors, wherein said strong moments correspond to one maximum value of a first one said at least 2 gravitational factors and one minimum value of a second one of said at least 2 gravitational factors.

4. The method of claim 1, wherein said weather phenomena comprise earthquakes.

5. The method of claim 1, wherein said weather phenomena comprise flyby anomalies.

6. The method of claim 1, wherein said weather phenomena comprise rogue waves.

7. The method of claim 1, wherein said weather phenomena comprise tornadoes.

8. The method of claim 1, wherein said weather phenomena comprise lightning.

9. The method of claim 1, wherein said weather phenomena comprise atmospheric pressure surges.

10. The method of claim 1, wherein said weather phenomena comprise temperature fluctuations.

11. The method of claim 1, wherein said weather phenomena causes discomfort to cardio-dependent individuals.

12. The method of claim 1, wherein said weather phenomena comprise hurricanes.

13. The method of claim 1, wherein said weather phenomena comprise sprites.

14. The method of claim 1, wherein said forecast location is underwater.

15. The method of claim 1, wherein said forecast location is underground.

16. The method of claim 1, wherein said forecast location is in a stratopause.

17. The method of claim 1, wherein said calculating all time points comprises determining when said resonances of gravitational tides occur and at least two gravitational factors are at an extreme value, said at least two gravitational factors being in phase.

18. The method of claim 1, wherein said calculating all time points comprises determining when said resonances of gravitational tides occur and at least two gravitational factors are at an extreme value, said at least two gravitational factors being in opposite phases.

* * * * *